United States Patent
Schloemer

(10) Patent No.: US 10,979,136 B2
(45) Date of Patent: Apr. 13, 2021

(54) COMMUNICATIONS SYSTEMS AND METHODS WITH STOCHASTICALLY DISTRIBUTED ORBITING SATELLITES

(71) Applicant: STAR MESH LLC, Princeton Junction, NJ (US)

(72) Inventor: Gerald R. Schloemer, Round Lake, IL (US)

(73) Assignee: STAR MESH LLC, Princeton Junction, NJ (US)

( * ) Notice: Subject to any disclaimer, the term of this patent is extended or adjusted under 35 U.S.C. 154(b) by 0 days.

(21) Appl. No.: 16/955,451

(22) PCT Filed: Jul. 11, 2019

(86) PCT No.: PCT/US2019/041428
§ 371 (c)(1),
(2) Date: Jun. 18, 2020

(87) PCT Pub. No.: WO2020/014497
PCT Pub. Date: Jan. 16, 2020

(65) Prior Publication Data
US 2020/0350981 A1 Nov. 5, 2020

Related U.S. Application Data

(60) Provisional application No. 62/697,250, filed on Jul. 12, 2018, provisional application No. 62/739,245, filed on Sep. 30, 2018.

(51) Int. Cl.
*H04B 7/15* (2006.01)
*H04W 40/02* (2009.01)
(Continued)

(52) U.S. Cl.
CPC ....... *H04B 7/1856* (2013.01); *H04B 7/18513* (2013.01); *H04B 7/18521* (2013.01);
(Continued)

(58) Field of Classification Search
CPC ............ H04B 7/185; H04B 7/18515; H04B 7/18517; H04B 7/18521; H04B 7/18532;
(Continued)

(56) References Cited

U.S. PATENT DOCUMENTS 3,017,777 A   1/1962   Haeussermann
3,815,140 A   6/1974   Buehler et al.
(Continued)

FOREIGN PATENT DOCUMENTS

EP   1523062   4/2005
IN   4263/CHE/2013   3/2015
(Continued)

OTHER PUBLICATIONS

Cox, Donald C., "Wireless Network Access for Personal Communications," IEEE Communications Magazine (Dec. 1992), pp. 96-115.
(Continued)

*Primary Examiner* — Blane J Jackson
(74) *Attorney, Agent, or Firm* — David M. Quinlan, P.C.

(57) ABSTRACT

A radio communication system for transmitting data to a ground station includes plural stochastically distributed orbiting satellites with plural antennas traversing a portion of the earth's surface divided into zones. The ground station has a unique address identifying itself and the zone where it is located. A local area network associated with the ground node includes at least one satellite that stores the identity of a satellite antenna paired with a ground station antenna to form a radio link for transmitting data onboard the satellite to the ground station. Other satellites in the local area network store the ground node address and the identity of an antenna paired with an antenna in another satellite that also has stored the ground node address. A wide area network includes at least one satellite, each of which stores the identity of an antenna paired with an antenna of another (Continued)

satellite that has stored the ground node zone to form at least one inter-satellite radio link. If a satellite with data onboard is not in a local area network associated with the destination ground node or a wide area network, the satellite transmits the data toward the ground node zone.

43 Claims, 21 Drawing Sheets

(51) Int. Cl.
  *H04B 7/185* (2006.01)
  *H04W 40/12* (2009.01)
(52) U.S. Cl.
  CPC ..... *H04B 7/18526* (2013.01); *H04B 7/18545* (2013.01); *H04B 7/18563* (2013.01); *H04W 40/12* (2013.01)
(58) Field of Classification Search
  CPC ............ H04B 7/18556; H04B 7/18559; H04B 7/18563; H04B 7/15; H04W 40/12; H04W 40/02; H04W 40/20; H04W 40/22
  See application file for complete search history.

(56) References Cited

U.S. PATENT DOCUMENTS

| | | | |
|---|---|---|---|
| 4,937,822 A | | 6/1990 | Weddle et al. |
| 4,965,850 A | | 10/1990 | Schloemer |
| 5,274,840 A | * | 12/1993 | Schwendeman .... H04W 84/022 455/13.1 |
| 5,303,286 A | | 4/1994 | Wiedeman |
| 5,410,728 A | * | 4/1995 | Bertiger .............. H04B 7/18521 455/428 |
| 5,566,354 A | * | 10/1996 | Sehloemer ......... H04B 7/18539 455/13.1 |
| 5,574,968 A | | 11/1996 | Olds et al. |
| 5,604,920 A | * | 2/1997 | Bertiger .............. H04B 7/18521 455/13.1 |
| 5,716,029 A | | 2/1998 | Spitzer et al. |
| 5,757,784 A | | 5/1998 | Liebowitz et al. |
| 5,793,842 A | | 8/1998 | Schloemer et al. |
| 5,812,545 A | | 9/1998 | Liebowitz et al. |
| 5,959,999 A | | 9/1999 | An |
| 6,208,312 B1 | | 3/2001 | Gould |
| 6,219,003 B1 | | 4/2001 | Chandler |
| 6,295,283 B1 | | 9/2001 | Falk |
| 6,404,769 B1 | | 6/2002 | Kapoor |
| 6,459,899 B1 | | 10/2002 | Schloemer |
| 6,775,251 B1 | | 8/2004 | Wiedeman et al. |
| 6,823,170 B1 | | 11/2004 | Dent |
| 6,985,454 B1 | | 1/2006 | Wiedeman et al. |
| 7,292,186 B2 | | 11/2007 | Miller et al. |
| 7,502,382 B1 | | 3/2009 | Liu et al. |
| 7,925,167 B1 | | 4/2011 | Kozubal et al. |
| 8,634,414 B2 | | 1/2014 | Leong et al. |
| 8,918,047 B1 | | 12/2014 | Teller et al. |
| 9,035,839 B2 | | 5/2015 | Scott et al. |
| 9,748,989 B1 | | 8/2017 | Freedman et al. |
| 10,063,309 B2 | | 8/2018 | Laufer et al. |
| 10,084,536 B1 | | 9/2018 | Schloemer |
| 10,084,615 B2 | | 9/2018 | Hong et al. |
| 10,085,200 B1 | | 9/2018 | Schloemer |
| 10,291,316 B1 | | 5/2019 | Schloemer |
| 10,447,381 B2 | | 10/2019 | Schloemer |
| 10,742,311 B2 | * | 8/2020 | Speidel .............. H04B 7/18521 |
| 2005/0207375 A1 | | 9/2005 | Schiff |
| 2006/0023717 A1 | | 2/2006 | Trachtman et al. |
| 2007/0070939 A1 | | 3/2007 | Hottinen |
| 2007/0075896 A1 | | 4/2007 | Whitehead et al. |
| 2008/0056189 A1 | | 3/2008 | Hudson et al. |
| 2008/0219266 A1 | | 9/2008 | Agarwal et al. |
| 2008/0278397 A1 | | 11/2008 | Rao et al. |
| 2010/0217879 A1 | | 8/2010 | Weiner |
| 2013/0148250 A1 | | 6/2013 | Day et al. |
| 2013/0293415 A1 | | 11/2013 | Gutt et al. |
| 2014/0027576 A1 | | 1/2014 | Boshuizen et al. |
| 2014/0177522 A1 | | 6/2014 | Marshack et al. |
| 2014/0240449 A1 | | 8/2014 | Shefer |
| 2014/0266867 A1 | | 9/2014 | Liu et al. |
| 2015/0131512 A1 | | 5/2015 | Lauer et al. |
| 2016/0037434 A1 | | 2/2016 | Gopal et al. |
| 2016/0080072 A1 | | 3/2016 | Baudoin et al. |
| 2016/0112117 A1 | | 4/2016 | Platzer et al. |
| 2016/0365629 A1 | | 12/2016 | Yao et al. |
| 2018/0156924 A1 | | 6/2018 | Reedy et al. |

FOREIGN PATENT DOCUMENTS

| | | |
|---|---|---|
| WO | 2018039292 | 3/2018 |
| WO | 2019118245 | 6/2019 |

OTHER PUBLICATIONS

Satellite Systems Engineering in an IPv6 Environment, Minoli, Daniel, CRC Press, Boca Raton, FL (2009), pp. 78-80.
Chabot, J. A., "A Spherical Magnetic Dipole Actuator for Spacecraft Attitude Control," Thesis for M.S. in Aerospace Engrg. Sciences, Univ. of Colorado, 2015.
"Iridium Satellite Constellation," Wikipedia, https://en.wikipedia.org/wiki/Iridium (last visited May 9, 2017).
"Project Loon," Wikipedia, https://en.wikipedia.org/wiki/Project_Loon (last visited Sep. 27, 2017).
Wade, P., "Multiple Reflector Dish Antennas," copyright 2004.
"CubeSat," Wikipedia, https://en.wikipedia.org/wiki/CubeSat (last visited Jun. 23, 2019).
International Search Report and Written Opinion in PCT/US19/41428, dated Nov. 12, 2019.
International Search Report in PCT/US2017/48110, dated Nov. 3, 2017.
Invitation to Pay Additional Fees dated Nov. 14, 2018, in PCT appln. No. PCT/US2018/053002.
International Search Report and Written Opinion dated Jan. 22, 2019, in PCT appln. No. PCT/US2018/053002.
International Search Report and Written Opinion dated Apr. 8, 2019, in PCT appln. No. PCT/US2018/064041.
Supplementary European Search Report dated Feb. 25, 2020, in EP appln. No. 17844319.8 (PCT/US2017/048110).
Chakraborty, D., "Survivable Communication Concept Via Multiple Low Earth-Orbiting Satellites," IEEE Transactions on Aerospace and Electronic Systems, vol. 25, No. 6 (Nov. 1989), pp. 879-889.
Chung, Soon-Jo, et al., "Review of Formation Flying and Constellation Missions Using Nanosatellites," Journal of Spacecraft and Rockets, vol. 53, No. 3, pp. 567-578 (May-Jun. 2016).
Qu, et al., "Leo Satellite Constellation for Internet of Things," IEEE Access, vol. 5, pp. 18391-18401, Digital Object Identifier 10.1109/Access.20172735988, first pub. Aug. 4. 2017 (Sep. 27, 2017).

* cited by examiner

COMMUNICATIONS SYSTEMS AND METHODS WITH STOCHASTICALLY DISTRIBUTED ORBITING SATELLITES

CROSS-REFERENCE TO RELATED APPLICATIONS

This application claims the benefit of U.S. provisional applications No. 62/697,250 filed Jul. 12, 2018, and No. 62/739,245 filed Sep. 30, 2018, which are incorporated by reference as part of the present disclosure as if set out in full.

BACKGROUND OF THE INVENTION

Field of the Invention

The present invention relates to transmitting data from one terrestrial node to another or from one satellite node to another, and more particularly, to communications systems and methods using novel routing protocols and node designs for establishing radio links between satellites and terrestrial nodes, and still more particularly, to such systems and methods employing multiple satellites distributed stochastically at indeterminate geolocations that do not require precision attitude control.

Description of Related Art

The applicant's U.S. Pat. Nos. 10,084,536, 10,085,200, 10,291,316, and Int'l Pub. No. WO 2018/039292, which are incorporated by reference as part of the present disclosure as if set out in full, describe numerous innovative satellite-based radio communication systems and methods. Certain preferred implementations of those systems use a constellation of 100 or more satellites in low-earth orbits at altitudes of about 500 miles. Until the applicant's approach described in those documents, a typical solution to the problem of creating radio links in a satellite-based communication system was to use satellites at precisely controlled attitudes in rigidly controlled orbits. According to conventional wisdom, that was the preferred way to ensure that antennas on two satellites, or on a satellite and ground station, would pair up to permit transmission of signals between them.

Although this conventional approach typically supported inter-satellite communications, the necessity of maintaining the satellites in fixed orbits at tightly controlled attitudes requires rocket thrusters and rocket fuel, which add to satellite size, expense and weight. Other possible approaches to attitude control involve judicious placement of a satellite's solar panels and mechanical means to manipulate them for maintaining the satellite in desired orientations, which also adds to satellite weight and complexity. But the larger and heavier the satellite, the more it costs to launch it into orbit, and the more complex the design, the more each satellite costs. The applicant's systems broke through the paradigm of requiring tight control of satellite position and attitude by using small, lightweight satellites in unconstrained orbits that require no attitude control. Eliminating the need for rockets and rocket thrusters and other mechanical means translates to lighter, smaller, and cheaper satellites, with the potential to reduce by orders of magnitude the overall cost of implementing worldwide satellite-based communication systems.

The applicant's previously disclosed satellite-based systems are nevertheless capable of further economies and greater reliability by employing even more sophisticated satellite deployment strategies, route creation protocols, satellite constructions, and antenna configurations. The approaches discussed in this disclosure include, but are not limited to, reducing the number of satellites or other types of aerial nodes, providing a limited degree of satellite attitude stabilization, limiting satellite orbits to a latitudinal range proximate to the earth's equator or to polar orbits, using aerial nodes other than satellites, using aerial nodes at different altitudes, employing innovative antenna design, using sophisticated algorithmic techniques for facilitating node-to-node radio links, and adopting satellite configurations that enable launch and deployment using CubeSat vehicles (see Wikipedia entry "CubeSat," https://en.wikipedia.org/wiki/CubeSat).

SUMMARY OF THE INVENTION

One object of the present invention is to provide space-based, multi-node communications systems and methods that reduce the amount of information that must be exchanged between system nodes and minimize the calculations required to create preferred and/or optimum radio routes for data communications from an originating ground node to a destination ground node.

The systems and methods described herein are particularly adapted for effecting space-based communications using a constellation of stochastically distributed satellites that rely on probabilities to create radio links via antenna pairing between satellites and between satellites and ground stations. The detailed description of various embodiments that follows below includes a variety of route creation strategies and satellite configurations, antenna constructions, and satellite deployment techniques to facilitate antenna pairing and the creation of radio links.

In some aspects the systems and methods disclosed herein comprise at least one satellite that employs routing protocols by reference to its geolocation, determined via onboard electronic circuitry interfacing with a Global Navigation Satellite System. In other aspects routing protocols involve free-form routing in which some or all of the stochastically distributed satellites in a constellation do not know their geolocations or that of other satellites.

In another important aspect the invention involves routing protocols that can be used to support a distributed ledger maintained in a constellation of multiple stochastically distributed satellites.

Additional aspects of the invention increase the probability of pairing antennas in different stochastically distributed satellites in a constellation via novel satellite configurations with attitude stabilization. These satellite configurations can include unique antenna constructions to further increase the probability of pairing antennas in different satellites for creating radio links.

It will be understood as this description proceeds that many of the different aspects and features of the system nodes, particularly those comprising the satellite embodiments and the satellite-based routing protocols described herein, can be used in various combinations depending on the requirements and purposes of a particular communications system.

This Summary is provided solely to introduce in a simplified form a selection of concepts that are described in detail further below. It is not intended necessarily to identify key or essential features of the subject claimed herein, nor is it intended to be used an aid in determining the scope of the claimed subject matter.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

FIG. 1, comprising

DETAILED DESCRIPTION OF PREFERRED EMBODIMENTS

Figure 1A:
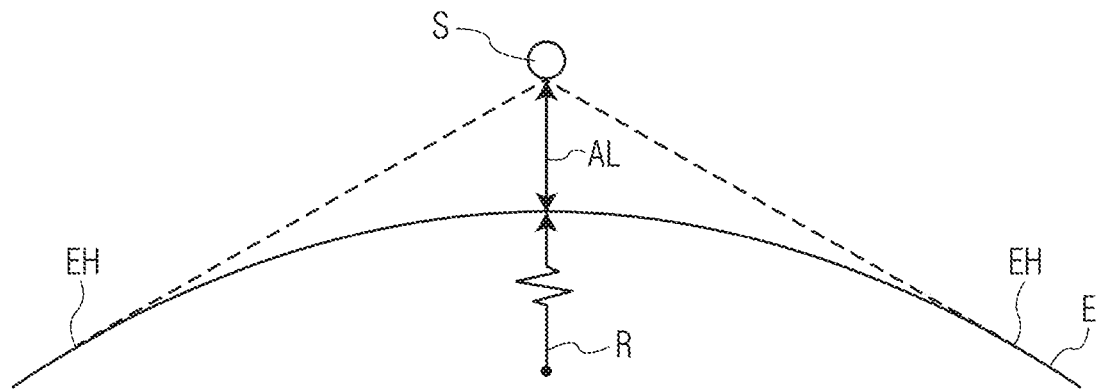
FIGS. 1A and 1B, illustrates geometric principles relevant to the use of satellites in low-earth orbits in space-based communications systems disclosed and claimed herein.

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein.

The following detailed description of certain preferred embodiments of the invention is organized as follows:
I. Definitions
II. Basic Communication Systems Principles and Satellite Designs
   A. Satellite Design: Antenna Configuration and Onboard Control Circuitry
   B. Single-Satellite Specialized Messaging Systems
      1. Single Satellite Messaging System—Equatorial Orbit
      2. Single Satellite Messaging System—Polar Orbit
   C. Multiple Satellite Communication System
      1. Multiple Satellite Deployment Arrangements
      2. Route Creation and Data Transmission Protocols
   D. Distributed Ledger Systems
      1. Blockchain Principles Applied to Radio Routing
      2. Distributed Ledgers in a Stochastic System
III. Alternate Satellite Constructions and Deployment Strategies
   A. Rotating Satellites
      1. Counter-rotating Satellites
      2. Satellites Rotating at Different Angular Velocities
      3. Other Considerations
   B. Satellite Configurations with Attitude Stabilization
   C. Alternate Antenna Configurations
   D. CubeSat Compatibility
IV. Further Applications of Disclosed Concepts
V. Summary and Conclusion I. Definitions The description that follows uses numerous terms intended to have specific meanings. One concept central to certain embodiments of the systems described and claimed herein is that the satellites can be "stochastically distributed" or in "unconstrained orbits." These terms are both related to the term "random orbits" used in the applicant's prior U.S. Pat. Nos. 10,084,536, 10,085,200, 10,291,316, and Int'l Pub. No. WO 2018/039292. The intended meaning of these terms is that a satellite, once deployed in orbit, is permitted to assume any orbital path without the application to the satellite of motive power by an onboard propulsion system. However, neither term is intended to exclude initial deployment of a satellite at a particular orbital inclination, altitude, or attitude, or at a particular geolocation relative to another satellite in the system. Stated another way, "stochastically distributed," "unconstrained," or "random" orbits means that the satellite is deployed so that its location relative to other satellites and to the earth at any given time is not controlled after it is inserted into orbit, although it may be initially deployed in a manner designed to provide coverage of a particular swath of the earth's surface. The satellites need not be deployed randomly in a mathematical sense, but it is within the scope of these terms to use mathematical methods to determine satellite deployment direction, inclination, altitude, velocity, etc. that take into account the geographic areas of the earth to be served by radio routes using one or more satellites. In addition, individual satellites can be launched in different orbital directions (eastward or westward around the earth) in combination with any of the aforementioned or other deployment techniques. For example, the satellites could be ejected in different directions at different velocities from a launch vehicle traveling in an orbital direction (that is, generally eastward or westward), so that after a time they will have separated themselves into "random" orbits in an essentially unconstrained manner. This will make a constellation of multiple satellites frequently appear to an observer on earth to be stochastically distributed in random orbits.

The term "passive attitude control" and the related term "without active attitude control" as applied to a satellite in the systems described herein mean that the satellite carries no attitude control mechanism with parts that are moved to different positions by onboard apparatus requiring motive power to intentionally change the attitude of the satellite with respect to an external frame of reference. Examples of active attitude control mechanisms would be propulsion systems with thrusters capable of imparting moments on the satellite to cause it to rotate, or mechanical actuators with moving parts used to change the center of gravity or angular momentum of the satellite or the position and/or orientation of a satellite's solar panels. The terms do not exclude the use of passive means for changing or controlling satellite attitude without using moving parts, whereby a satellite may tend to assume a particular attitude over time simply by virtue of its structure and the materials used in its manufacture. In addition, the terms do not exclude using various approaches such as using electrical means to stabilize the attitude of the satellites within certain limits. This could include techniques such as selective switching of arrays of one or more electromagnets to vary their interaction with the earth's magnetic field in a manner that influences satellite attitude. Similar techniques known presently or developed in the future are also covered by the terms "passive attitude control" and "without active attitude control."

Other terms used in the description that follows are "data communications" and "routing messages." A "data communication" comprises content (digital or otherwise) sent over a radio link between satellites or between a satellite and a ground station, unless otherwise indicated explicitly or by context. While not limited as such, the systems described herein are particularly well suited for the transmission of data in packets, defined here in the generally accepted sense as a collection of digital data with a portion representing the content of the transmission (sometimes referred to as the "payload"), and a control portion (sometimes referred to as a "header" or "trailer"), which contains information enabling the payload to be delivered successfully, such as source and destination addresses, error detection codes, and sequencing information. A routing message is a radio signal sent from a node in the system (ground or aerial node) that contains information or has a property that can be used for determining the suitability of the node for inclusion in a multi-link radio route. A given radio signal can include both a routing message and a data communication. Throughout the description herein, the term "radio" is not limited to references to electromagnetic radiation in frequencies commonly referred to as radio waves. It is meant to encompass electromagnetic radiation of any frequency capable of transmitting information, including light, microwaves, VHF ("very high frequency"), UHF ("ultrahigh frequency"), etc.

A "node" is a physical object with one or more transceivers for transmitting radio signals intended to be received by other nodes and for receiving radio signals transmitted from other nodes. Nodes can be terrestrial ground stations ("ground nodes") or transceivers above the earth's surface ("aerial nodes"). Aerial nodes include, but are not limited to, satellites orbiting the earth, balloons, and drones. A ground node can either be structure fixed to the earth's surface or one or more transceivers mounted on a low-altitude unmanned aerial vehicle ("drone") or on a balloon maintained at a substantially fixed position at an altitude typically no more than about 500 feet ("elevated ground node"). Elevated ground nodes will enable more users to connect to a communications system in areas of low population density.

As those skilled in the art will recognize, in the description of the subject matter disclosed and claimed herein that control circuitry and components described and depicted in the various figures are meant to be exemplary of any electronic computer system capable of performing the functions ascribed to them. Such a computer system will typically include the necessary input/output interface devices and a central processing unit (CPU) with a suitable operating system, application software for executing program instructions, and transient and non-transient memory modules. In addition, terms referring to elements of the system are used herein for simplicity of reference. For example, the terms "component," "module," "system," "apparatus," "interface," or the like are generally intended to refer to a computer-related entity, either hardware, a combination of hardware and software (firmware), software, or software in execution, unless the context clearly indicates otherwise. In addition, the term "module" or "component" does not of itself imply a self-contained structure, but rather can include various hardware and firmware that combine to perform a particular function. In that regard, a component or module may be, but is not limited to being, a process running on a processor, a processor, an object, an executable, a thread of execution, a program, and/or a computer. By way of illustration, both an application running on an electronic computing device and the device itself can be a component. One or more components may reside within a process and/or thread of execution and a component may be localized on one computer and/or distributed between two or more computers.

II. Basic Communication Systems Principles and Satellite Designs

Figure 1B:
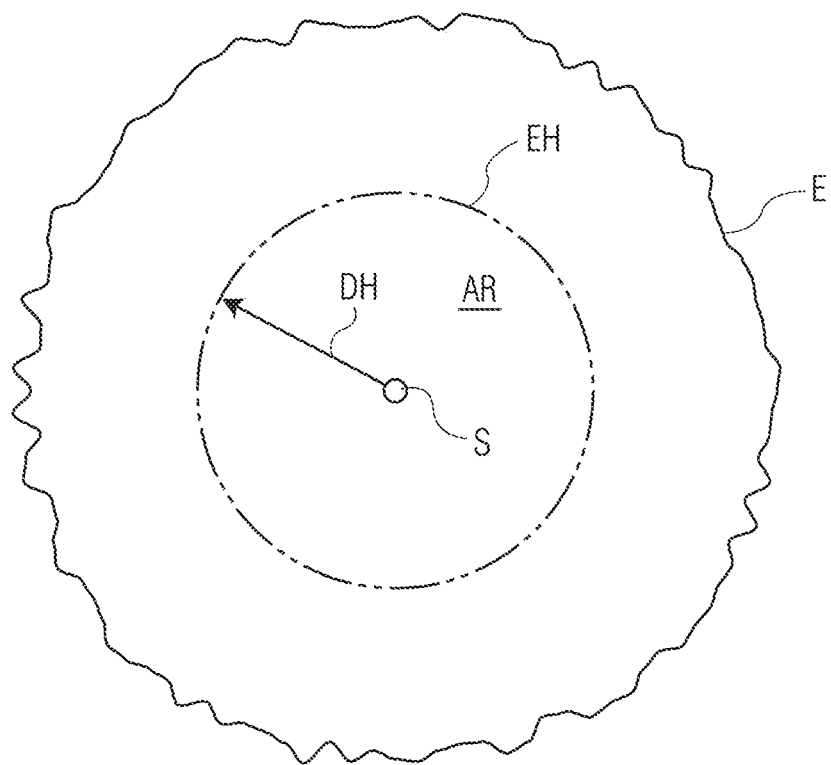

One of the important parameters in a communication system in which an aerial node, such as a satellite, exchanges radio signals with ground nodes and/or other satellites is the distance from the satellite to the horizon on the earth's surface. FIGS. 1A and 1B illustrate the relationship between the altitude of an aerial node such as a satellite S and its surface "footprint" defined by the distance from the satellite to the horizon EH. A ground station beyond that distance cannot see the satellite and thus cannot exchange radio signals with it. If the satellite S is at an altitude AL of 200 miles, it will have a footprint on the earth's surface relating to the distance DH to the horizon EH according to the formula $DH=[(R+200)^2-R^2]^{1/2}$, where R is the radius of the earth E. If R is assumed to be 4,000 miles, DH is about 1280 miles. This is the radius within which a satellite will theoretically be in line of sight of a point on the ground. The satellite's footprint (the area of the earth's surface visible to the satellite) is $\pi*DH^2 \approx 5,100,000$ sq. mi. (Those skilled in the art will appreciate that these theoretical values may not be accurate in all instances because the sight line to the satellite is shallow at the horizon, and trees, buildings, hills, etc., can reduce the actual distance and footprint.) By the same token, the distance two satellites in circular orbits at the same altitude can see each other is roughly twice the distance DH. One of the challenges in any satellite-based communication system is to design the satellites and ground stations so that their respective antennas can be paired to create radio links over these large distances.

For reference in the descriptions of various embodiments that follow, the following table sets out for satellites of different altitudes their distances to the horizon (DH), footprints, and periods (the length of time required for a single orbit).

TABLE 1

| Altitude - AL (miles) | Distance to Horizon - DH (miles) | Footprint - $\pi*DH^2$ (sq. mi.) | Period - P (minutes) |
|---|---|---|---|
| 100 | 900 | 2,500,000 | 88 |
| 200 | 1,280 | 5,100,000 | 91 |
| 400 | 1,830 | 10,500,000 | 97 |
| 500 | 2,000 | 12,500,000 | 101 |
| 800 | 2,600 | 21,200,000 | 111 |
| 1000 | 3,000 | 28,300,000 | 118 |

This table reveals one of the trade-offs involved in designing a satellite-based communication system, in that the distance to the horizon and the corresponding footprint increase as the orbit altitude increases, but the strength of the radio signals between satellites and the ground is attenuated as the altitude increases. This and other design considerations are discussed in the sections that follow.

A. Satellite Design: Antenna Configuration and Onboard Control Circuitry

The applicant's prior U.S. Pat. Nos. 10,084,536, 10,085,200, 10,291,316, and Int'l Pub. No. WO 2018/039292 disclose satellite designs capable of creating radio links between a satellite and a ground station and between satellites. Those satellite designs are capable of effecting the routing protocols discussed herein, and will be used in describing certain basic features of those protocols. Improved satellite designs and deployment strategies for that purpose also form a part of the present disclosure and are discussed further below.

Figure 2:
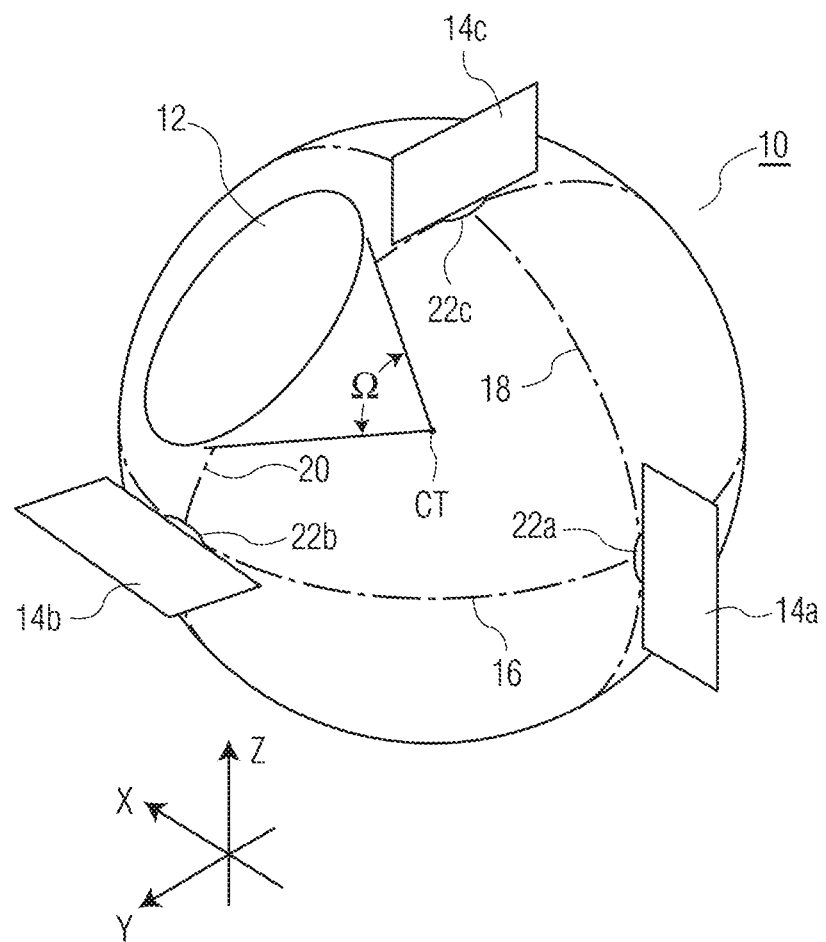
FIG. 2 schematically depicts an embodiment of a satellite suitable for use in the space-based communications systems disclosed and claimed herein.

FIG. 2 is a schematic depiction of an embodiment of a satellite 10 that can be used as an aerial node in the communication systems described further below in this section II. Salient features of this satellite construction and operation are fully described in the patents and publication described above, and are repeated here for the convenience of the reader. The satellite 10 is shown with an outer casing in the shape of a sphere centered at CT, although those skilled in the art will recognize that the satellite can have a different shape if so dictated by other design considerations, as discussed further below in section III. Certain features of the satellite will be described with reference to a coordinate system having mutually orthogonal x, y, and z axes, but this coordinate system is used strictly for purposes of illustration in describing features of the satellite. For example, the coordinate system imposed on FIG. 2 can be considered to be tied to the satellite and to change its angular orientation with respect to the earth as the satellite changes orientation (attitude).

The exemplary satellite 10 includes a plurality of antenna modules 12, one of which is depicted in highly schematic fashion in FIG. 2 for purposes of illustration. Each antenna module in this example comprises a directional antenna that transmits and receives radio signals at greater powers in predetermined directions. The present embodiment uses circular-dish parabolic antennas each of which occupies a solid angle 1 with a vertex at a point in the satellite interior. The antenna reflectors (omitted from the drawing for clarity) may be recessed below the surface of the satellite. The number of discrete antenna modules incorporated into the satellite will depend on the particular application of the system and the antenna design. In addition, the antenna modules can be structured in any other configuration that will enable them to perform the functions described herein. In one embodiment Ω in steradians will be chosen so that a particular number of antenna modules, distributed around the satellite, will be capable of transmitting radio signals to and receiving radio signals from a sufficiently large spherical area to enable radio signals to be received from and transmitted to ground station transceivers and antennas in other satellites to effect operation of the systems described below. The actual configuration of the antenna modules 12 can be determined using known antenna design principles to achieve that goal.

A satellite used in the present system will be large enough to accommodate the various electronic and mechanical components required for satellite operation, discussed below in detail in connection with FIG. 3, as well as being sufficiently robust in construction to withstand the stresses of launch and long-term exposure to the hostile environment it will encounter in orbit.

It will be appreciated that satellites and antennas suitable for use in the present system can take different forms depending on trade-offs familiar to those skilled in engineering complex systems. One of the aspects of certain methods described herein involves transmission of radio signals from plural antennas in one or more satellites for receipt by antennas at other satellites. Increasing the number of antennas in a satellite node will increase the coverage of radio signals transmitted from and received by other nodes, which in turn will increase the probability that a signal from one node will be received at another. It will be further appreciated that more antennas per satellite might make it possible to reduce the number of satellites placed in orbit in multi-satellite systems. Such satellites might be more expensive and heavier, thus increasing launch costs, but other factors might offset the increased cost because fewer satellites might need to be launched. Those skilled in the art will also recognize that the system described herein can be implemented with satellite nodes having antenna collections that transmit with less than full 360° spherical coverage.

The satellite 10 also includes a plurality of solar panels, three of which 14a, 14b, and 14c, are shown in FIG. 2. In the illustrated embodiment the solar panels are oriented in mutually perpendicular planes and spaced equidistantly around the satellite 10. For purposes of describing the locations and orientations of the solar panels in this embodiment, a satellite equator 16 is defined as the great circle where the satellite surface is intersected by a plane parallel to the x-y plane and passing through the center CT of the sphere. A zero meridian 18 is defined as the great circle where the satellite surface is intersected by a plane parallel to the x-z plane and passing through the center CT of the sphere. And a normal meridian 20 is defined as the great circle where the satellite surface is intersected by a plane parallel to the y-z plane and passing through the center CT of the sphere. The solar panel 14*a* is attached to the satellite by suitable mounting structure 22*a* at the intersection of the equator 16 and the zero meridian 18. The solar panel 14*b* is attached to the satellite by suitable mounting structure 22*b* at the intersection of the equator 16 and the normal meridian 18. And the solar panel 14*c* is attached to the satellite by suitable mounting structure 22*c* at the intersection of the zero meridian 18 and the normal meridian 20.

The solar panels are generally planar with solar cells distributed over one or both faces for generating electricity when the solar cells are exposed to sunlight. For maximum effectiveness, the planar solar panels are mounted in mutually orthogonal planes to ensure that an adequate number of solar cells are exposed to sunlight regardless of the angular orientation of the satellite. In the depicted embodiment, the solar panel 14*a* lies in the x-z plane, the solar panel 14*b* lies in the x-y plane, and the solar panel 14*c* lies in the y-z plane. It will also be appreciated that the satellite includes three more companion solar panels where the equator, zero meridian, and normal meridian intersect on the other side of the satellite. The companion solar panels (depicted with a prime (') in FIG. 3) are preferably oriented in the same planes as each of their counterparts 14*a*, 14*b*, and 14*c* shown in FIG. 2. Each solar panel is depicted as being normal to the surface of the satellite so that it does not obstruct the transmission and receipt of radio signals by antennas adjacent to the solar panels.

It will be appreciated that FIG. 2 is intended solely to illustrate features of the satellite 10 necessary to an understanding of the present embodiment. Those skilled in the art will understand that an actual satellite for implementing the present system may have design features not shown in FIG. 2's schematic depiction. For example, good design practice may dictate that the mouths of the antennas be recessed below the surrounding surface of the satellite to reduce the possibility of impact damage by space debris. Or additional protection might be provided by covering each antenna mouth (recessed or not) with a sheet of material transparent to signals transmitted by and received at the satellite. The design and placement of the solar panels 14 shown in FIG. 2 is also highly schematic, and the systems disclosed and claimed herein are not limited to any particular solar panel configuration, placement, or means of deployment. In another variation, the antennas can be arranged so that the solar panels can be mounted flush with the satellite surface in spaces between antenna mouths.

Figure 3:
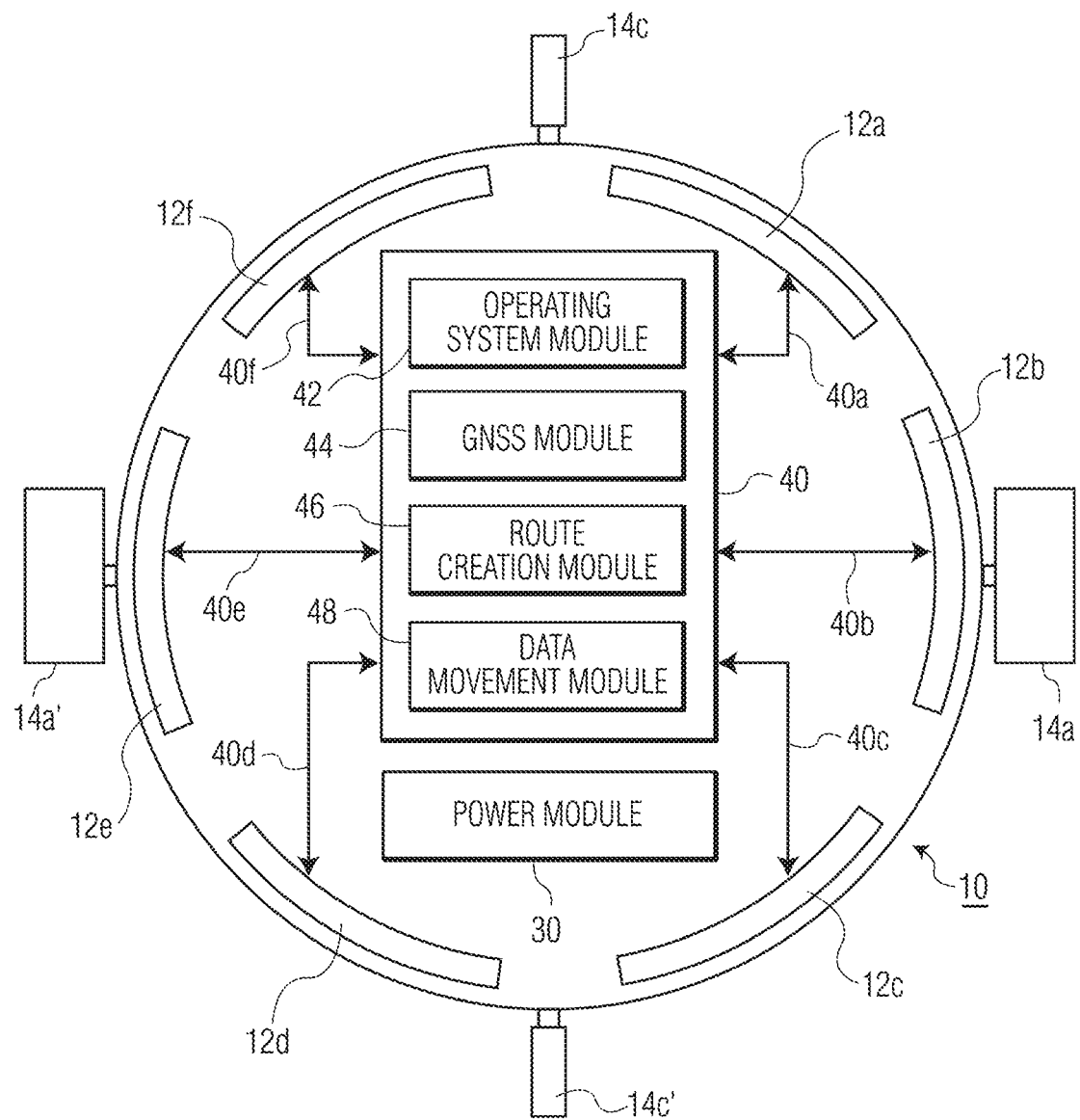
FIG. 3 is a representation of various operational components of the satellite depicted in FIG. 2.

FIG. 3 illustrates schematically various components housed by the satellite 10 (linking node) for creating a radio route capable of transmitting and receiving data transmissions to and from other nodes. As those skilled in the art will readily recognize, in the descriptions of this and other embodiments and aspects of the communications systems comprising the subject matter disclosed and claimed herein, the control circuitry and components described and depicted in the various figures are meant to be exemplary of any electronic computer system capable of performing the functions ascribed to them. Such a computer system will typically include the necessary input/output interface devices and a central processing unit (CPU) with a suitable operating system and application software for executing program instructions. The satellite's onboard computer system will also have appropriate memory modules for storing information. In addition, terms referring to elements of the system are used herein for simplicity of reference, and not by way of limiting their functions or modes of operation.

Referring in more detail to FIG. 3, the satellite 10 is depicted in a view in the x-z plane in FIG. 2. It will be appreciated that FIG. 3, like many other depictions used herein to describe the subject communications systems and their components, is not to scale. It depicts the solar panels 14*a* and 14*c*, as shown in FIG. 2, as well as the diametrically opposed companion solar panels 14*a*' and 14*c*' mentioned above. It also depicts a plurality of antenna modules 12*a*, 12*b*,12*c*, 12*d*, 12*e*, and 12*f,* intended as a schematic representation of all of the antenna modules onboard the satellite 10, for transmitting and receiving radio signals as discussed above in connection with FIG. 2. This schematic depiction is intended to convey the principle of operation of the present embodiment whereby the plurality of antenna modules in combination will be capable of transmitting and receiving radio signals to and from a node in multiple radial directions. (However, as already noted, the system described herein can also be implemented with linking nodes having antenna arrays that transmit with less than full 360° spherical coverage.)

The satellite 10 includes a power module 30 capable of providing a reliable source of electrical power for operating the satellite components. The power module 30 includes rechargeable batteries that are charged by electricity generated by the solar panels. Suitable power regulating equipment provides steady-state power to the various electronic components carried by the satellite even though the solar panels will spend one half of each satellite orbit out of sight of the sun. In addition to the power module the satellite includes a central processing unit 40 with an operating system module 42 that stores operational software for controlling the various functions of the satellite. As shown in FIG. 3, the CPU 40 is operatively connected to all of the antenna modules 12 via power and data links 40*a*, 40*b*, 40*c*, 40*d*, 40*e*, 40*f,* etc.

FIG. 3 also illustrates three main operational modules under the control of the operating system module 42. A Global Navigation Satellite System (GNSS) module 44 communicates with a global navigation satellite system, examples being the Global Positioning Satellite (GPS) system based in the United States, the European Union's Galileo system, the Russian GLONASS system, and the Chinese BeiDou system. This module enables the satellite to determine its position relative to the earth's surface in the manner employed by known global navigation satellite systems. Radio signals exchanged between system nodes via the antenna modules 12 are used by a route creation module 46 that includes antenna pairing circuitry for executing logic discussed further below to create a radio route comprising radio links supporting data communications between two or more nodes. A data movement module 48 includes data transmission circuitry that controls the transmission of data (content) between nodes as also discussed further below in more detail. As suggested above, the illustration in FIG. 3 of separate modules for route creation and data movement does not necessarily imply that identifying radio links to be used in a radio route and transmitting data between linked nodes are other than part of a more or less unitary process of creating a preferred radio route for transmitting data communications from one satellite to another or between satellites and ground nodes.

Another important feature of certain systems and methods described herein is that the satellites can operate without active onboard attitude control. However, certain constructions for providing passive attitude control to stabilize satellite attitude within certain limits can improve the operation of the system, as described in section III.B., without adding materially to the cost of making and launching the satellites. Thus, in one basic form, the satellites can be permitted to orbit without regard to their angular orientation. It is expected that satellites can be deployed from a launch vehicle such as a space station or the like. It may be preferable in some implementations to attempt to deploy them with as little angular velocity as possible, but in certain embodiments no special effort is required in that regard. Some system embodiments described herein can create radio routes even if the satellites tumble as they orbit, meaning that they need not be in a known, predetermined orientation (attitude). That the satellites can be stochastically distributed via unconstrained orbits and have no active attitude control, or in some cases attitude stabilization within certain limits, eliminates the need for heavy and costly onboard systems for operating onboard mechanisms such as rocket thrusters for changing or maintaining a satellite's location or attitude. In addition each satellite can include tracking telemetry to detect when its orbit is decaying and it needs to be replaced, and to comply with any national or international protocols applicable to orbiting bodies. However, it is expected that it will be relatively simple and inexpensive to provide such telemetry.

B. Single-Satellite Specialized Messaging Systems

The satellites just described are sufficiently inexpensive to manufacture and launch that they can be used in private communication systems specially adapted for transmitting email communications. The basic principles underlying such a system will be explained with reference to FIG. 4, which is based on a standard Mercator projection of the earth showing the equator (0° latitude), the Tropic of Cancer (23.5° N latitude), and the Tropic of Capricorn (23.5S° latitude). Also indicated for reference are lines of longitude at 0°, 90° E, 180°, and 270° E (90° W).

1. Single Satellite Messaging System—Equatorial Orbit

It has been observed that the populations in the less developed regions between the Tropics of Cancer and Capricorn generally have limited or no access to the Internet, per Greg Wyler's proposed "O3b" satellite communication system. See Wikipedia entry "O3b," https://en.wikipedia.org/wiki/O3b_(satellite). (The name refers to the purported three billion people inhabiting a swath of the earth's surface centered on the equator that have limited or no access to the Internet.) However, from the hundreds of millions of dollars expended so far to partially implement the O3b system, it appears that it relies on expensive traditional communications satellites that carry rocket thrusters to maintain them in tightly constrained orbits and attitudes. The applicant's system described here can provide communications service to the same population at a small fraction of that amount.

The present embodiment is described by reference to the single satellite $S100_E$ in an orbital path $OP_E$ depicted by the double-dashed line in FIG. 4. Although this type of single-satellite system has a particular, targeted functionality, it will be clear as this description proceeds that it can serve to enable communications between far-distant ground locations that otherwise might be difficult to connect via electronic communication. In this embodiment the satellite $S100_E$ can be a satellite like that described above in connection with FIGS. 2 and 3, launched into a circular orbit from a site near the equator, such as the Guiana Space Center GS used by the European Space Agency and the French National Center for Space Studies (CNES). This site is at 5° N latitude, so that a satellite launched due east (or west) will closely track the equator in an orbital path $OP_E$ shown in the figure as a very shallow sine wave centered on the equator with a maximum distance north and south of about 340 miles (covering a swath about 680 miles wide). The following discussion takes advantage of the fact that a satellite constructed as described herein is so inexpensive to build and launch into orbit that the system can support private messaging systems in which a group of individual users or a small enterprise launches a single satellite and limits its use solely to system subscribers.

The present embodiment will be described using as an example a satellite orbiting at an altitude of about 400 miles. From Table 1 above, the satellite $S100_E$ should be visible to all or substantially all points in the 3,200-mile wide swath of the earth's surface bounded by the Tropics of Cancer and Capricorn during each orbit. This is illustrated by first and second exemplary footprints $F1_E$ and $F2_E$ having diameters of about 3,600 miles (Table 1; 400-mile high orbit) shown in double-dashed circles at different locations in the orbital path $OP_E$. Moreover, in any non-equatorial orbit at a 400-mile altitude, the orbital path will "shift" relative to the ground by about 24° ($\approx$1,600 miles) in each successive orbit (depiction of which is omitted from in FIG. 4 for clarity). Thus, even for the slightly non-equatorial orbit shown in FIG. 4, some portion of the earth's surface north and south of the Tropics will see the satellite every day. If it were possible to deploy the satellite with an orbital path exactly tracking the equator, it would be visible to all or almost all locations in the 3,200-mile wide swath between the Tropics during every orbit.

As an example of how one ground station would communicate with another in such a system, consider a subscriber located in Uyo, Nigeria, who wants to send a message to another subscriber in Leyte, Philippines. Uyo is at 5° N (about 340 miles from the equator) and Leyte is at 11° N (about 750 miles from the equator). A satellite launched from the Guiana Space Center (5° N) into a 400-mile high orbit will pass within sight of both Uyo (5° N) and Leyte (11° N) each orbit, as shown by the footprints $F1_E$ and $F2_E$.

In a typical routing protocol a subscriber in Uyo composes a message on his or her electronic device equipped with a suitable app to be sent to the user in Leyte. The app can supply address information that identifies the latitude and longitude of the Leyte subscriber's ground station. The message cannot be uploaded to the satellite until it is within sight of Uyo. Since the orbital period of the satellite is 97 minutes (Table 1), the user might have to wait almost that long for the message to be uploaded. Typically, the user's device will be in communication with a ground station having multiple directional antennas that transmits the email periodically (say every minute) until the satellite returns a confirmatory handshake to the ground station that it has received the transmission. The repeated transmissions by the ground station may take place in the background. Optionally, the satellite may send a notification to the user when the satellite has successfully received the message.

The satellite stores in its route creation module 48 the destination information in the form of Leyte's longitude and latitude. The satellite also knows its own location by virtue of the GNSS module 44. When the satellite is within sight of the Leyte destination coordinates, its data movement module begins transmitting the message on all of its antennas 12. Uyo is at 7° E longitude and Leyte is at 125° E longitude, which is about one-third of an orbit. Accordingly, it will take no more than about 32 minutes for the satellite to be within range of the Leyte destination ground station after it has received the message from the Uyo originating ground station. When the destination ground station has received the message, it returns a confirmatory handshake to the satellite. Preferably, the satellite stores the confirmatory handshake in some fashion (such a setting a flag), and transmits it to the Uyo ground station as it completes its orbit. It will be appreciated that the satellite may be able to transmit the message directly to the destination ground station if it is within sight of the satellite (a two-hop route).

A system with a single satellite in an equatorial (or near-equatorial) orbit at very low altitudes will be limited in the area of the earth's surface accessible to the system. Deploying the satellites at higher and higher altitudes will increase the area of coverage, although it will make it more difficult to create radio links with ground stations because the radio signals attenuate as the distance they travel increases. An alternate approach can use multiple satellites substantially evenly spaced in equatorial (or near equatorial) orbits at low altitudes. This would not add substantially to the cost of the system because of the low cost to manufacture and launch the satellites.

The above example requires a user (or an app on his or her device) to know the complete address information of a destination ground station. In an alternate embodiment a user associated with a particular ground node can send conventional emails to a user associated with another ground station. In this embodiment the sender inputs destination information in the familiar email format "recipient@internetserviceprovider.xxx." The user's device can include an app that knows the locations of the ISP's servers on the ground that have access to the ISP's email network. When the user uploads the email to the satellite, it will include the longitude and latitude of the ISP's servers, and when the satellite is in range of a server, it transmits the email as described above. The ISP then delivers the email using its network.

2. Single Satellite Messaging System—Polar Orbit

Figure 4:
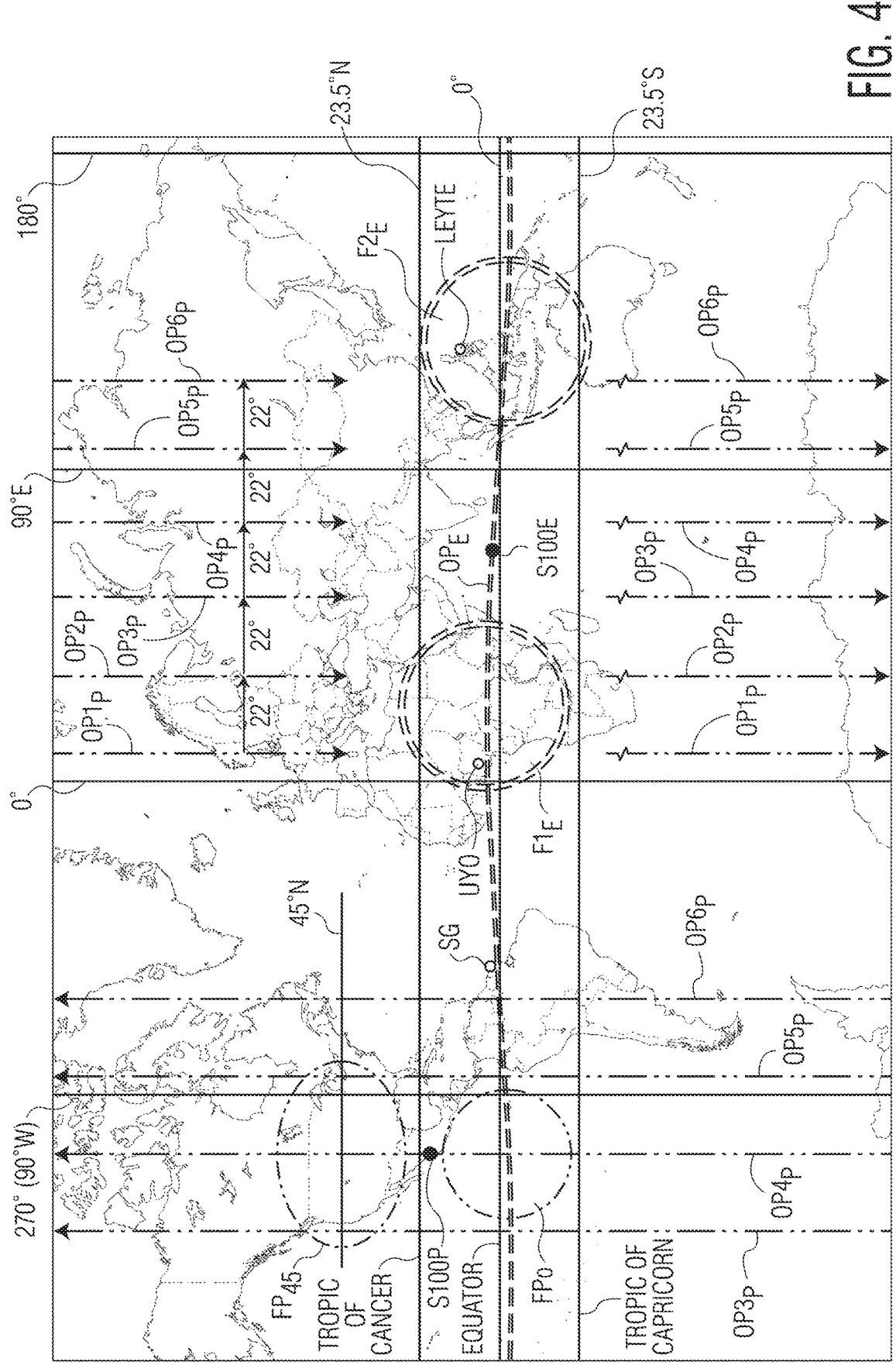
FIG. 4 is a Mercator projection of the earth and orbital paths of satellites like that shown in FIGS. 2 and 3 in systems for providing long distance electronic communications, wherein a first system embodiment comprises a single satellite in a low-earth equatorial orbit and a second system embodiment comprises a single satellite in a low-earth polar orbit.

FIG. 4 also depicts, in dash-two-dot lines, the ground tracks of a single satellite S100P launched in a substantially circular polar orbit at an altitude of 200 miles. At that altitude the satellite has an orbital period of about 91 mins., and will orbit the earth about 16 times every day, so that the ground track processes about 22° longitude in each successive polar orbital path $OP1_P$, $OP2_P$, $OP3_P$, $OP4_P$, $OP5_P$, $OP6_P$, etc. The ground track of the satellite over these six orbits is shown for a longitudinal swath that includes Uyo and Leyte. (The lines depicting these orbital paths are broken across the central latitudinal regions for clarity.) FIG. 4 also shows at the left the entire pole-to-pole orbital paths $OP3_P$, $OP4_P$, $OP5_P$, and $OP6_P$ on the other side of the earth (180° away from their respective counterparts to the right in the drawing). The 1,200-mile diameter footprint $FP_0$ at the equator is illustrated for the "left" leg of the orbital path $OP3_P$. (See Table 1; 200-mile high orbit.) The dash-two-dot circular area $FP_0$ depicts the footprint at the equator of the satellite S100P in orbital path $OP4_P$ and the shaded elongated segment $FP_{45}$ bounded by a dash-two-dot line depicts the satellite footprint in the same orbital path at 45° N latitude. (The satellite footprint is actually circular on the ground, but elongates in the drawing as the satellite travels away from the equator because of the distortion introduced by a Mercator projection.) It will be appreciated from FIG. 4 that every point on the surface of the earth "sees" the satellite S100P at least once every day.

Sending a message from Uyo, Nigeria, to Leyte, Philippines, can proceed in a similar fashion as described above in connection with a single satellite in an equatorial orbit. The user in Uyo uploads a message with address information that identifies the latitude and longitude of the Leyte subscriber's ground station. The message cannot be uploaded to the satellite until it is within sight of Uyo, which could be nearly 12 hours if the satellite has just passed out of sight of Uyo. It will be appreciated from the size of the footprint $FP_0$ that it could take up to six orbits, or about nine hours at 91 minutes per orbit (Table 1) for the satellite carrying the email to come within sight of the Leyte destination coordinates. Even though this is longer than the time required with the satellite in an equatorial orbit, placing the satellite in a polar orbit will enable communication between any two points on the earth's surface, not just a swath on either side of the equator. Moreover, the footprint $FP_{45}$ shows that at latitudes distant from the equator the satellite will be available to a large number of ground stations in populous areas such as North America and Western Europe in only one or two orbital passes. In fact, when the satellite receives a message it may also be in sight of the destination ground station.

In an alternate embodiment, a polar-orbit system can use an ISP's servers to send emails as described above, rather than waiting for the satellite to complete several orbits before it can transmit its message to a far distant destination ground stations. This will make a single satellite, polar orbit messaging system more attractive since in many cases it will substantially reduce the time it takes for an email to reach its destination.

Those skilled in the art will recognize that a single satellite orbiting in an orbital plane inclined relative to the equator will have certain advantages over systems in which it is in a 0° orbital plane (about the equator) or a 90° orbital plane (polar orbit). For example, the concomitant increase in coverage area would make it possible to transmit messages directly from a satellite to which the message was uploaded directly to a destination ground station, as discussed above, but serving a wider area. Increasing the number of satellites would make it more likely that these types of two-hop routes can be established not only over a given area (since more satellites may be able to receive messages from ground stations in that area), but also over more areas (since more areas will see at least one satellite at any given time).

The systems described in this section II.B. are very inexpensive and as noted lend themselves to private messaging systems in which users or small enterprises can launch a single satellite and limit use solely to system subscribers. However, the long potential latency periods (the time between when a user sends a message to the time it is received) in single satellite systems might be unacceptable to certain users. It is also somewhat impracticable for accessing and using the Internet for other purposes, but the described systems are fully scalable and can be made more functional for those applications simply by adding more satellites. Since the fabrication and launch costs of the satellites are minimal, even small enterprises can take advantage of the technology.

C. Multiple Satellite Communication Systems

This section II.C. discusses systems comprising multiple stochastically distributed satellites in orbits inclined at different angles relative to the equator. These types of systems can be used in a variety of applications, not just data communications. For example, deploying a satellite constellation and using data communication routing protocols in accordance with the principles discussed in this section can also support a space-based distributed ledger implementation described in the following section II.D.

1. Multiple Satellite Deployment Arrangements

Figure 5:
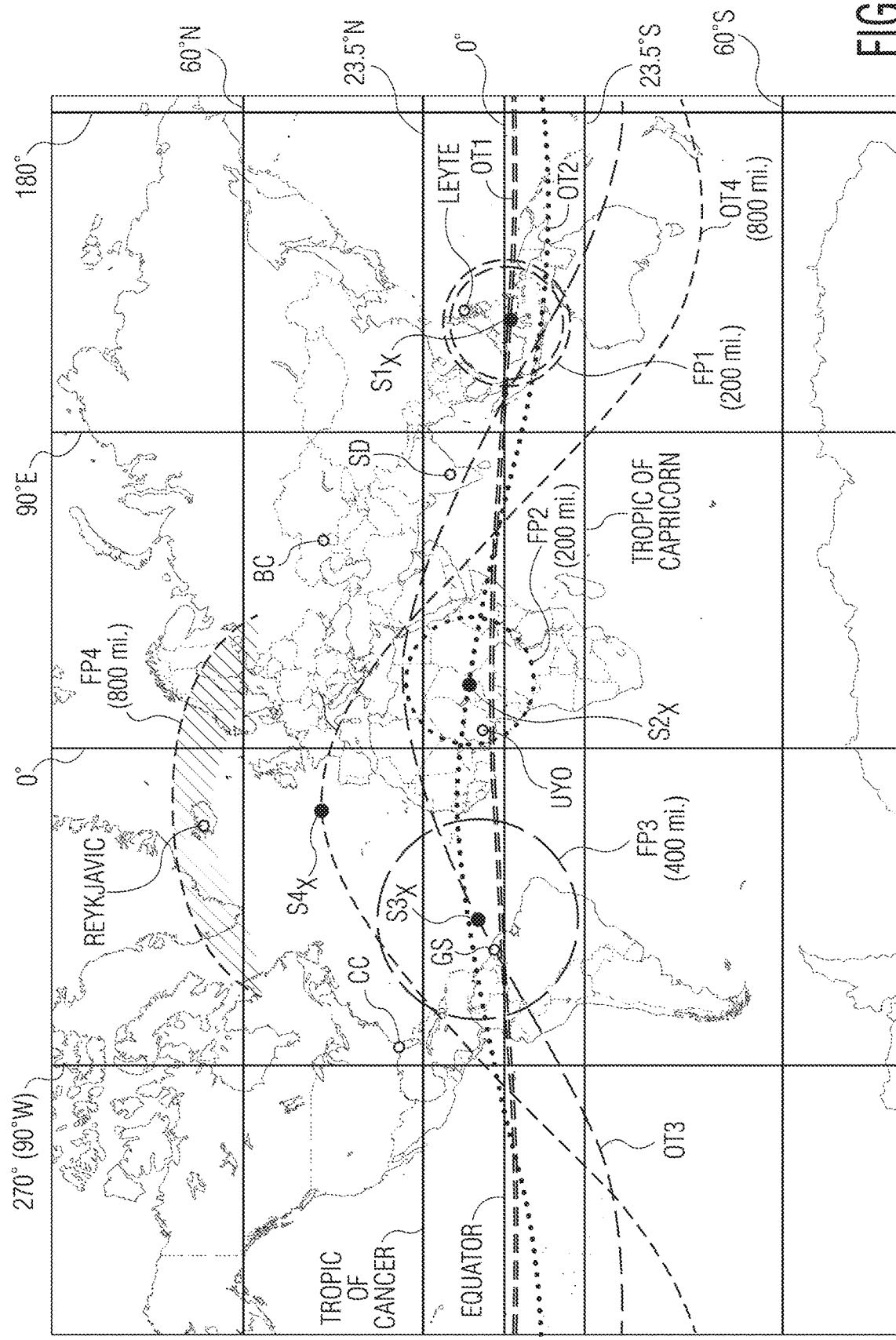
FIG. 5 is a Mercator projection of the earth showing the orbital paths of satellites like that shown in FIGS. 2 and 3 deployed at various altitudes in low-earth orbits with different inclinations relative to the equator that illustrates further system embodiments for providing data transmissions over long distances using constellations of multiple, stochastically distributed satellites.

FIG. 5 will be used to discuss exemplary systems using multiple satellites at different altitudes and orbital inclinations for reducing latency and increasing the functionality of the basic email system just described. The drawing shows satellites in four orbital tracks having different inclinations. A first orbital track OT1 shown in a double-dash line represents a satellite $S1_X$ deployed into a 200-mile altitude circular orbit about the equator from the Guiana Space Center (GS) at 5° N lat.; a second orbital track OT2 shown in a dotted line represents a satellite $S2_X$ deployed into a 200-mile altitude circular orbit from the Satish Dhawan Space Center (SD), India (13°N lat.); a third orbital track OT3 shown in a long-dash line represents a satellite $S3_X$ deployed into a 400-mile altitude circular orbit from Cape Canaveral (CC), Florida (28° N lat.); and a fourth orbital track OT4 shown in a short-dash line represents a satellite $S4_X$ deployed into a 800-mile altitude circular orbit from Baikonur Cosmodrome, Kazakhstan (45° N lat.). For purposes of illustration, Reykjavfk, Iceland, is also shown at 64° N lat. It will be appreciated that these are meant to be examples of orbital tracks that satellites in the present system can assume. The orbits may be either prograde or retrograde, and can likewise be circular or elliptical, or some satellites can be in one type of orbit and others in other types of orbits (that is, combinations of any of prograde, retrograde, circular, and elliptical orbits).

An exemplary embodiment, comprising 25 satellites of the construction shown in FIGS. 2 and 3 in each of orbit tracks OT1 and OT2 designed mainly to serve the equatorial region between the Tropics of Cancer and Capricorn, will be used to illustrate some of the basic principles of a first routing protocol for transmitting communications in a multiple satellite system. The satellites in the orbital tracks will process as discussed above in connection with FIG. 4, so that after a certain time they will appear to an observer on the ground to be randomly (stochastically) distributed in the sky. The length of time required to achieve stochastic distribution can be reduced by judiciously timing the deployment of the satellites in each orbital track, for example, by deploying satellites in a particular orbital track at substantially equal intervals. Although it may be theoretically possible using a sufficiently sophisticated algorithm to predict, or at least estimate, the satellites' locations as a function of time and thus predetermine deployment timing, it is not necessary in the present system to predict their locations relative to each other. That is because as a stochastic system it relies on probabilities to establish radio links between different aerial nodes and between aerial nodes and ground nodes. The satellites in the orbital tracks OT1 and OT2 have a footprint of 5,000,000 sq. mi. (see Table 1; 200-mile high orbit), represented by a double-dash circle FP1 for a satellite $S1_X$ in track OT1 (like orbital path $OP_E$ in FIG. 4) and a dotted circle FP2 for a satellite $S2_X$ in track OT2.

One consideration in systems using plural satellites in unconstrained, stochastic orbits is how many satellites are likely to be within sight of a given point on the earth's surface at any given time. In the present example the area of the swath of earth between the Tropics of Cancer and Capricorn is about 80,000,000 sq. mi. (40% of the earth's surface of about 200,000,000 sq. mi.). With a constellation of 50 satellites in orbital tracks OT1 and OT2, each satellite "covers" about 6.25% of that swath (5,000,000 sq. mi.÷80,000,000 sq. mi.), so that on average any one point on the surface between the Tropics will "see" at least three of the 50 satellites (50×0.0625=3). Concomitantly, the chance that a satellite will not be visible from any particular point on the earth between the Tropics is 93.75%. With 50 satellites, the probability that any given point on the earth in that region will not be able to see at least one satellite is only 0.937550% 0.040 (that is, about one in 25). In addition, the system is fully scalable by adding satellites to the constellation. For example, the probability that any given point on the earth will not be able to see at least one satellite drops to about one in 600 if the constellation comprises 100 satellites ($0.9375^{100} \approx 0.0016$), and to one in over 400,000 if the constellation includes 200 satellites.

The number of other satellites that any given satellite can "see" is also an important factor in assembling a multi-satellite radio route. In the present embodiment, each satellite can theoretically "see" about 2,600 miles over the horizon (2×DH from Table 1). Since interference from ground structures at a given satellite's horizon EH may reduce that distance, 2,400 miles would be a more conservative estimate. The area of a circle with a radius of 2,400 miles is about 18,000,000 sq. mi., which is 22.6% of the 80,000,000 sq. mi. area traversed by the 50 satellites in the system, which means that on average any given satellite sees at least 11 other satellites in the constellation (22.6% of 50). Even if the antenna structures illustrated in FIG. 2 can only cover 60% of the satellite's spherical surface (due to constructional limitations such as the need to provide sites for mounting the solar panels), it is likely that antennas can be paired between a particular satellite and at least one of the 11 other potentially available satellites. (Section III. further below, describes satellite and antenna constructions that facilitate antenna pairing between system nodes, including satellite-to-satellite radio links.) Moreover, increasing the number of satellites in the constellation would correspondingly increase the probability of being able successfully to pair an antenna in one satellite with an antenna in another.

Important characteristics of the present system include, but are not limited to, its ability to be scaled up to more complex systems incorporating more satellites and other types of aerial nodes at different altitudes, its ability to accommodate a wide variety of deployment strategies, and its ability to compensate for orbital decay and satellite failure. Additional satellites can be also deployed in higher orbits to increase their surface footprint and the distance from which they can see other satellites. In addition, the system remains functional as satellites' altitudes decrease due to the inevitable decay in their orbits because of the drag caused by the atmosphere. Replacement satellites can be launched at low cost because they are inexpensive to manufacture and do not have to be deployed in any particular location relative to those already in orbit. Thus as satellites fail, they can be cheaply replaced without affecting the operation of the system, making satellites used in the systems described in the present disclosure essentially disposable, while the system remains operational even if satellites are lost.

Those skilled in the art will readily recognize that the routing protocols and principles described below in connection with the present example of a constellation of satellites S1 and $S2_X$ (x=25) in orbital tracks OT1 and OT2 are applicable to a system with satellites following other orbital tracks at other altitudes. FIG. 5 also shows a constellation with multiple satellites $S3_X$ in the third orbital track OT3 and multiple satellites $S4_X$ in the fourth orbital track OT4. A satellite $S3_X$ in track OT3 will have a footprint of about 10,000,000 sq. mi., represented by the long-dash circle FP3, and will see other satellites at distances up to about 3,500 mi. (Table 1; 400-mile high orbit). A satellite $S4_X$ in track OT4 will have a footprint of about 21,000,000 sq. mi., represented by a short-dash elliptical segment FP4, and will see other satellites at distances up to about 5,000 mi. (Table 1; 800-mile high orbit). In particular, the shaded area associated with the footprint of the satellite $S4_X$ shows that a satellite launched from a sufficiently northerly location and at a sufficient altitude will enable transmissions to and from ground stations in very northerly (and southerly) terrestrial latitudes. It will be clear from the description that follows that the routing protocols described herein will support communications with a constellation including satellites in these types of more highly inclined orbits and thus enable reliable data transmissions between virtually any two points in the entire populated regions of the globe.

2. Route Creation and Data Transmission Protocols

As noted, the basic principles underlying the route creation protocols for a multi-satellite system will be described first in connection with the constellation of 50 satellites in the 200-mile high circular orbits OT1 and OT2. Although the system can incorporate satellites orbiting at higher altitudes, satellites in lower orbits will provide an advantage in terms of requiring less power to make radio links with ground stations. For example, a decrease in altitude from say 400 miles to 200 miles can provide a power advantage of as much as 6 dB. Moreover, even though the orbits of lower altitude satellites will decay faster because of atmospheric drag, the satellites used in the present system can be made small enough to quickly burn up as they enter farther into the atmosphere.

Since on average three satellites will be visible to any ground station (see above), there is a reasonable likelihood that a radio signal can be immediately uploaded from a ground station within the covered swath between the Tropics to a satellite overhead, or at most with only a short delay. (As noted, the more satellites there are in the constellation, the greater the probability that at least one satellite will be available to receive this transmission in real time.) The radio signal transmitting data will typically be in packet form, with content in a payload portion and destination information in a header or trailer portion.

Routing Protocols for Data Transmissions.

The data transmission routing protocol described herein enables data transmissions that in general require less computing power and thus reduce satellite battery consumption. Data transmissions are sent from satellite to satellite over radio links between antenna-to-antenna pairs in satellites using the basic satellite design shown in FIGS. 2 and 3. The radio links are created by the antenna pairing circuitry included in the route creation modules 46 in the respective satellites. Section III.C. below describes an embodiment including novel satellite and antenna configurations for creating radio links between system nodes that aid in effecting the routing protocols discussed here.

In the present embodiment the area of the earth served by the system (in this example, the swath of the earth between the Tropics) is divided into zones, the number of which is somewhat arbitrary. The zones should be large enough to maximize the probability that at least one satellite will be in every zone at any given time; that is, the size of the zones is chosen based at least in part on the number of satellites in the system and the extent of the earth's surface they traverse. The present example divides the swath between the equator and each of the Tropics of Cancer and Capricorn into 20 substantially rectangular zones. The circumference of the earth at the equator is about 25,000 miles and the distance from the equator to each of the Tropics is about 1,600 miles. Each zone thus has an area of about 2,000,000 sq. mi. (1,250 mi.×1,600 mi.). Each of the resulting total of 40 zones is assigned a unique identifier, such as consecutive numbers, and every ground node is assigned unique address information. In addition, each ground node in the system stores location information that identifies the number of the zone where it is located. In an alternate arrangement, the ground nodes can store the latitudinal and longitudinal boundaries of the zone. The satellites refresh their geolocations at short intervals. In the embodiment described here the routing protocol builds two routing networks, a local area routing network and a wide area routing network.

Figure 6:
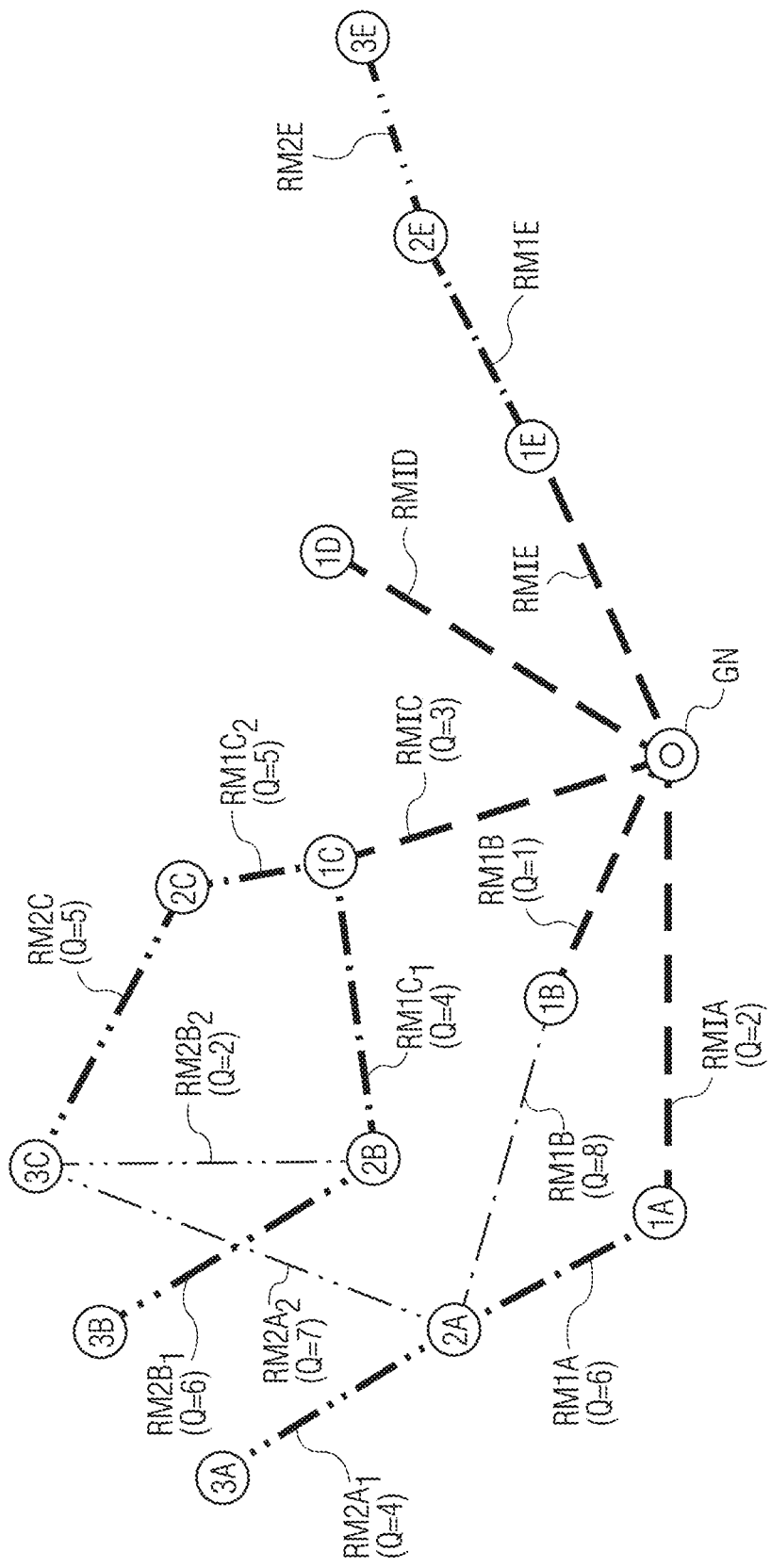
FIG. 6 is a schematic diagram illustrating a local area routing network comprising radio links created to transmit data to a ground node in a long distance system embodiment comprising multi-satellite constellations like those depicted in FIG. 5.

In the present routing protocol, every ground node in the system creates a local area routing network defining a route to itself as a destination for data transmissions. Referring to FIG. 6, creation of a local area routing network to a particular ground node GN begins with continuous transmission of initial routing messages RMI into space at predetermined intervals, typically about once every four seconds. If a particular ground node is a permanent terrestrial ground station with an array of directional antennas, it will transmit high-power beams in every direction, that is, over the entire hemispherical area surrounding the ground station. Typically, such ground stations will have virtually unlimited power, which will increase the likelihood that the initial routing message will be received by at least one satellite in the orbiting constellation. When a satellite receives an initial routing message RMI from the initial ground node GN, it initiates the creation of the local area routing network by noting (that is, storing) certain information contained in the initial routing message. This includes ground node address information, which comprises a zone portion that identifies the zone in which the ground node is located, and a unique address portion that includes unique address information associated with each individual ground node. The satellite that receives initial routing messages also determines the quality Q of the initial routing message, as described further in the paragraph that follows. A satellite that receives the initial routing message from the initial ground station is referred to for convenience as a "first order satellite." The antennas in the satellite have unique identifiers, and each first order satellite stores the identity of the antenna on which it received the initial routing message and the ground node address information associated with the ground node GN. The links between the first order satellites and the ground nodes are denoted by heavy dashed lines in FIG. 6. The satellites' antenna pairing circuitry only accepts initial routing messages RMI from ground nodes in the zone where the satellite is located. As noted above, zone size is chosen in view of the number of satellites and the system's area of coverage to increase the likelihood that at least one satellite will be every zone and thus enable a local area network to be assembled for every zone.

FIG. 6 illustrates local area route creation for five first order satellites 1A, 1B, 1C, 1D, and 1E. In the drawing the initial routing messages are referred to by the reference "RMIX," where "X" is the first order satellite that received the routing message. It will be appreciated that in an actual system there can be many more satellites that receive initial routing messages, as well as many satellites in the zone of a ground node that do not receive initial routing messages. The quality Q of each initial routing message, as determined by the receiving first order satellite, is given in parentheses with each routing message. The quality Q is a quantitative parameter that indicates the desirability of a radio link between two nodes for supporting internodal data transmissions as described further below. In the present system Q is the measured signal strength. Other implementations are possible, such as including error coding data in a routing message and then assessing the extent to which the routing message includes erroneous data. However, measured signal strength is one preferred parameter because it does not require including additional data in the routing messages that will increase the bandwidth, power, and time required for their transmission.

In the next step in creating the local area routing network all of the first order satellites send first order routing messages on all of their antennas. The first order routing messages include the ground node address information and the quality of the initial routing message. A satellite receiving a first order routing message is referred to as a second order satellite. The drawing shows four second order satellites 2A, 2B, 2C, and 2E. Consistent with the terminology noted above, the first order routing messages are referred to by the reference "RM1X," where "X" is the second order satellite that received the first order routing message. Routing messages received by second order satellite are indicated by dash-one-dot lines. Each second order satellite notes the identity of the antenna on which it received the first routing message. The second order satellites also determine the quality Q of the received first order routing message.

FIG. 6 illustrates the operation of the routing protocol in the event a satellite such as second order satellite 2A receives two routing messages that identify the same ground node. Say satellite 2A received a first order routing message RM1A on antenna $A_X$ and a first order routing message RM1B on antenna $A_Y$. Although RM1B has a higher quality (Q=8) than RM1A (Q=6), a route to the ground node GN through the satellite 1B would include link RM1B with a quality Q=1. Applying the principle that "a chain is only as strong as its weakest link," the satellite 2A will store the antenna $A_X$ on which it received the first order routing message RM1A (Q=6) since the other potential route to the ground node GN would include the link RM1B with a lowest quality (Q=1), even though the sums of the qualities of the links RM1B (Q=8) and RM1B (Q=1) is higher. That is, the satellite 2A discards (doesn't store) the antenna on which it received a routing message with the lowest quality (lowest signal strength) from among the initial and first order routing messages, and stores the identity of the antenna receiving the other first order routing message. This subroute is denoted by the heavy dash-one-dot line denoting the link established via the preferred first order routing message RM1A. Discarded potential links are denoted by non-bold dash-one-dot lines. The second order satellite stores the identity of the chosen antenna $A_X$, the quality Q of the lowest quality routing signal (RM1A) received on that antenna (Q=2), and ground node address information of the ground node GN to which it has a route. In some cases, the first order routing messages are not received by any satellites, an example being satellite 1D in FIG. 6. In that case, the local area routing network through that satellite only has a single link.

The second order satellites then send second order routing messages on all of their antennas. A second order routing message will include the ground node address information and the lower of the qualities Q of the respective initial and first order routing messages linking the first and second order satellites and the first order satellite and the ground node. In FIG. 6 the second order routing messages are referred to by the reference "RM2X," where "X" identifies a satellite ("third order satellite") that received a second order routing message. Taking as a first example, two of the second order routing messages transmitted by the satellite 2A are received by two respective third order satellites 3A and 3C. The satellite 3A receives the second order routing message RM2A and the satellite 3C receives the second order routing message $RM2A_2$. Since the only potential route from the satellite 3A back to the ground node is through satellite 2A and 1A, the third order satellite 3A stores the identity of the antenna on which it received the routing message $RM2A_1$ and the ground node address information of the ground node GN. The potential links established via the second order routing messages are denoted by dash-two-dot lines, with chosen links in bold.

The satellite 3C received three second order routing messages: $RM2A_2$, $RM2B_2$ ($RM2B_1$ was received by the satellite 3B), and RM2C (from second order satellite 2C). The routing message $RM2A_2$ includes the quality (Q=2) of the initial routing message RM1A, as explained above. The routing message $RM2B_2$ from the satellite 2B includes the quality (Q=3) of the initial order routing message RM1C from the satellite 1C to the satellite 2B, since that is the lower of the qualities Q of $RM1C_1$(Q=4) and RM1C (Q=3). The routing message RM2C from the satellite 2C includes the quality (Q=3) of the initial order routing message RM1C from the satellite 1C to the satellite 2B, since that is the lower of the qualities Q of $RM1C_2$ (Q=5) and RM1C (Q=3). The satellite 3B determines the quality of each of the received second order routing messages and the qualities of the weaker links through the second and first order satellites to the ground node. The satellite 3C thus chooses the subroute through the satellite 2C established by RM2C because the lowest quality in the links back to a first order satellite via that route is Q=3 (RM1C), as compared to Q=2 for both of the routing messages $RM2B_2$ and RM1A. The satellite 3C stores the antenna on which it received the second order routing message RM2C and the ground node address information of the ground node GN.

The principle underlying the choice of preferred radio subroutes back to the ground node from third order satellites can be stated in general terms via an understanding of the algorithm used by the satellites' route creation circuitry to choose a preferred third order routing message on which to base the subroute. The route creation circuitry of each third order satellite makes two determinations. One, it determines the quality of each second order routing message received from a respective second order satellite and matches it with the lower link quality included in the associated second order routing message: $RM2A_2$ (Q=7) matched with RM1A (Q=2); $RM2B_2$ (Q=2) matched with RM1C (Q=3); and RM2C (Q=5) matched with RM1C (Q=3). Two, it identifies a preferred second order routing message representing a second subroute from the third order satellite to the terrestrial node via a first order satellite. This second subroute comprises a third radio link between the third order satellite and the second order satellite associated with the preferred second order routing message. In this instance, the preferred third order routing message is RM2C because all of its links have a higher quality than any first, second, or third radio link associated with any other received second order routing message; that is, the links in the subroute through RM2C, RM1C2 and RM1C all have qualities higher than the lowest quality link in the other possible subroutes (Q=3 for RM1C vs. Q=2 for RM1A and $RM2B_2$). The satellite memory stores the identity of the antenna on which the preferred third order routing message was received and the address information associated with the ground node.

It will be understood by those skilled in the art that the local area routing network depicted in FIG. 6 is somewhat idealized in that it shows the network fanning out geographically from the ground node. While this facilitates the description of how the local area network associated with a ground node is created, the stochastic distribution of the satellites and the long distances separating them might in some instances result in a higher order satellite being closer to a ground node than a lower order satellite with which it is linked. However, it will be clear from the description that follows below that local area routing networks with that type of topology will still serve to direct data transmissions to the initial ground node. In that same vein, it is possible for routing messages of a given order to be received by satellites already identified as part of a route back to the ground node. In that case, the receiving satellite will already have stored the unique address of the originating ground node and would ignore that routing message. That is, the different order routing messages are sent successively in respective time slots set via access to the master clock of a cooperating GNSS system clock by the satellites' Global Navigation Satellite System (GNSS) modules 44. Thus, if a given satellite has already received a routing message as discussed above, it ignores subsequent routing messages.

The local area routing network is not limited to three tiers of satellites. It can be extended to four or more tiers built out in the same manner described above. However, it is believed that a three-tier system will serve the purpose of directing data transmissions to ground nodes without requiring an undue amount of time, computing power, or bandwidth, as will become clear as this description proceeds. In an optional variation any subroute with a link below a certain threshold value of Q will not be stored. For example, if the threshold value is Q=3, the information (antenna identities and values of Q) relating to the subroutes from the satellites 1A, 2A, and 3A, and from 1B shown in FIG. 6 will not be stored and that subroute would not be established.

In a preferred routing protocol a wide area routing network is created autonomously by the satellites to account for data transmissions uploaded to a satellite from an originating ground node and addressed to a ground node that is not served by a local area network including that satellite. The wide area routing networks are built using the same principles described above for creating the local area routing networks, by using series of routing messages, dropping low quality potential links, and storing the identity of an antenna on each satellite that received a routing message used to identify a preferred link with another satellite. A principal difference from the local area routing networks is that the wide area routing networks are zone-based, in that their purpose is to establish optimized routes toward the zone to which the uploaded data transmission is directed. In addition, they are initiated by the satellites and not the ground stations.

Every satellite in every zone creates a wide area routing network to itself. The process starts when an initiating wide area satellite sends on all of its antennas an initial wide area satellite routing message indicating its geographic location using the same format as the zone portion in the ground node address information. The satellites that receive the initial wide area satellite routing messages send second wide area satellite routing messages that include the zone of the initiating wide area satellite and the signal strength of the received first wide area satellite routing message. Wide area route creation proceeds in the same fashion as described in connection with FIG. 6 for a predetermined number of tiers, preferably at least three, although more can be established in a given system. Every satellite in a wide area network includes the zone of the initiating wide area satellite and the antenna to use to send a data transmission to the next satellite in the network leading toward that zone. There will be a certain amount of duplication of the transmissions and calculations employed in creating the local area routing networks, for example, when a satellite that is part of a local area network begins the process of creating a wide area network.

Data Transmissions Using Local Area and Wide Area Routing Networks

This description will use as an example a data transmission from an originating ground node comprising packets of data with a header including destination information associated with a destination ground node. One component of the destination information is location information such as the zone number of the destination ground node. The destination information also contains the unique address information associated with that particular destination ground node.

Figure 7:
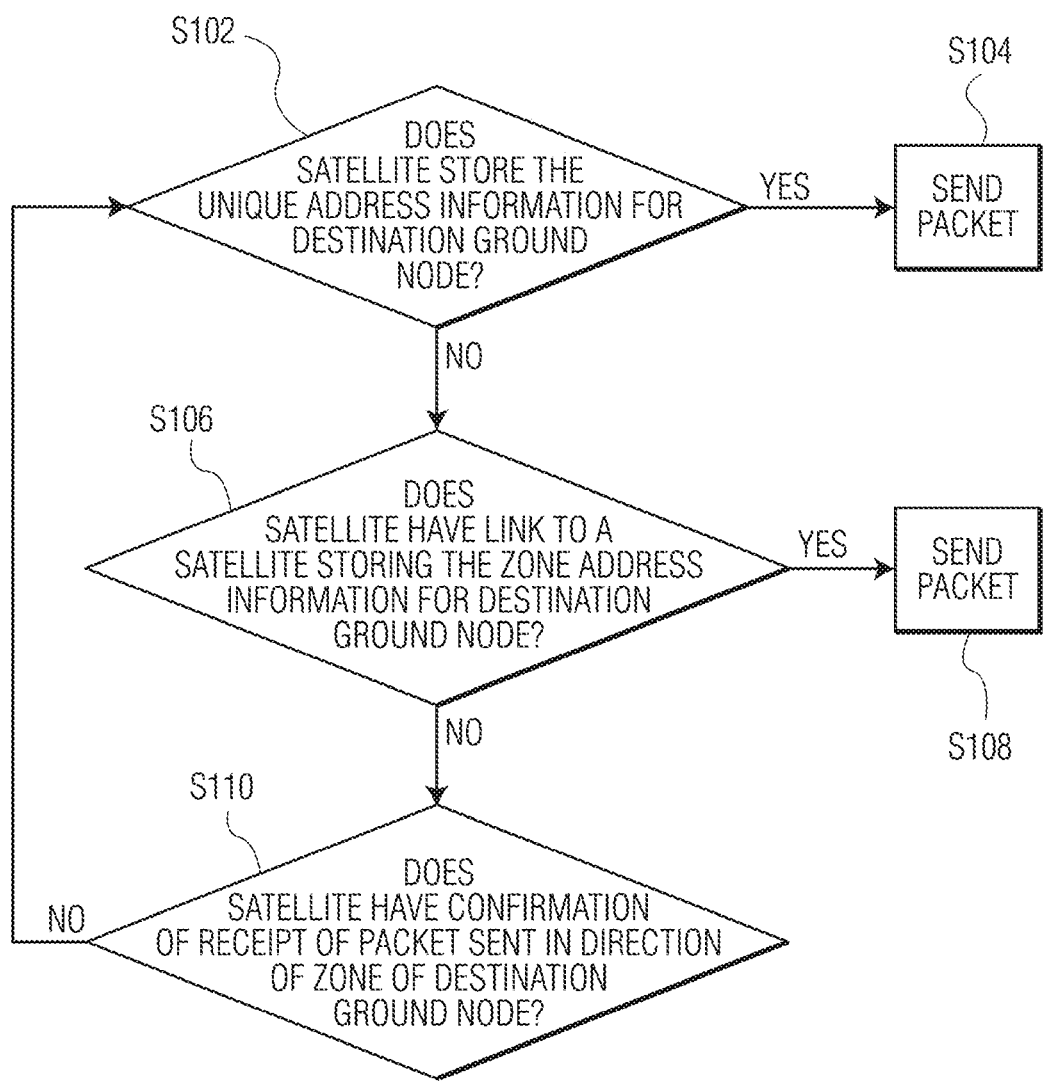
FIG. 7 is a flowchart illustrating a recursive logic method using routing protocols described herein, including the local area routing network illustrated in FIG. 6, for transmitting data to a destination ground node via a long distance, multi-satellite constellation.

The data transmission process in general will be explained by reference to the flowchart in FIG. 7, which shows how any satellite in the system processes a packet of data onboard the satellite and having address information (zone and unique ground node address) for transmission to a destination ground node. The destination ground node for a data transmission corresponds to the initial ground node in the description of the local area routing network route creation discussed above. It will be appreciated that a satellite will typically have onboard a large number of packets addressed to myriad destinations. FIG. 7 represents how data transmission circuitry in the satellite's data movement module processes an individual packet of data. The packets can be processed in any order, but in one implementation a packet would be time stamped when it is received and the packets processed in time-sequential order.

In step S102 the data transmission circuitry in the satellite holding the packet determines if one of its antennas was paired with an antenna at the destination ground station with the unique address included in the packet. In other words, if the packet being processed by the satellite includes a unique address portion matching the unique address portion stored by the satellite, it means that the satellite is in a local area network associated with the destination ground node and the answer in the step S102 is YES. As explained above in connection with FIG. 6, all of the satellites in the tiers of a local area network leading to a particular destination ground node will have in their memories paired antennas that will transmit the data to the destination ground node. In step S104 the packet is transmitted accordingly.

In a second part of the step S102, the data transmission circuitry in the satellite determines if it is linked to a satellite in a local area routing network leading to the destination ground node addressed by the packet. As part of the routing protocol, all of the satellites in all of the local area networks transmit announcement routing messages from all of their antennas a short time after the local area and wide area networks have been refreshed (which is typically every one to four seconds). The announcement routing messages include the ground node address information stored by the transmitting local area satellite. A satellite that receives an announcement routing message first determines if it has in its memory the same unique address portion included in the announcement routing message. If so, it means that the receiving satellite is already in the local area network associated with the destination ground node and it ignores the announcement routing message. If the receiving satellite has not already stored the unique address portion associated with the destination ground node, it stores the antenna on which it received the announcement routing message and the unique ground node address information. The receiving satellite also determines the quality Q (e.g., signal strength) of the received announcement routing message. If the satellite receives announcement routing messages on more than one antenna, it stores the identity of the antenna that received the highest quality announcement routing message. If the satellite is thus connected via an announcement routing message to a local area network satellite associated with the destination ground node, the answer to the second part of the step S102 is YES, and the packet is sent accordingly in the step S104. (In an alternate approach, the announcement routing messages can include the quality information stored by the satellite sending the announcing routing message and the receiving satellite can choose the route to the ground node in accordance with the principles used to assemble the local and wide area networks.)

If the answer in the step S102 is NO, the process proceeds to the step S106, in which the satellite holding the packet determines if it has in its memory zone information matching the zone information in the packet being processed. That is, if the satellite processing the packet is part of a wide area network including a satellite in the zone of the destination ground station, the answer in the step S106 is YES. This indicates that the satellite holding the packet for transmission has identified an antenna paired with a satellite having a route to the zone with the destination ground station, and in step S108 the packet is transmitted on the antenna identified as part of the creation of the wide area routing network. In other words, the step S108 transfers the packet to the next satellite in the wide area network leading to the zone where the destination ground node is located. It will be appreciated that the second part of the step S102 is optional, in that it serves to increase the probability that one of the satellites in a wide area routing network associated with a destination zone will "find" a satellite in a local area network associated with the destination ground node in that zone. However, the data transmission process can also rely on the likelihood that a satellite in a wide area network associated with a particular zone will also be part of a local area network of a destination ground node within that zone, particularly considering that the networks periodically refresh themselves and almost certainly will include different satellites each refreshing cycle.

If the answer in the step S106 is NO, the satellite holding the packet uses a vector routing approach to send the packet in the direction of the zone of the ground node per the ground node address information in the packet header (or trailer). In step S110 the satellite waits for a confirmation signal from another satellite that it has received the packet. (The receiving satellite will return the confirmation signal using the antenna on which it received the packet) If a confirmation signal is not received within a short time substantially less that the network refresh interval (one to four seconds), the answer in the step S114 is NO, and the packet is placed in back in the queue for reprocessing starting with the step S102. In a preferred embodiment the packets can be held in a database accessed in a predetermined pattern. If no confirmation signal is received in the step S110, the packet remains in the database for subsequent access according to the predetermined pattern.

The recursive, hierarchical logic governing data transmission protocols will enable every satellite to essentially perform the same programming steps and greatly simplify data transmissions throughout the system. It also accounts for the probabilistic underpinning of the system by examining each data packet to determine the manner in which to route the packet to its destination in accordance with the hierarchy depicted in the flowchart of FIG. 7. It is expected that every satellite holding a data packet will be able to forward it to its destination virtually instantaneously, while still accounting for the probabilistic nature of the system's reliance on a constellation of stochastically distributed satellites by holding a packet for the short time a satellite receiving it might not have on board a route to its destination. Although there will be a large number of local area and wide area routing networks, each satellite in the system only needs to know a local area route to a destination ground node and a wide area route to the zone of a distant destination ground node if it has not stored a local area route to the destination. This minimizes the computing load on the individual satellites and concomitantly reduces power consumption. Alternate routing approaches and discussed below further facilitate route creation and data transmission.

Figure 8:
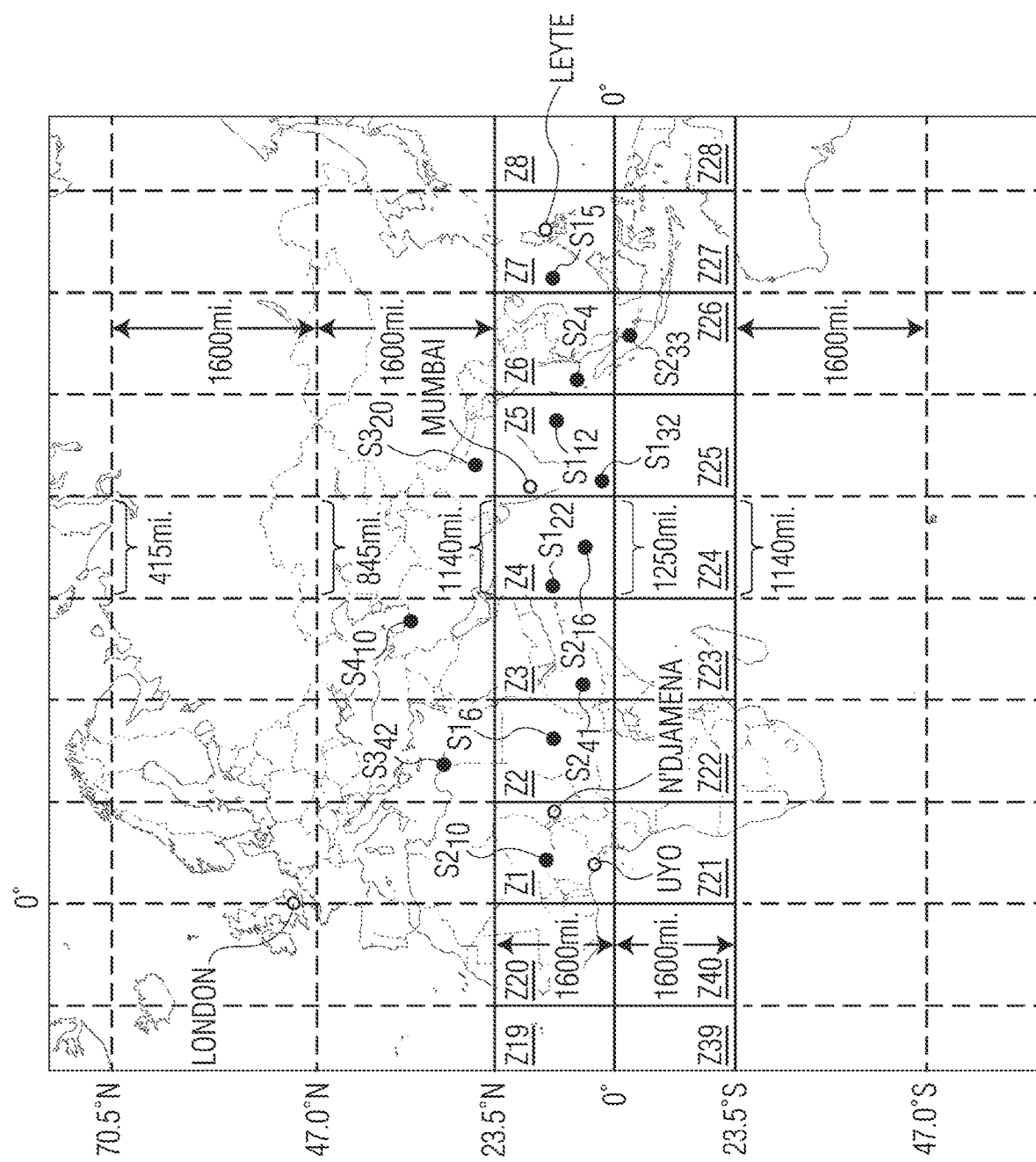
FIG. 8 is a world map showing satellite and ground node locations used to describe exemplary applications of the routing protocols described in connection with FIGS. 6 and 7.

FIG. 8 will be used to explain some examples of data transmissions utilizing the diagram in FIG. 6 and the flowchart in FIG. 7. In a first example, a user in Uyo desires to send a message to a user in N'Djamena, Chad. If the satellite $S2_{10}$ received the data transmission from the Uyo user's ground node and it is a first order satellite (FIG. 6) with respect to the N'Djamena user's ground node (step S102), the satellite $S2_{10}$ transmits the message packet-by-packet directly to the N'Djamena ground node (step S104) using the antenna identified during route creation as discussed above. Note that if the satellite SU received an initial routing message from the N'Djamena ground node, it will not be a first order local area satellite associated with N'Djamena because satellite $S1_6$ is not in the same zone. However, the satellite $S1_6$ could be a second order satellite (FIG. 6) in a local area network associated with the N'Djamena ground station and including the satellite $S2_{10}$, even though N'Djamena and the satellite $S1_6$ are in different zones. In that case, if the satellite $S1_6$ has onboard a packet from Uyo with a unique address portion associated with the N'Djamena ground node, it can send it to N'Djamena via the satellite $S2_{10}$ (step S104). In all cases the packets in the data transmission are processed separately and then assembled in the proper order when all of the packets arrive at their destination. The packets in a given data transmission may be sent via different routes since the routes refresh periodically. In accordance with known practice, the packets include suitable sequencing information and error coding to allow the packets to be properly reassembled as the packets of a single data transmission arrive at their destination.

In a second example, a user in Uyo wishes to send an email or other communication to a server at a particular ground station in Mumbai, India. The communication will, as stated, be in packet form wherein each packet includes ground node address information comprising a zone portion that identifies the zone of the destination ground node and a unique address portion that includes unique address information associated with the destination ground node. Assume that the data transmission is uploaded only to the satellite $S2_{10}$ and that that satellite is not part of a local area network associated with the destination Mumbai ground station. In that case the satellite $S2_{10}$ first determines if it has onboard a link to a satellite that is in a local area network leading to the Mumbai ground node, as indicated by any announcement routing messages it may have received from satellites in that local area network. In other words, the satellite $S2_{10}$ compares the ground node address information in the data transmission packet to the ground node address information stored in the satellite (step S102). If the answer is YES, the satellite $S2_{10}$ sends the packet on the antenna associated with the received announcement routing message (step S104).

If the satellite does not have in memory ground node address information that includes unique address information associated with the packet's unique ground node address, the satellite $S2_{10}$ determines if it has in its memory ground node address information with a zone portion the same as the zone address information in the onboard packet (zone Z5). In other words, the determines if it is in a wide area routing network associated with the Mumbai zone Z5 by noting that the packet's destination zone is the same as the zone to which the wide area network including the satellite $S2_{10}$ is connected (step S106). If so, sends the packet via the antenna identified in the creation of that wide area routing network (step S108). Note that every satellite that receives a packet, whether from a ground node or another satellite, will process it according to the flowchart in FIG. 7. The probabilistic nature of the system, combined with the fact that every ground station will have an extensive local area network associated with it, ensures almost to a certainty that a satellite in a wide area network to a particular zone will be able to connect to a satellite to a local area network associated with a particular ground station in that zone.

As another example consider a data transmission from Uyo destined for a ground station in Leyte. Assume that the data transmission is uploaded to only to the satellite $S2_{10}$ and that satellite is not associated with any local area or wide area network associated with the Leyte ground station. In that case the satellite $S2_{10}$ sends the data packets on its antennas facing generally towards the zone Z7 where the Leyte ground station is located. In one preferred embodiment the antenna beam width is ±30° around a vector in the direction of the Letye zone. The satellite $S2_{10}$ waits for an acknowledgement from a satellite receiving the packet. If no confirmation is received, the packet being processed is placed back in the queue to be reprocessed starting with the step S102, as denoted by the arrow "NO" in FIG. 7. Again, the probabilistic nature of the system will act to reduce or eliminate the time a satellite will have to hold a packet and thus keep to a minimum delays in delivering packets comprising a data transmission to their destination.

In one variation of the system just described, the zone boundaries can be adjusted to facilitate data transmissions to areas of large population densities, such as urban areas. For example, if a zone boundary would otherwise divide a metropolitan area like New York City or Mumbai into more than one zone, the boundaries can be adjusted to encompass as many ground nodes in that area as is practicable into one zone. This will have the potential to require fewer of the steps shown in FIG. 7 for packets directed to such areas by increasing the number of ground stations in these types of densely populated areas served by a single local area routing network.

The probabilistic nature of the system also might cause minimal delays in uploading data transmissions to the satellite constellation. For that reason, a ground node in a preferred embodiment will transmit the data packets sequentially. In one implementation the ground node can hold packets receipt of which has not been confirmed by a satellite by returning a confirmation signal and send them again in accordance with a predetermined timing scheme. The low 200-mile altitude of the satellites in the present system also increases the probability of successfully uploading the data packets into the satellite constellation. Moreover, the scalability of the system permits additional satellites to be deployed as part of the system if latency times are deemed unacceptable for a given system. That is, for minimal expense a system operator can deploy 50 or 100 or more additional satellites because the satellites are inexpensive to manufacture and launch.

As a final step in a data transmission, a destination ground node that successfully receives all of the packets of a particular data transmission uploaded to an originating satellite can optionally send an acknowledgement transmission to the originating ground station. Such an acknowledgement would typically be sent automatically, in the same format as the original data transmission, that is, as one or more packets of data with a header or trailer including destination information leading back to the originating ground station and a content portion with the acknowledgment. The acknowledgment message would be transmitted back to the originating ground node using the same routing protocols as the original transmission described above.

The routing protocols described above significantly reduce the amount of data that must be transferred between satellites for long distance transmissions in space-based systems that require satellite-to-satellite communication. It does so by distributing routing calculations among the satellites rather than requiring every satellite to know every route to every ground node in the system. This novel approach reduces by orders of magnitude the time and battery power required for data transfers, and is one of the features of the system that make practicable a space-based system with satellites that do not need to be maintained at fixed geolocations and precise attitudes to support worldwide data transmissions. In addition, the scalable nature of the system permits incremental improvements in system performance at minimal cost.

Additional Optional Modifications

The routing protocols and data transmission methods discussed above can be implemented in a variety of ways. One is by a group of individual users each with their own ground station. In another application the system can be adapted for receiving messages addressed to a group of subscribers served by a single cellular telephone tower, such as might be the situation on a small island or otherwise isolated location. In that case, the system would have a ground node that would direct messages to the cellular tower. The ground node address information in this type of system would include the intended subscriber's telephone number so that the cellular system could direct them accordingly. This same type of system could be incorporated into a more conventional cellular system with multiple towers serving a large area. In that case one or more ground nodes could serve the entire system, whereby a ground node receiving a data transmission could introduce it into the cellular system to be handled like any other transmission. Another variation could include one or more ground stations that comprise a hub such as a WiFi router accessible to multiple users.

The above routing examples require a user to know the complete address information of a destination ground station. In an alternate embodiment a user associated with a particular ground node seeking to send an email to a user associated with another ground station can input to an electronic device destination information in the familiar email format "recipient@internetserviceprovider.xxx." When the user sends the email from her device, the device will know the ISP server's address information and, if necessary, the user's ground station can add to the email the zone where the ISP server is located. The transmission is directed to the ISP server using the present system, and the ISP sends the email by conventional means to the email destination.

One enhancement to the routing protocol above can take advantage of its ability to group data packets en route to a particular destination with other onboard data packets directed to the same zone. For example, assume a satellite has onboard a data packet en route to a particular zone. In a practical application it is likely to happen that many data packets in different transmissions being processed by a single satellite are destined for the same zone. To make the data transmission more efficient a satellite can sort the packets it has on board by their destination zone and then transmit them per the method described above in connection with FIG. 7. Those skilled in the art will understand that this sorting process can be performed in numerous ways, such as using a relational database. This enhancement in which packets in different data transmissions with destinations to the same zone are grouped for transmission even further reduces the computing capacity and power consumption required to implement data transmissions in the present system.

Figure 9:
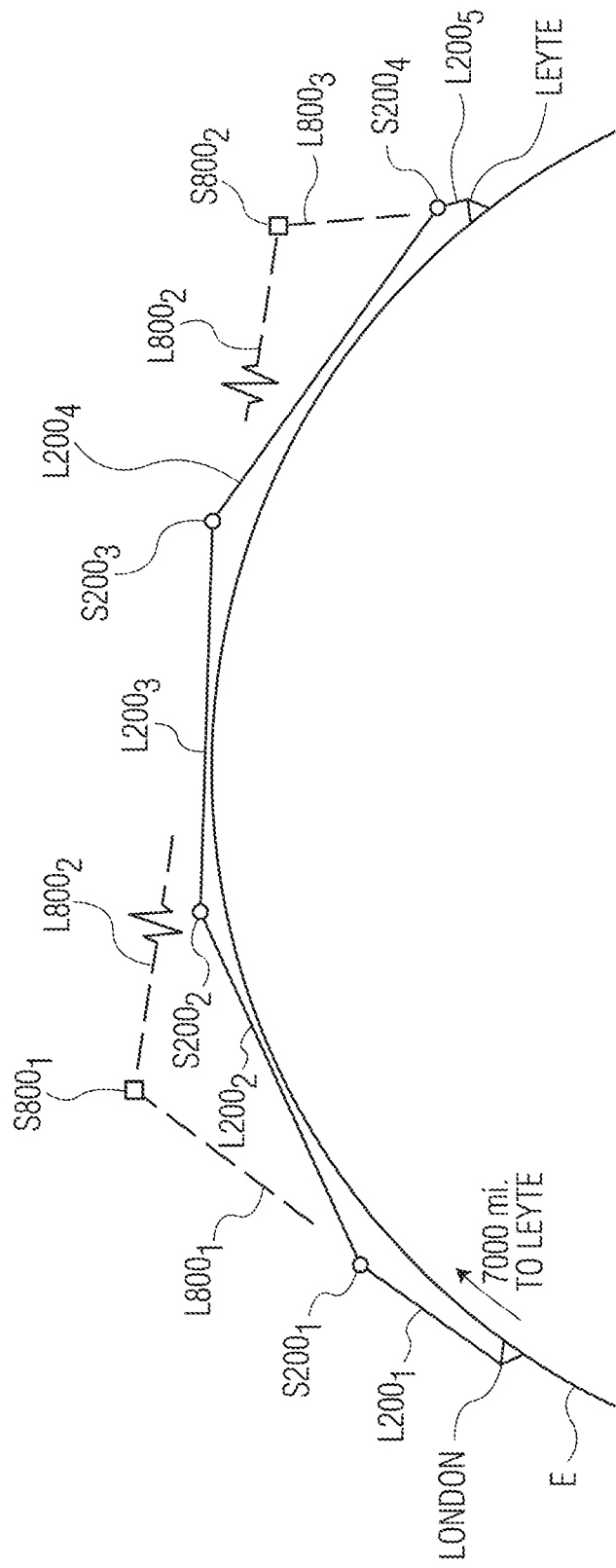
FIG. 9 illustrates one manner in which a system that uses satellites at different altitudes can reduce the number of radio links between distant ground nodes.

In another alternate embodiment the satellite constellation can include multiple satellites at other, higher altitudes to reduce the number of satellite-to-satellite hops in a final route. FIG. 9 illustrates the principle involved in seeking satellites at higher altitudes to reduce the number of satellite-to-satellite hops in a final route. It will be recalled that the satellite constellation of this embodiment can have satellites in orbits in orbits of different altitudes. FIG. 9 illustrates a system that includes satellites S200 in 200-mile orbits and satellites S800 in 800-mile orbits. Because the maximum length of a radio link between two satellites in 200-mile orbits is typically no more than 2,500 miles, a radio route between London and Leyte 7,000 miles away will require at least five links $L200_1$, $L200_2$, $L200_3$, $L200_4$, and $L200_5$ between a London ground station and a Leyte ground station. See Table 1. On the other hand, satellites in 800-mile orbits can see ground stations about 2,500 miles away and other satellites about 5,000 miles away (see footprint FP4 in FIG. 5), so a radio route can theoretically be established with just two satellites via the links $L800_1$, $L800_2$, and $L800_3$ from London, via the satellites S8001 and S8002, to Leyte.

Thus, the satellite S8001 could receive a data transmission uploaded from London and be in a local area routing network to a ground station over 7,000 miles away, which would include Chicago (4,000 mi.) and Los Angeles (5,400 mi.). See FIG. 6. At the least, though, the incorporation of higher altitude satellites in a constellation increases the probability that a destination ground station will be in a zone served by a wide area routing network with a satellite receiving a data transmission from an originating ground station, thus eliminating the step S108 (FIG. 7) from the data transmission process in many instances.

In one embodiment the routing protocols described above can be relied on to automatically create links comprising satellites of different altitudes. However, in another embodiment the routing messages between satellites will include all of the information described in connection with FIG. 6 that is used to create local and wide area networks, along with the quality of all of the links back to the initiating ground station (for local area routing networks) or initiating satellite (for wide area routing networks). The routing messages will also include a counter indicating the number of the satellite in the network, which will be incremented by each satellite receiving a routing message from that satellite, thus keeping track of the number of satellite-to-satellite hops back to the initial point. In addition, a satellite receiving multiple routing messages will not discard the routing message with the weakest quality. Rather, it will only discard routing messages below a certain threshold value of the quality. The satellite-to-satellite route back to the initiating ground station or satellite will then select the route with the fewest satellite-to-satellite hops. This will favor the selection of higher altitude satellites because they will usually require fewer hops to a destination. It will also reduce the likelihood that routes containing higher altitude satellites will be discarded because the quality of radio links incorporating them will typically be lower than links between lower altitude satellites that are closer to each other.

D. Distributed Ledger Systems

A satellite infrastructure with multiple satellites in a stochastic constellation using routing and transmission protocols as discussed above can also be applied to distributed ledger systems. That is, features from the above route creation and data transmission methods can be used to provide access to users on the ground to space-based distributed ledger systems, and to transmit ledger-related data between satellites. These systems and methods will enable rapid reception, receipt, and delivery of ledger-related messages among users and satellites, and thus can serve to create standard blockchain systems for preserving and validating information distributed throughout the blockchain. In addition the principles of creating a blockchain system described here can also be used for data transmissions.

1. Blockchain Principles Applied to Radio Routing

The satellite communications systems described herein are especially adapted for the application of principles underlying distributed ledger technology. A blockchain is a distributed ledger verified and copied across multiple computers, typically numbering in the hundreds or thousands. As applied to the systems and methods described herein, each of the satellites can be considered a node in a blockchain used to record and distribute information. In certain applications ground nodes can be included as nodes in a blockchain.

Blockchain principles can be applied to the present system in various ways. For example, each time a data transmission is uploaded to an initial satellite node, it can be recorded as a transaction that is distributed to all of the nodes in the system in accordance with the more detailed description that follows here. Other transactions, such as the confirmation signal returned to a destination ground node after completion of a data transmission, as described above, can also be recorded at each node.

These recorded transactions can be used for various purposes. For example, the number of times a particular user accesses the system and the number of completed data transmissions can be used by the system owner for billing purposes or to compile statistics on usage or successful transmissions.

2. Distributed Ledgers in a Stochastic System

By way of background, the Internet employs numerous different technologies that utilize a decentralized ledger to track, record, and verify various transactions. As various prior art satellite systems expand their capabilities, the satellites could be used to forward various data transmissions that are part of a specific application of a blockchain or blockchain-related ledger. An additional step would be to include in a satellite the logic of blockchains and distributed ledgers. Such satellites could function in a manner similar to the more conventional terrestrial computers that store, maintain, and forward various blockchain transactions. Since each blockchain and distributed ledger is unique, each one would preferably either comprise its own satellite constellation, or include a way of portioning the operational modules in the satellites in a single constellation.

However, there are several weaknesses of the terrestrial Internet that still would be present even if satellites are included in a given distributed ledger system. One weakness that stands out in Internet blockchain systems is the issue of privacy. The Internet today consists of numerous connections between hubs. Each hub in the Internet serves forwarding and routing functions.

Router manufacturers have indicated that their routers would be able to store some of the traffic that they were routing, which would inherently expose to exploitation any distributed ledger system using such routers. For example, even if a router manufacturer could not read the content of a blockchain transmission, the unique format system used with different blockchain applications could help identify the particular blockchain application being implemented. With this knowledge, a rather straightforward computer program could create lists of blockchain originators, blockchain authenticators, and even in some instances senders of confidential financial information, information on virus protection systems that could be useful to unauthorized users ("hackers"), and many other types of cloud-based information that the sender wants to maintain in confidence.

Recently, hacking has already proven to be a problem that can compromise the confidential nature of the Internet. For example, it has been reported that several well-known apps directed towards different functions were actually reading users' emails without their knowledge. Such an app installed on a user's device either with or without his knowledge could easily read the key strokes the user was typing into a securitization system to send a confidential communication that was later added to a blockchain. A hacker could also access a router in a satellite or ground station, obtain and modify information, and re-introduce false information back into the network. The potential exists for sophisticated hackers to access a communication at different points along its path and read, modify, and even delete specific blocks of information.

Likewise, there are physical security issues in addition to electronic security issues. Many countries depend on undersea cables to provide connectivity with Internet servers in other countries. These cables are easy to find, and easy to sever. The destruction of several key cables could well compromise the operation of the current major blockchain applications. Additionally, terrestrial cables that cross international borders form a critical part of the complex worldwide infrastructure supporting the Internet. A few strategically placed countries could cut their cables, and cause the Internet to face serious challenges.

The systems and methods described herein support a new approach whereby satellites take responsibility for the blockchain process. Previously, a satellite-based blockchain system would not have been feasible because of the costs involved in manufacturing the satellites and maintaining them in their prescribed orbits to permit ready communication between them. The systems described above use inexpensive satellites stochastically distributed in low-earth orbits that can take responsibility for all or almost all of the storage and transmission of both transactions and blockchain authentication issues. One important point is that such a system can be entirely privately owned and operated. This supports additional levels of privacy and electronic security. Moreover, satellite systems incorporating the principles described herein increase the system's physical security whereby any satellites destroyed by collisions with other objects in space for example, or disintegrate through orbital decay, are replaced inexpensively. In addition, by its nature the system remains operational with little or no loss in system capability even if satellites are lost.

The present blockchain approach seeks to permit a large number or a large percentage of a group of low cost satellites such as those described in the present disclosure to take responsibility for forwarding transactions. To that end this approach creates a space-based network that can track the blockchain transactions and verify them as permitted under the rules of the blockchain. In general terms, this requires keeping a record whereby all of the satellites would agree on a common set of proven facts. The satellites would also have to approve and record all new transactions. Essentially, each satellite would be a part of the satellite routing mechanism. Furthermore, each satellite would also be a member of the team of satellites that recorded and authenticated each transaction. Additionally, the satellites must be adaptable to the various potential kinds of blockchains that would be presented to them. This goal creates the need for a new type of satellite communication paradigm that can be utilized to provide various types of service such as cloud storage, routing of transactions, and transmitting email.

Although the distributed ledger concepts presented here can work using satellites at a variety of altitudes, the example used to demonstrate the operation of one such system is explained using satellites in 100-mile high circular orbits. This implementation will have a number of advantages over systems employing higher altitude satellites. At the first instance those skilled in the art will appreciate that use of lower satellites represents a trade-off in that higher satellites see farther over the horizon, thus facilitating satellite-to-satellite links. However, a system with satellites in 100-mile high orbits will be more advantageous in distributed ledger applications. Compared to a 200-mile high satellite, the lower altitude will increase the received signal strength by over 6 dB between a terrestrial user and a satellite. This will provide more predictable results in terms of ensuring the rapid dissemination of transactional information between the satellites and users on the ground. Moreover, satellites at an altitude of 100 miles can be used in combination satellites at higher altitudes as discussed above to improve the likelihood of creating the satellite-to-satellite links required to distribute transactional information throughout the system. The present exemplary embodiment assumes a network of about 200 satellites, but 400 satellites would provide a greater degree of redundancy in that there would more potential satellite-to-satellite radio links given that the system relies on the probability of making such links between the stochastically distributed satellites. The system can also work with fewer than 200 satellites, probably as few as 20 or fewer, although there might be undesirable delays in information exchanges between satellites.

The satellites described above in connection with FIGS. 2 and 3 are used in the present distributed ledger application. The CPU 40 of the satellites will include a blockchain management module (not shown) to execute the blockchain functions such as message forwarding and storage of previous blockchain activity. A key issue, addressed in detail in the previous discussion of routing data transmissions through a satellite communication system, is establishing radio communications between the satellites. Consequently, if a system is to provide blockchain communications, approval of transactions, and blockchain verifications, the system should provide information from a single satellite almost instantaneously to all or almost all of the other satellites in the system.

A system designed to serve the portion of the earth's surface between 60° N lat. and 60° S lat. will be accessible to almost all of the world's population, as seen in FIG. 5. The area of this service portion of the earth is about 175,000,000 sq. mi. A satellite in a 100-mile high orbit has a footprint of about 2,500,000 sq. mi., which is about 1.4% of the service area traversed by the satellites. Thus, on average any given point in the system's service area will see about 3 of the 200 satellites. Concomitantly, the chance that a satellite will not be visible from any particular point in this service area is 98.6%. The probability that any given point on the earth will not be able to see at least one satellite is only $0.986^{200} \approx 0.059$ (that is, about one in 17). As already noted, a system with stochastically distributed satellites is fully scalable by adding satellites to the constellation. For example, the probability that any given point on the earth will not be able to see at least one satellite drops to about one in 70 if the constellation comprises 300 satellites ($0.986^{300} \approx 0.0145$).

As in the data transmission systems already discussed, the number of other satellites that any given satellite can "see" is also an important factor in a distributed ledger system. In the present embodiment, each satellite can theoretically "see" other satellites about 1,800 miles over the horizon (2×DH from Table 1). Ignoring for purposes of this discussion that interference from ground structures at a given satellite's horizon EH may reduce that distance, the area covered by a circle with a radius of 1,800 miles is about 10,000,000 sq. mi., which is 5.7% of the 175,000,000 sq. mi. area traversed by the 200 satellites in the system, which means that on average any given satellite sees at least 11 other satellites in the constellation (5.7% of 200). Even if the antenna structures illustrated in FIG. 2 can only cover 60% of the satellite's spherical surface (due to constructional limitations such as the need to provide sites for mounting the solar panels), it is likely that antennas can be paired between a particular satellite and at least one of the 11 other potentially available satellites. Moreover, increasing the number of satellites in the constellation would correspondingly increase the probability of being able successfully to pair an antenna in one satellite with an antenna in another.

The following describes a potential method for spreading the content of a communication from a terrestrial user at a starting satellite around the globe. Assume a cycle time of one-tenth of a second. Each of the 200 satellites is given a precise time to transmit within that one tenth of a second. For example, the first satellite could transmit data at 0.1005 seconds. The second satellite could transmit data at 0.1010 seconds. In this manner there would be a time slot for each satellite. Assume conservatively that each satellite can establish a radio link that will support data communications with at least four of the 11 satellites within its range. At the end of the first cycle, the first satellite would have transmitted its data to about four other satellites. During the next cycle of 0.1 second, those four satellites attempt to send the same data to the other eight of the 11 satellites. By the end of a third 0.1005-second cycle, the chance of a single satellite in the first-mentioned group being left out becomes very small. The satellites discussed above in connection with FIGS. 2 and 3 are particularly suitable for establishing these satellite-to-satellite connections, with the route creation module 46 and the data movement module 48 adapted to support the distribution of communications among satellites around the globe. Simultaneously, the communication is spreading in all directions around the globe. Since a satellite can see 1,800 miles over the horizon, a communication theoretically can be transmitted to the opposite side of the earth 12,500 miles away in just 6-8 cycles. However, given the stochastic distribution of the satellites, a more realistic estimate is that within about one second (10 cycles at 0.10 cycles per second), almost every satellite would have received the original transmission. The satellites' GNSS modules communicate with a Global Navigation Satellite System to provide a common clock for all of the satellites.

This type of system could serve a variety of different types of blockchains. Some systems would rely on using standardized smartphones, while the possibility remains for other systems to design specific secure devices for operation only on a particular satellite system. It will also be advantageous in some applications if the operational code and the blockchain algorithms are stored in a non-rewritable permanent memory in the satellite, which would make it virtually impossible for a hacker to modify the code. In addition, all messages and all blockchain would preferably be securitized by appropriate hashing and securitization algorithms. To communicate with users on the ground, each satellite stores the geolocations of all of the users and uses the GNSS module to determine when it was in the line of sight of a user in order to communicate onboard information to a designated user.

Advantages of systems such as those just described include their use of small, stochastically distributed satellites that enable the system to continue in service even when some are destroyed. This contrasts with systems using larger satellites that must be maintained in prescribed orbits by heavy rocket thrusters, which in turn require the satellites to have heavy rocket fuel on board. Since the creation of links in that type of system depends on the satellites being in precisely controlled locations, the loss of just a few satellites in controlled orbits could shut down the entire system. But if some of the satellites in the system described here go out of service, data communications throughout the satellite constellation and with ground nodes are still supported, and satellites that go out of service for one reason or another can be easily and inexpensively replaced if desired.

Furthermore, the present system has a high degree of electronic security. In addition to using an unalterable computer code, another advantage is that individual paired antennas generally are sending relatively narrow beams back and forth between themselves. Even if another satellite not part of the system was in orbit nearby, it could not become part of the beam-matching logic for the system satellites, and thus would find it difficult if not impossible to monitor more than a few signal exchanges between system satellites. Near total confidentiality would be further achieved by using suitable hashing algorithms for satellite-to-satellite communications.

Figure 10:
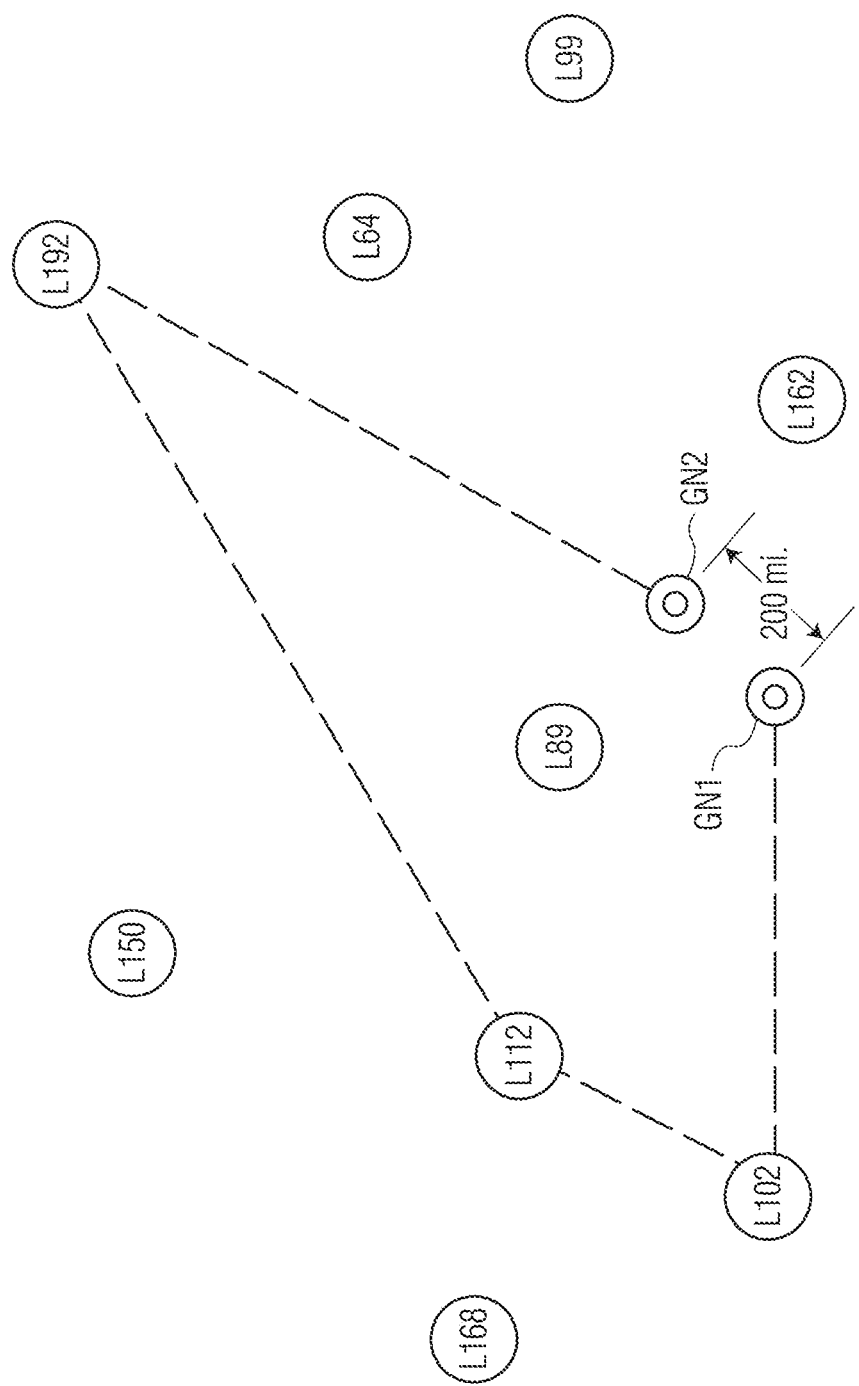
FIG. 10 illustrates an example of a multi-satellite route between two ground nodes FIG. 11, comprising FIGS. 11A, 11B, and 11C, schematically depicts rotating satellites in accordance with alternate implementations of the systems depicted in FIGS. 4 and 5.

FIG. 10 illustrates the free-form nature of the process for route creation between satellites in a space-based distributed ledger system such as that described in this section and in a data transmission system using the routing protocols described in section II.C. in connection with data transmissions. FIG. 10 illustrates how the systems described herein can indirectly link two ground stations GN1 and GN2 that are theoretically close enough together to be within sight of a single satellite. In FIG. 10, the ground stations GN1 and GN2 are only separated by about 200 miles. A number of the 200 satellites in 100-mile high orbits in a distributed ledger system as just described as shown, using the notation LX, where "X" is the number of the satellite. At an orbital altitude of 100 miles, a satellite can "see" ground stations at least 800 miles away and other satellites about 1,600 miles away. These are conservative estimates based on the distances in Table 1, accounting for possible interference from topographic features or tall structures on the ground. Theoretically, either of the satellites L89 or L162 could form links with both ground stations, since both are within about 400 miles from the farthest satellite (GN1 to L162).

However, the routing techniques employed by the systems described herein can connect two close-together ground stations by linking plural satellites, some of which are beyond the range of either of the ground stations, that will provide stronger subroutes between the ground stations than satellites within range of both. For example, the satellite L192 is about 1,000 miles from the closer ground station GN2, but using the methods described herein, it can form part of a route between the ground stations. It will be further appreciated from FIG. 10 that the local area network depicted in FIG. 6 is an idealized representation, in that higher order satellites are not necessarily farther from their initial ground node than lower order satellites in the same local area network. For example, the satellite L64 could be a first order satellite associated with the ground node GN2, which is 350 miles away, and the satellite L89 could be a second order satellite in the same local area network, even though it is closer (250 miles) to the ground node GN2.

III. Alternate Satellite Constructions and Deployment Strategies

As noted, the above space-based data transmission techniques and distributed ledger systems can be effected using the basic satellite construction shown in FIGS. 2 and 3. However, this section describes several strategies for increasing the probability of creating satellite-to-satellite radio links and making them more robust and longer-lasting so that more information can be communicated between satellites in a shorter amount of time. These strategies include configurational variations of the satellite construction in FIGS. 2 and 3, control of satellite attitude, rotating satellites, enhanced antenna design, and CubeSat compatibility, to name a few.

A. Rotating Satellites

Designing a satellite-based radio mesh system in accordance with the above description involves myriad trade-offs among a wide variety of parameters. Two particular parameters that work at cross purposes, and thus require judicious selection, are the beam widths of radio signals transmitted by the antennas and the power (gain) of the antennas. On the one hand, greater beam width will increase the probability that a beam match can be created, but a greater beam width reduces the gain of the antenna. Conversely, a narrower beam will increase antenna gain, but reduce the probability of creating a beam match between nodes. This trade-off is particularly significant in satellite nodes because the satellite antenna configuration has to take into consideration constraints on the weight and size of the satellites, which limits the number of antennas the satellite can carry, and on the electrical power available from onboard batteries. It is also desirable to increase the number of possible beam matches between nodes because some radio beams may be weakened by grazing the earth's surface, which can partially blockchain the signal before it reaches a receiving node.

Achieving the proper trade-off between beam width and antenna gain is important to the efficient functioning of a satellite-based system with stochastically distributed satellites, which relies on the statistical probability that routes can be created using satellite-to-satellite radio links. Typically, the satellites' antennas point out into space-towards each other and the earth—to enable the establishment of links between nodes. A fundamental property of the system is its dependence on transmissions of sufficient strength reaching other nodes (ground stations and satellites). The system relies on having enough satellites in orbit and making the proper design trade-offs, including beam width vs. gain, to enhance the probability that a suitable communications can be established between system nodes, both satellites and ground stations.

The present embodiment utilizes satellites that rotate about an axis, which, as explained herein, increases the likelihood that communications over high quality links can be created. Employing rotating satellites enables beam width to be reduced, with a corresponding increase in gain.

The principles involved will be explained using as an example a satellite configuration such as that shown in FIG. 2 with 25 antennas covering about 60% of the surface of a spherical satellite. Thus, a rough estimate of the probability of a radio beam transmitted by such a satellite being received by another like satellite would be about 36% (0.6×0.6). It will be appreciated by those skilled in the art that this is only an estimate, since the radio beams will have side lobes that will increase to a certain extent the probability that a link will be created. If the diameter of the satellite is doubled, the diameter d of a parabolic dish antenna can also be doubled. By the equation $\alpha=(k\times\gamma)/d$, the half power beam width (HPBW) will be halved. While the area of the beam will be only ¼ as large, the antenna gain will be increased by a factor of four, or about 6 dB. On the other hand, the probability of a beam match between satellites is reduced to about 2% (36%×(¼)$^2$).

In the present embodiment the establishment of radio links by antenna pairing through beam matching between satellites is enhanced by using satellites that spin about a rotational axis. In one implementation, the satellites themselves have the same components as the satellite depicted in FIGS. 2 and 3 and described in the text above associated with them.

For purposes of illustrating the operation of a typical system using rotating satellites, it will be assumed that the satellites are deployed with an angular velocity $\omega=2\pi$ rad/sec (60 rpm). Those skilled in the art will understand that this example is not meant to be limiting and that it is within the scope of this disclosure to employ any angular velocity effective to establish radio routes and transmit data as described and claimed herein. Those skilled in the art will understand that the angular velocity $\omega$ used in a particular system will depend on factors such as the application implemented by the system (transmitting data or maintaining a distributed ledger), the number of satellites in the constellation used by the system, and the amount and nature of the information to be transferred over the satellite-to-satellite links. It is anticipated that about one revolution per minute ($\Omega\approx1$ rpm) will be preferred for many of the systems described in the present specification. The orientation of the axis of rotation will not be controlled, but principles of physics dictate that each satellite will assume an axis of rotation through its center of mass and the axis of rotation will precess around the angular velocity $\omega$. However, the orientation of the axis of rotation at any given time does not affect the creation of radio links, as will be apparent from the discussion that follows.

Rotating satellites increase the probability of a transmitted radio beam being received by another satellite because the satellite antennas "sweep" an area as the satellite rotates. This can be understood by considering the satellite $S_\omega$ shown in FIG. 11A, which is schematic cross-section through the satellite "equator," corresponding to the equator 16 of the satellite 10 in FIG. 2. In this example, the satellite $S_\omega$ comprises five antennas $12_1$, $12_2$, $12_3$, $12_4$, and $12_5$, each having an HPBW of 35°, arranged equally around its equator 16 and rotating about the z-axis at an angular velocity ω. A location RL remote from the satellite and lying in the plane of the equator will "see" five antennas as the satellite rotates through one complete revolution. It will be understood that this number will be different for locations not in the equatorial plane, but the principle still holds. It will also be appreciated that the number may increase or decrease because of precession about the rotational axis, but most locations remote from the satellite (including ground stations) will still see plural antennas as the satellite rotates. Thus, a second satellite with its equatorial plane in the equatorial plane of the first satellite $S_\omega$, the probability of being able to create a radio link with a 6 dB gain increase over a satellite that is not deliberately deployed to rotate is about 10% (5 antennas×2% for each antenna). The probability of creating a beam match with a ground station antenna is likewise increased.

It will be understood that this is a highly idealized representation, which ignores factors such as precession of the satellites around their axes of rotation, but it nevertheless illustrates the concept that rotating satellites present an increased probability for the creation of beam matches between two satellites. Nevertheless, considering the large number of stochastically distributed orbiting satellites available for information transfer, the increased probability of beam matches using rotating satellites will in many, if not most, cases be sufficient to enable assembly of a radio route or a distributed ledger with higher quality links between the system's multiple satellites and ground stations.

1. Counter-Rotating Satellites

Figure 11A:
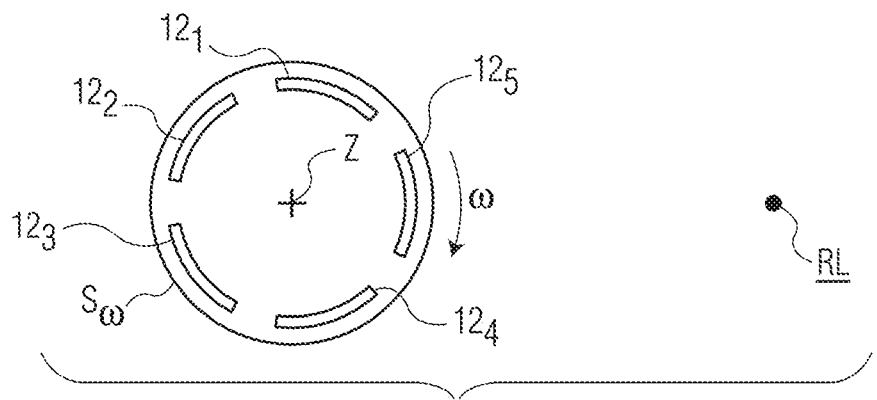
Figure 11B:
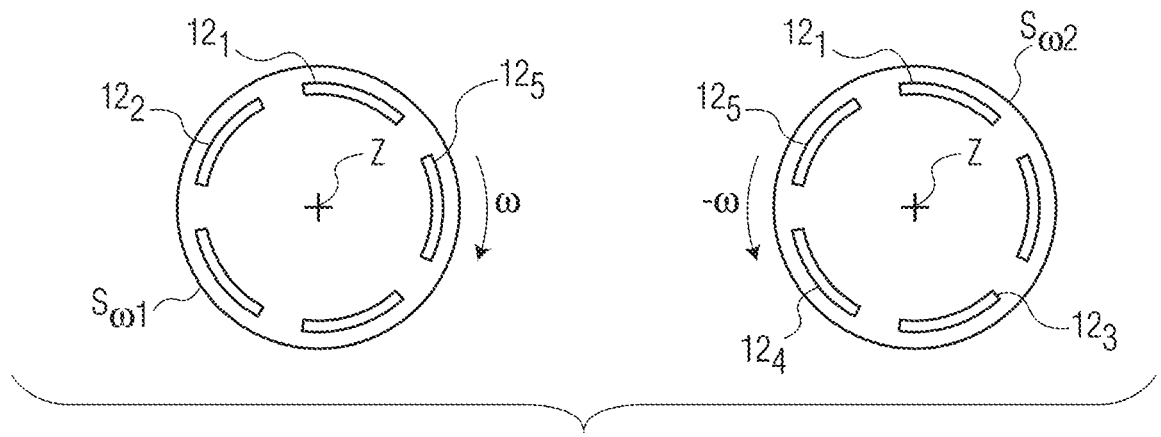

The satellites can also be deployed with a certain percentage, say 50%, rotating in a first direction about their rotational axis and the rest rotating in the opposite direction. FIG. 11B, which uses like numerals for like parts in FIG. 11A, illustrates this principle by showing the satellite $S_{\omega 1}$ rotating at an angular velocity ω in a first direction and a second satellite $S_{\omega 2}$ rotating at the same angular velocity -ω (in the opposite rotational direction). This illustrates how a beam match between antenna $12_5$ in satellite $S_{\omega 1}$ and antenna $12_4$ in satellite $S_{\omega 2}$ will be sustained longer than if the two satellites were rotating in the same direction. That is, if the satellites are rotating in opposite directions, facing antennas on the satellites are traveling at essentially the same linear velocity relative to each other. On the other hand, if the satellites are rotating in the same direction, their relative linear velocity is twice the linear velocity of each. With a sufficient number of satellites in orbit, it is believed that there is a significant probability of having a plurality of counter-rotating satellites over any given geographic area for which a radio route is being established. Thus, the likelihood of quickly establishing a relatively long-lasting satellite-to-satellite link is increased by deploying at least some, and preferably about one-half, of the satellites rotating in the opposite direction from the others. In addition, not only are two antennas on respective satellites in alignment longer, but as soon as they rotate out of view of each other, two other antennas of the satellites may align, thus enabling rapid refreshing of the radio link between the satellites. In the example illustrated in FIG. 11B, antenna 12, in satellite $S_{\omega 1}$ and antenna $12_5$ in satellite $S_{\omega 2}$ will align next.

Like the example used to illustrate the increased efficacy of using rotating satellites discussed just above, this is also an idealized description of how counter-rotating satellites can create longer lasting radio links between them. In addition, to the assumptions underlying the above description, there may not be at any given time two counter-rotating satellites over an area where a radio route is desired between two ground stations. Nevertheless, taken together, these examples illustrate the point that rotating satellites, and particularly counter-rotating satellites, will provide a sufficient probability of establishing a relatively high gain radio link between the random orbit satellites to enable reliable data communications between two satellites. And because the antennas point in a plurality of directions (preferably over the entire spherical space surrounding the satellite), the opportunity for establishing a radio link between satellites will in most instances be enhanced by using rotating satellites.

2. Satellites Rotating at Different Angular Velocities

Figure 11C:
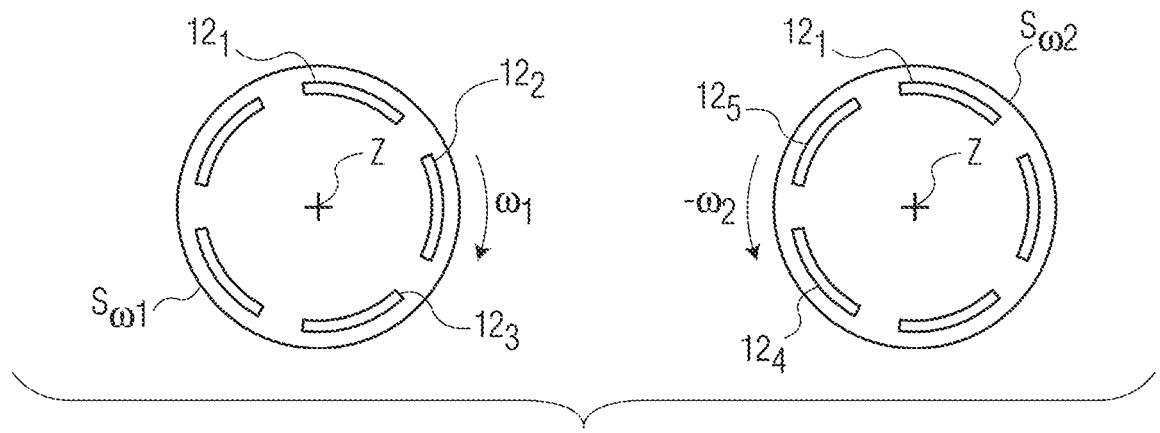

A variation of the embodiment described just above employs satellites that rotate at different angular velocities. This variation is depicted schematically in FIG. 11C, in which the satellite $S_{\omega 1}$ rotates at an angular velocity $\omega_1$ and $S_{\omega 2}$ rotates at a different angular velocity $-\omega_2$ in the other direction. The advantage of this system is that the antennas on the counter-rotating satellites may be out of phase in the sense that antenna on one satellite may be pointing directly to a space between antennas on a second satellite, as depicted in FIG. 11C. If the satellites are rotating at the same angular velocity, this situation can persist for an extended period of time, thus weakening a radio link between the satellites, or perhaps preventing the establishment of a link altogether. Rotating the satellites at different angular velocities will increase the likelihood that at some angular position antennas on both satellites will face each other (be in phase), thus enabling the establishment of a useful radio link between them. For example, in the case illustrated in FIG. 11C, the antennas on the satellites are exactly 180° out of phase, in that the antenna $12_2$ on satellite $S_{\omega 1}$ is pointing directly at the space between the antennas $12_4$ and $12_5$ on satellite $S_{\omega 2}$. If $\omega_1 = 1.33 \times \omega_2$, the antenna $12_5$ on satellite $S_{\omega 1}$ and the antenna $12_5$ on satellite $S_{\omega 2}$ will line up as the satellites rotate.

It is believed that the use of satellites rotating at different angular velocities will reduce even further any possible delays in establishing radio links between satellites and between satellites. In an exemplary approach, the cohort of satellites could be divided into five groups with different angular velocities in accordance with the following table.

TABLE 2

| | |
|---|---|
| Very slow spinner: | 0.68 revolutions per second |
| Slow spinner: | 0.84 revolutions per second |
| Average spinner: | 1.0 revolution per second |
| Fast spinner: | 1.16 revolutions per second |
| Very fast spinner: | 1.32 revolutions per second |

The discussion immediately above explains how this can tend to increase the probability of establishing beam matches between the antennas on respective satellites.

In satellites used in certain systems discussed herein, much lower angular velocities on the order of ω≈1 rpm may be preferred. It is anticipated that attitude-stabilized satellites such as those discussed in section III.B. will more readily form links if the angular velocity is lower than with satellites free to assume any attitude. Moreover, it is also anticipated that the improved antenna configurations discussed in section III.C. will also improve the likelihood that links will be formed between different satellites.

By the same token, this system implementation will also make more beam matches possible in a given time period because the antennas on one satellite will have more opportunities to line up sufficiently with antennas on another satellite to form beam matches if the satellites are counter-rotating at different angular velocities. There may be no beam matches between two satellites at a given time, or for a certain interval, as they rotate. However, as they continue to rotate at different angular velocities, antennas on the satellites will likely form beam matches because antennas on the respective satellites will be likely to line up at some point. This may take plural revolutions of the satellites, but rotation at different angular velocities greatly increases the probability that many more matches will be created as the satellites continue to rotate. It will thus be appreciated from the complex interrelationship of the antennas on different satellites as the satellites move in their orbits and rotate about their axes that providing plural cohorts of satellites rotating at respective different angular velocities will increase the probably of creating more beam matches between pairs of the satellites during any given time interval.

3. Other Considerations

One technique for controlling the rotation of the satellites is by judiciously configuring the satellite solar panels to create a torque about the rotational axis of the satellite due to the momentum of the photons striking the solar panels. In one such implementation the solar panels are provided with solar cells only on one side. For example, referring to FIGS. 2 and 3, for a satellite that is deployed to rotate counter-clockwise about the z-axis (as viewed in the negative z-direction), each solar panel 14a would have solar cells only on one side, namely the side facing the viewer for the solar panel 14a to the right in FIG. 3 and the side facing away from the viewer for the other solar panel 14a to the left in FIG. 3. The remaining solar panels would still have solar cells on both sides. Although larger solar panels will increase aerodynamic drag on the satellite, it is believed that it will be possible through judicious design to provide solar panels of a size, configuration, and orientation that will generate a net torque on the satellite.

It is likewise believed possible to selectively distribute the mass of the satellite components to cause it to rotate about a particular axis. Since it is anticipated that the battery will form a large proportion of the satellite mass, it will preferably be located at the center of mass of the satellite and have a mass distribution that is symmetric about the axis of rotation. In addition, unintended effects of the earth's magnetic field on satellite rotation can be minimized by using non-ferromagnetic materials such as aluminum for major structural components wherever possible.

Those skilled in the art will appreciate that excessive angular velocities can create large centrifugal forces with the potential to damage the satellites. Atmospheric drag will limit the rotational velocity to an extent that depends on a satellite's altitude, and it is anticipated that the design of any of the above techniques for maintaining rotation can be tailored to prevent the creation of damaging centrifugal forces (for example, via selection of the area and disposition of the solar panels). However, since the altitude of the satellites is not otherwise controlled, the rotational velocity of some of them may decrease, but they will still be available as nodes in a communications system. And to the extent that older satellites remain spinning at lower angular velocities, the effect will be to automatically take advantage of the improved performance made capable by using satellites rotating at different angular velocities. By the same token, satellites that go out of service for any reason, such as damage by excessive centrifugal force, can be readily replaced since the satellites are inexpensive to construct, launch, and deploy.

As mentioned above, some or all of the above passive means for controlling satellite attitude can be employed. That is, in one variation one or more solar panels can have solar cells on only one side to impart an unbalanced moment on the satellite to cause it to tumble. Another variation could locate ferromagnetic materials in selected locations on the satellite that will produce forces that vary in magnitude and direction as the satellite traverses the earth's magnetic field.

B. Satellite Configurations with Attitude Stabilization

Figure 12:
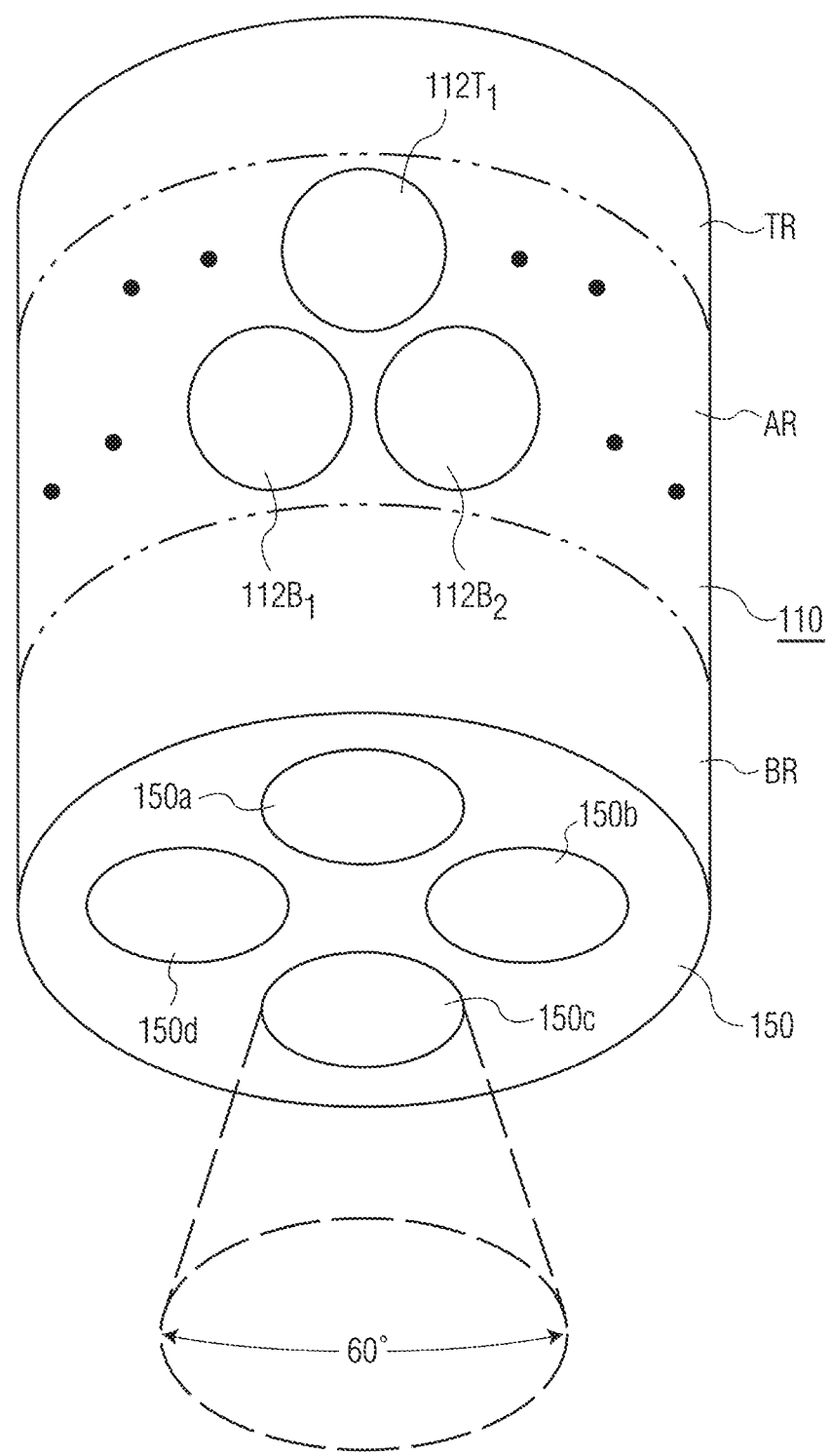
FIG. 12 is a perspective view from the bottom of an alternate satellite embodiment with a circular cylindrical construction.
Figure 13:
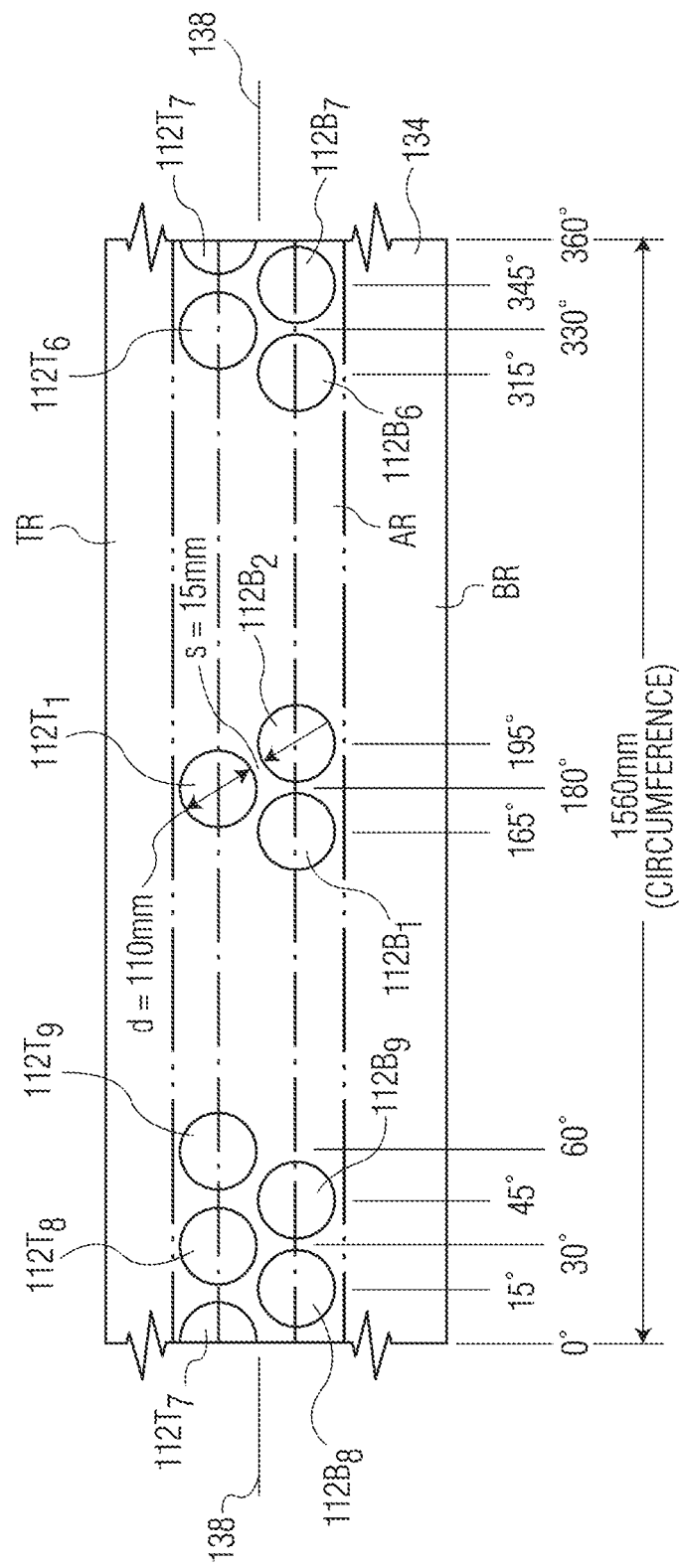
FIG. 13 is a developed view of the circular side wall of the satellite in FIG. 12 illustrating the arrangement of the satellite antennas.
Figure 14:
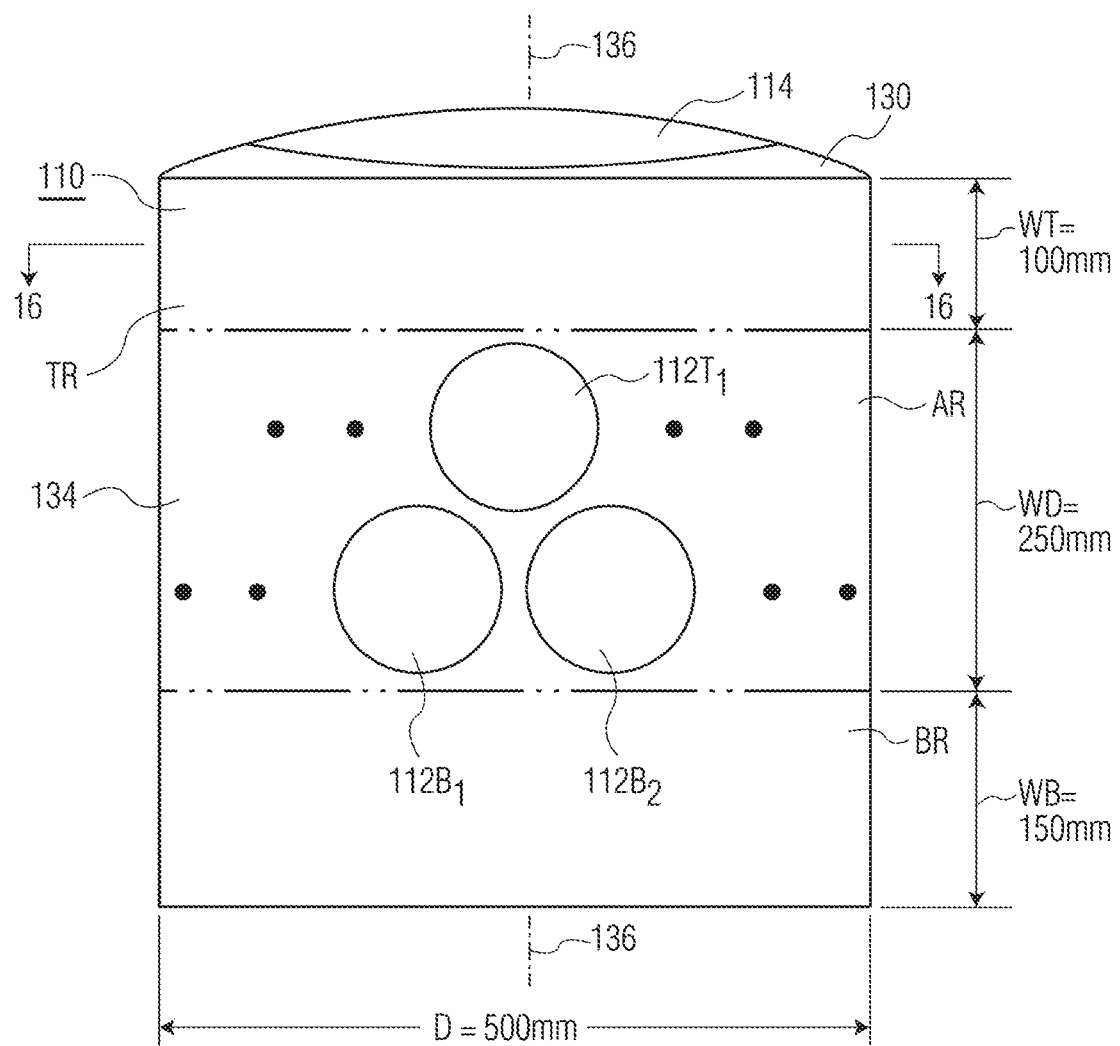
FIG. 14 is a side view of the satellite in FIG. 12.
Figure 15:
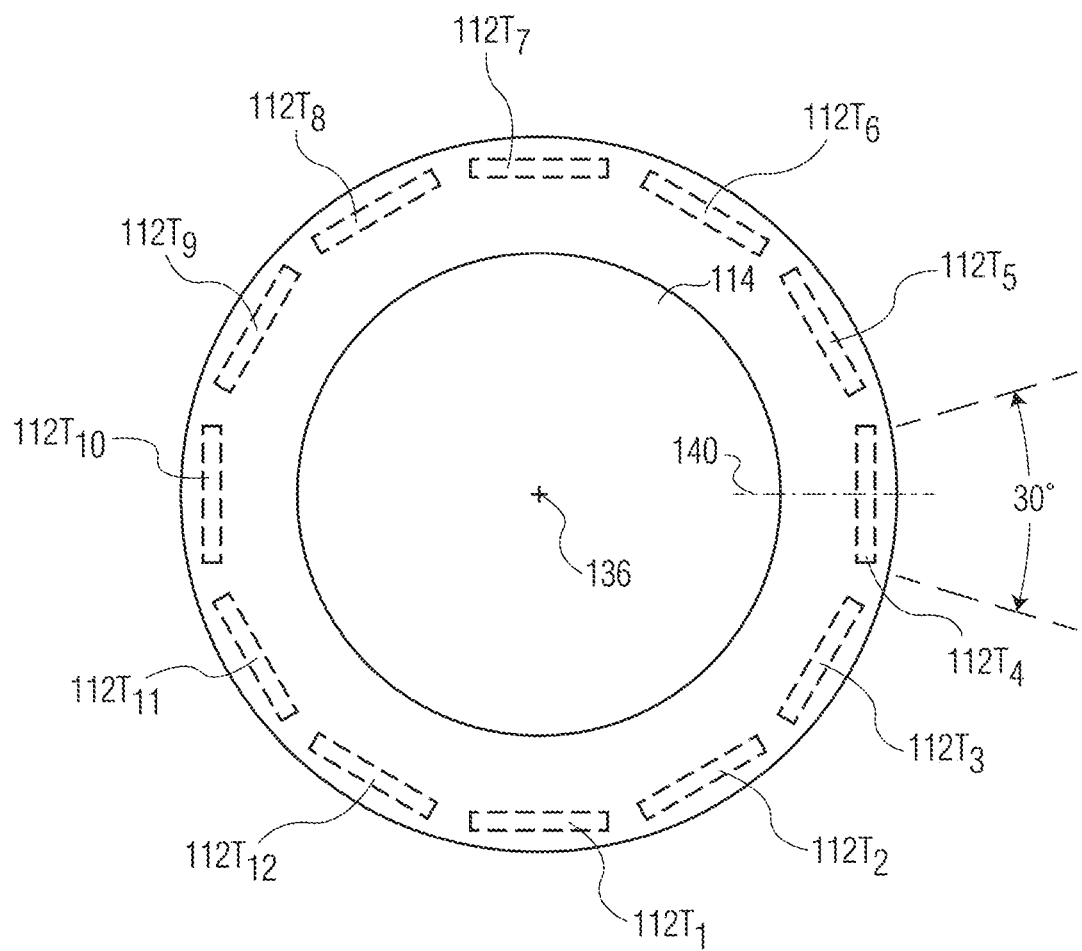
FIG. 15 is a top view of the satellite in FIG. 12.

Another approach that can enhance the probability of creating radio links between stochastically distributed satellites is to employ a satellite construction that will make more antennas available for pairing with other satellites. A first alternate construction is depicted schematically in FIGS. 12-15. FIG. 12 is a perspective view from the bottom of a circular cylindrical satellite 110 comprising the present embodiment. FIG. 13 is a developed view of the circular side wall of the satellite illustrating the arrangement of the satellite antennas. FIG. 14 is a side view of the satellite, and FIG. 15 is a top view illustrating the beam width of the satellite antennas. It will be understood that the terms "top" and "bottom" are used for convenience to indicate directions facing away from and toward the surface of the earth, respectively, when the satellite is in its operational orientation. Likewise, the term "side" or "side wall" is relative to "top" and "bottom."

Referring to the figures, a satellite 110 is generally cylindrical in shape with antennas 112 such as the antennas 12 in the satellite 10 shown in FIG. 3. A solar panel 114, shown in FIG. 14, is on the top surface 130 of the satellite 110. In the present exemplary embodiment the satellite includes an antenna array with a total of 24 antennas, comprising a top row of 12 antennas $112T_1$, $112T_2$, $112T_3$, $112T_4$, $112T_5$, $112T_6$. $112T_7$, $112T_8$, $112T_9$, $112T_{10}$, $112T_{11}$, and $112T_{12}$, with antenna openings facing radially outwardly from the side wall 134. A second row of 12 antennas is disposed below the top row. For reasons of clarity, FIG. 13 only shows antennas $112B_1$, $112B_2$, $112_6$, $112B_7$, $112B_8$, and $112B_9$, but it will be understood from FIG. 13 that undepicted antennas $112B_3$, $112B_4$, and $112B_5$ are spaced equally between antennas $112B_1$ and $112B_6$, and that undepicted antennas $112B_{10}$, $112B_{11}$, and $112B_{12}$ are spaced equally between antennas $112B_9$ and $112B_9$. All of the antennas 112 have parabolic reflectors with axes disposed radially in the horizontal plane, as depicted by the centerline 140 of antenna $112T_4$ in FIG. 12, with circular cross-sections perpendicular to their parabolic axes. The solid dots in FIGS. 12 and 14 also represent undepicted antennas that wrap completely around the side wall as shown in FIGS. 13 and 15. In the present exemplary embodiment, the beam width of all of the antennas 112 is 30° and is symmetrical about the centerline 140. It will be further understood that the antenna configurations and operating characteristics discussed here are meant to be examples only, and those skilled in the art will be capable of designing antennas that meet the performance parameters discussed herein.

The satellite side wall 134 includes an antenna region AR bounded by dot-two-dash circumferential lines, as seen in FIGS. 12-14. The antenna region has a configuration that enhances the operational characteristics of the satellite. In particular, the dimensions of the satellite and the arrangement and diameter of the antennas provides antenna coverage of over 65% of the antenna region, thus increasing the probability of creating radio links with the antennas in other satellites. In the present embodiment, the diameter D of the satellite is 500 mm, the width WD of the antenna region AR is 250 mm, the diameter d of the antenna openings is 110 mm, and the space s between the antennas is 15 mm. Four downward facing antennas 150a, 150b, 150c, and 150d are disposed at the bottom of the satellite 100 for a purpose described further below. Each of the antennas 150 comprises a parabolic reflector having a circular cross section, and is designed to send and receive radio beams across a beam width of 60°. It will be appreciated that other antenna arrangements are possible, and the dimensions of the present embodiment are meant to be examples of one such arrangement and are not meant to limit the scope of the claims that follow below.

The top surface 130 of the satellite is domed slightly outwardly as seen in FIG. 14 to increase the spherical angle over which it will be exposed to solar radiation. The axis 136 of the cylindrical satellite is maintained by means discussed below in a substantially vertical orientation relative to the earth's surface within certain limits. The top and bottom rows of the antennas are in turn disposed symmetrically relative to a plane 138 (see FIG. 13) normal to the satellite axis, so that the antennas are maintained substantially horizontal to facilitate the formation of radio links by pairing with antennas in other satellites. This also keeps the downward facing antennas 150 in an orientation in which they can more readily form radio links with ground node antennas. However, the attitude stabilization techniques applied to the satellite as described just below will permit the satellite to wobble a certain limited amount from horizontal. The domed configuration of the solar panel will keep portions of it at a more direct angle to the sun and thus aid in maintaining a charge on the satellite batteries.

The satellite 110 further includes atop region TR and a bottom region BR that provide sufficient internal volume in the satellite for the operational components and modules described above in connection with FIG. 3. In the present example, the top region has a width WT of 100 mm and the bottom region has a width of 250 mm. The internal volume at the bottom region is intended also to provide sufficient internal space to accommodate the downward facing antennas 150, and the top region is intended to have sufficient space to accommodate structure associated with the solar panel 114. In one preferred construction, the antennas 112 point downward at an angle so that they account for the curvature of the earth and thus point more directly at other satellites. This effect will be appreciated by considering the satellites in FIG. 9, in which the radio links between the satellites form angles with the satellites that point slightly downward relative to horizontal. It is also possible to have some of the antennas 12 pointing slightly upward to facilitate the formation of radio links with satellites at higher altitudes in a given system.

Figure 16:
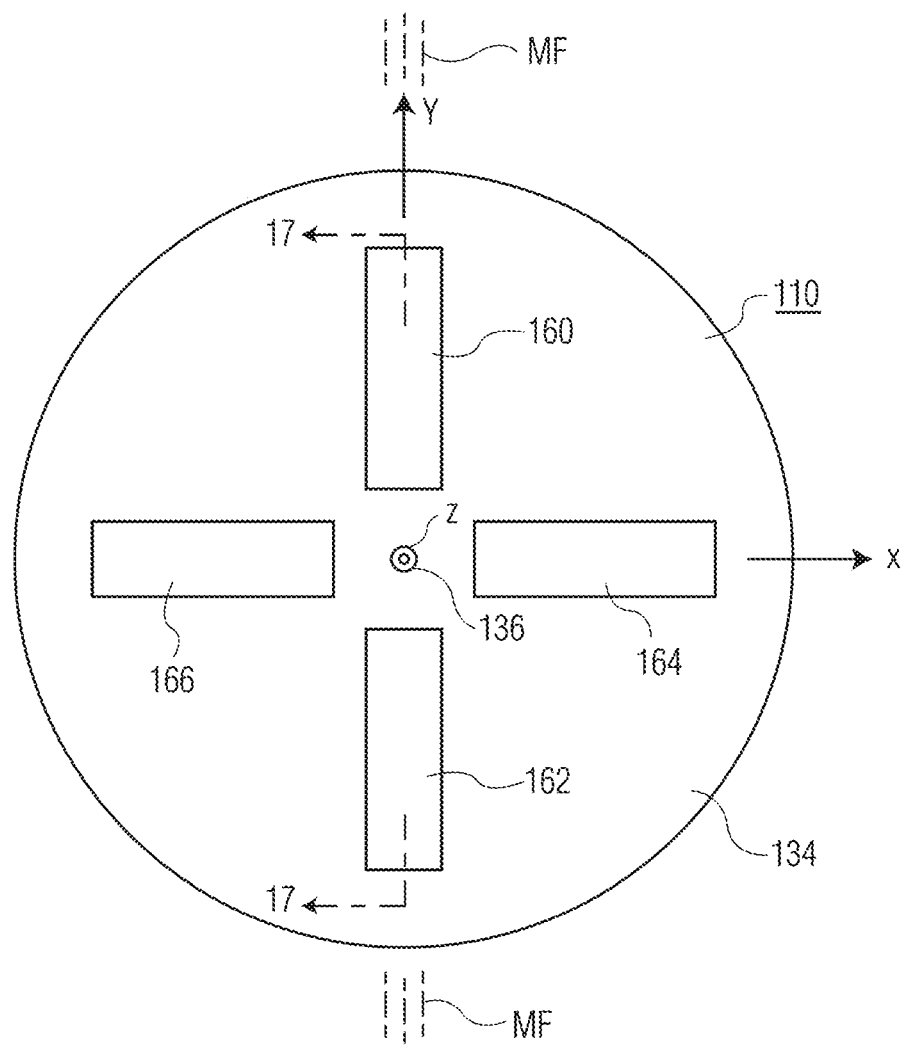
FIG. 16 is a sectional view taken along line 16-16 in FIG. 14.

As mentioned, the ability to form links with satellites that do not have antennas that can form radio links in any direction (such as the satellite 10 in FIGS. 2 and 3) requires that the satellites attitudes be stabilized within certain limits relative to horizontal. FIG. 16 is a section taken along line 16-16 in FIG. 14 schematically depicting an embodiment of a satellite stabilization mechanism for maintaining the satellite 110 upright with the solar panel facing away from the earth's surface. FIG. 16 shows three mutually orthogonal axes x, y, and z. The x- and y-axes are in the plane 138 depicted in FIG. 13. The z-axis coincides with the satellite's axis 136, with the concentric circles indicating that the z-axis is directed outwardly from the plane of the drawing.

The object is to orient the satellite with the axis 136 pointing away from the earth's surface and with the plane 138 parallel to the earth's surface.

Figure 17:
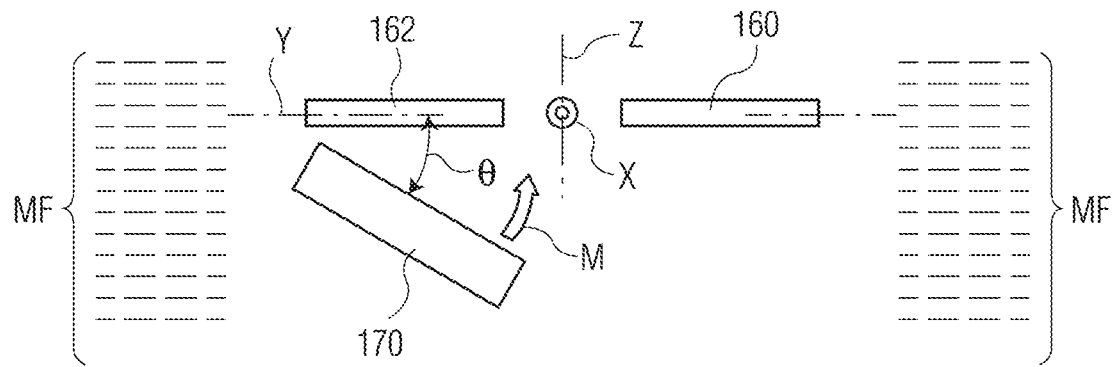
FIG. 17 is a sectional view taken along lines 17-17 in FIG. 16.

The satellite stabilization mechanism comprises five electromagnets. Two electromagnets 160 and 162 are aligned in the y-direction and two electromagnets 164 and 166 are aligned in the x-direction. FIGS. 16 and 17 depict the satellite in the vicinity of the equator, and the dotted lines MF represent the earth's magnetic field. In the position shown in the figure, activating the electromagnets 160 and 162 will tend to align the satellite's y-axis with the lines of magnetic flux MF, which point north parallel to the earth's surface at the equator. This will stabilize the satellite against rotation about the x-axis. Deactivating the electromagnets 160 and 162 and activating the electromagnets 164 and 166 will cause the satellite to rotate about the z-axis so that the satellite's x-axis aligns with the earth's magnetic field. This will stabilize the satellite against rotation about the y-axis.

The earth's magnetic field may not be strong enough to perfectly align the satellite axes in the manner described. In addition, the plane 138 may deviate slightly from horizontal as the satellite travels away from the equator. However, it is anticipated that any misalignment or deviation from horizontal will be slight, probably no more than 10°. This deviation is sometimes referred to herein as satellite "wobble," and in a preferred embodiment the amount of wobble of the plane 138 from horizontal will be less than 20°, and more preferably no more than 10°.

In another variation, the electromagnets 160, 162, 164, and 166 can be sequentially activated and deactivated to impart a rotational moment about the satellite axis 136, in order to realize the advantages discussed above provided by rotating satellites. Imparting a rotational torque on the satellite as they pass over the equator twice every orbit will tend to mitigate the effects of any wobble since it has the potential to bring into alignment antennas on satellites at different angles to horizontal. For example, to impart rotation about the z-axis of one revolution per minute ($\omega \approx 1$ rpm), the satellite is first stabilized horizontally as discussed above. Then, every time the satellite is in the vicinity of the equator, the electromagnets 160, 162, 164, and 168 are each activated and de-activated every 15 seconds. Thus, each in turn will be urged to align with the magnetic flux lines MF while it is activated, thereby generating torque on the satellite about the z-axis. Sequentially activating the electromagnets periodically will cause the satellite to rotate at an angular velocity determined by the period of each magnet's activation. In a preferred embodiment the satellite includes an accelerometer (not shown) to detect its angular velocity. A control circuit incorporated in the satellite's computer system can be programmed to activate and deactivate the magnets 160-166 in a sequence that maintains the satellite's angular velocity about the z-axis at the desired value.

FIG. 17 shows a fifth electromagnet 168 disposed at a suitable angle $\theta$ relative to the satellite's y-axis that is used to right the satellite if it is not oriented with its z-axis facing upward (away from the earth's surface). This condition can be detected by the satellite in a number of ways. For example, the satellite's operating system can monitor the output of the solar panel(s) and determine if the electrical output is below a certain threshold over more than half an orbit, indicating that the satellite is not pointing directly toward the sun. Another indication would be if the downward pointing antennas 150 have not received radio signals for a predetermined time.

If the satellite determines that it needs to be righted vertically, a righting sequence is initiated when the satellite is over the equator. If the satellite is rotating, about its z-axis, it is stopped by activating electromagnet 160 and deactivating electromagnets 164 and 166 in a preprogrammed sequence. The electromagnet 170 is activated momentarily, thus creating a moment M about the satellite's x-axis because the activated magnet 170 will seek to align itself with the earths' lines of magnetic flux MF. The magnet 170 is deactivated before it aligns with the flux lines MF so that it will continue to rotate due to the lack of atmospheric resistance. By using elementary principles of physics, the magnitude and duration of the force required to create a moment M that rotates the satellite by 180° can be calculated by the satellite's onboard computers in accordance with the size of the magnet 170, its orientation, the altitude of the satellite (and thus the strength of the earth's magnetic field at the satellite's location), and the known mass and center of gravity of the satellite.

Figure 18:
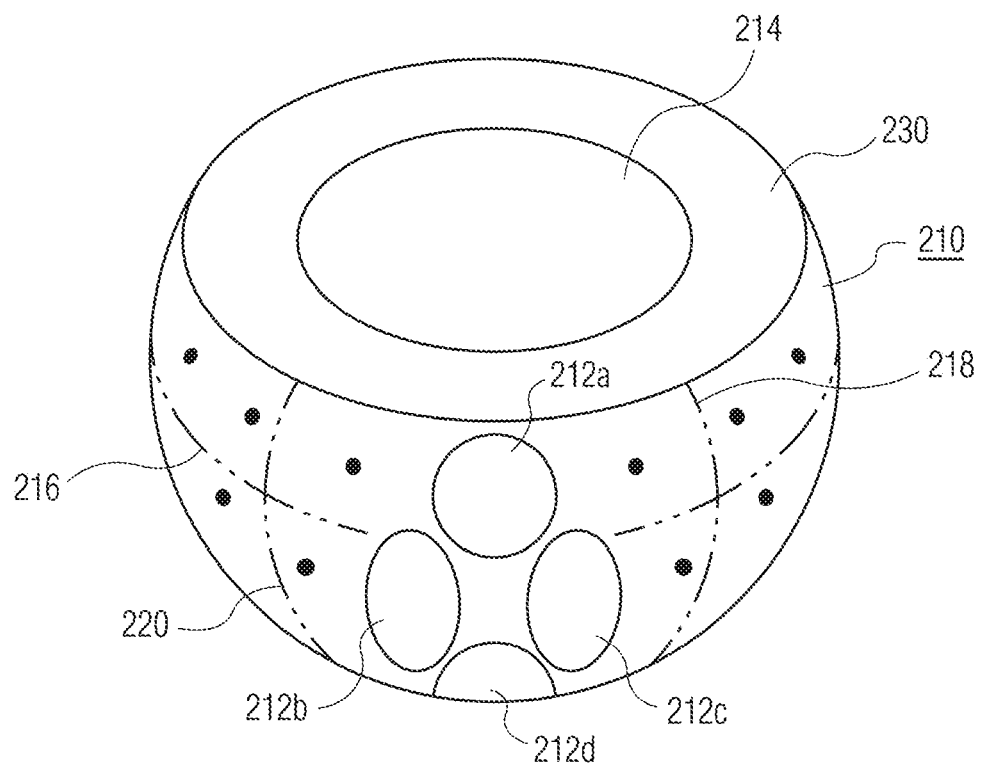
FIG. 18 is a perspective view of another alternate satellite configuration.

Another satellite embodiment comprises a more omnidirectional satellite such as the satellite 210 shown in perspective in FIG. 18. This satellite has a semi-spherical shape in the general form of the satellite 10 depicted in FIGS. 2 and 3, but is truncated so that it comprises only a portion of a sphere. (FIG. 14 uses "200" series reference numerals to denote features referred to in previously depicted satellite embodiments having the same last two digits.) The satellite 210 has a top surface 230 with a solar panel 214 disposed thereon. The top surface can be domed like the top surface 130 of the satellite 110 shown in FIG. 14. Antennas 212*a*, 212*b*, 212*c*, 212*d*, etc., are distributed around the spherical surface of the satellite, as in the satellite 10, represented in FIG. 14 by solid dots. The satellite 210 will preferably include a satellite stabilization mechanism such as that shown in FIG. 13 for use with the satellite 110.

C. Alternate Antenna Configurations

Figure 19:
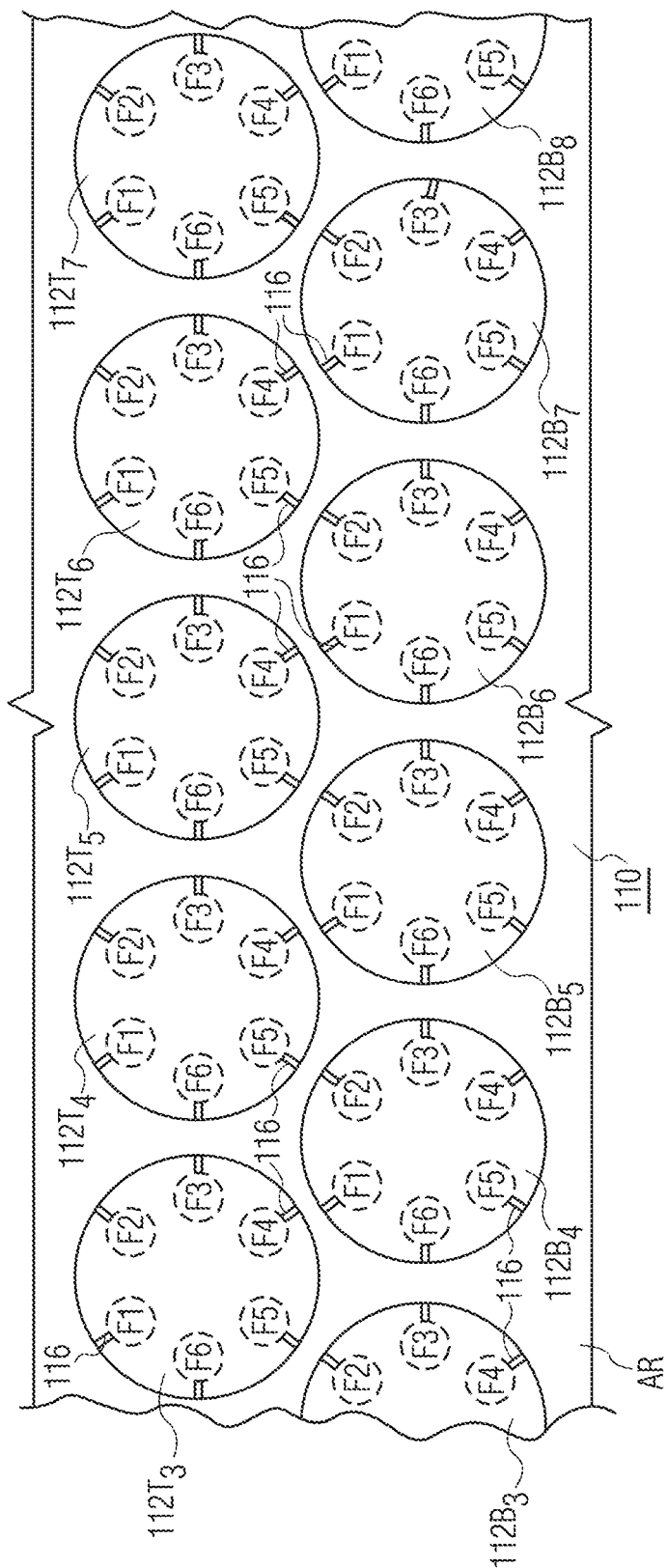
FIG. 19 depicts an alternate antenna configuration that can be incorporated into satellites depicted in the previous figures for improving radio link creation and data transmissions in space-based systems described herein.

FIG. 19 depicts an antenna configuration that can further increase the probability of pairing antennas in different satellites by using high-gain radio beams that will result in more rapidly creating radio links with qualities (Q) acceptable for a radio route. FIG. 19 represents a portion of the circumferentially extending antenna region AR shown in FIG. 13 containing top row antennas 112T$_3$, 112T$_4$, 112T$_5$, 112T$_6$, and 112T$_7$, and bottom row antennas 112B$_3$, 112B$_4$, 112B$_5$, 112B$_6$, 112B$_7$, and 112B$_8$. The remaining antennas on the top and bottom rows will have the same construction. Although these antenna configurations are discussed in connection with the satellite 110, it will be understood that they can be used in any of the satellite configurations and deployment schemes already discussed (such as rotating and counter-rotating satellites).

In the present embodiment each of the antennas 112 is a parabolic antenna with six feeds F1 to F6. The feeds F1 to F6 are spaced equidistant from each other and are arranged at a distance from the central axis of the antenna's parabolic reflector. There is no antenna feed on the parabola's central axis. The shape and curvature of the antenna reflectors can be chosen according to known multi-feed antenna designs and principles of operation. It will also be appreciated that the antenna reflectors can have non-parabolic topologies, such as spherical, combination spherical/parabolic, and others, to maximize the operational characteristics of the system embodiment described here. It should be understood that the number of antennas and the number of feeds per antenna depends on the design of the satellites and the desired operational characteristics of the system. More or fewer antennas and feeds may be used with the satellites discussed in this disclosure.

Figure 20:
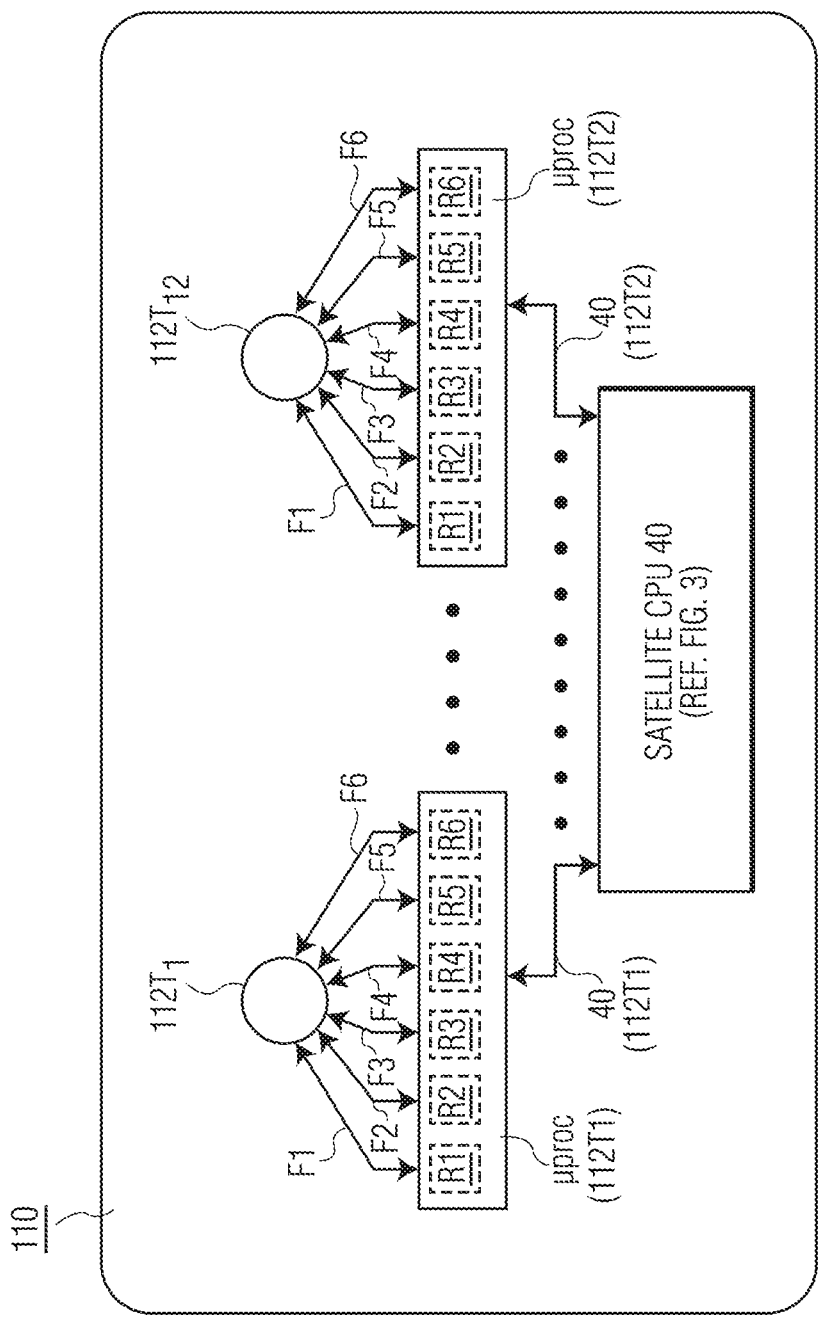
FIG. 20 is a schematic representation of control circuitry in a satellite with the antenna configuration in FIG. 19.

FIG. 20 is a functional diagram of exemplary computer circuitry for processing signals received by the antenna feeds and signals transmitted by the antenna feeds. As with all of the descriptions of computer and processing circuitry previously described, the boxes and the connections between them in FIG. 20 are used solely as an aid in explaining the operation of the present embodiment. It will be well within the skill of the art to design and implement appropriate computer components, including hardware, firmware, and/or software, as required to perform the functions described herein. Moreover, the circuit diagram in FIG. 20 is not meant to suggest any particular architecture for performing the functions to be described.

FIG. 20 depicts just the top antenna modules 112T$_1$ and 112T$_{12}$ for purposes of the present description. The remaining top antenna modules and all of the bottom antenna modules 112B are omitted from the figure for clarity. Each antenna module has associated with it a microprocessor "μproc" for processing signals introduced to the antenna feeds and receiving signals from the antenna feeds. The individual antenna microprocessors are identified in FIG. 20 by the notation μproc (112TX), "X" being the number of the associated antenna module according to the description above of FIG. 19. Thus, in the figure, "μproc (112T1)" denotes the onboard circuitry for processing signals introduced to and received from the feeds F1 to F6 of the antenna module 112T$_1$. Likewise, "μproc (112T12)" denotes the onboard circuitry for processing signals introduced to and received from the feeds F1 to F6 of the antenna module 112T$_{12}$. Each of the other antenna modules 112T$_2$ to 112T$_{11}$ is associated with its own microprocessor, as represented by the plural dots between μproc (112T1) and μproc (112T12) in FIG. 20. Each microprocessor μproc includes radio transceivers denoted by R1 to R6, indicating that each is associated with a corresponding feed F1 to F6 of that antenna. The transceivers convert RF signals received by the feeds into a data stream and convert a data stream into RF signals to be broadcast by the antenna.

The antenna module microprocessors are connected by power and data lines 40(112T1) to 40(112T12) to the satellite CPU 40. The dots in FIG. 20 between the lines 40(112T1) and 40(112T12) indicate that like power and data lines also connect corresponding power and data lines to each antenna module microprocessor μproc (112T2) to μproc (112T11). As seen in FIG. 19, the satellite antenna feeds are numbered, and the circuitry shown in FIG. 20 enables the satellite to identify the antenna feed on which signals such as routing messages are received to permit data transmissions to be sent on the same antenna feed, thereby effecting the routing protocols and data transmission methods and the distributed ledger embodiment described above.

The use of six feeds per antenna on 24 antennas is the functional equivalent of 144 separate antennas. The latter configuration would be within the scope of the present disclosure in its broadest aspects, but it would obviate many of its important objects, one of which is to provide a system in which the satellites are so small and lightweight that the cost of launching is minimal. Although a satellite with multi-feed antennas will typically be larger and slightly heavier than single-feed embodiments, they will still be orders of magnitude smaller and lighter than a satellite having enough single-feed antennas to achieve the same functionality. In addition, increasing by several-fold the number of routing messages sent from each satellite will likely increase the probability of creating radio links with ground stations and other satellites, which could reduce the number of satellites required to achieve the same results as using satellites with single-feed antennas.

Two important aspects of the satellite design depicted in FIG. 19 are the elimination of a central antenna feed and mounting the peripheral feeds F1 to F6 using brackets 116 to suspend them from the antenna rim. Both of these features serve to expose more of the antenna reflector to the peripheral feeds. This design will make the antennas less susceptible to the generation of side lobes and will eliminate interference by a central feed with signals transmitted and received by the antenna peripheral feeds.

Because of the increased spatial density of the antenna feeds, at least some incoming routing messages used in routing protocols discussed above may be received by more than one antenna feed F of a particular antenna. The individual antenna microprocessors µproc identify the feed that will provide the highest quality radio link if that antenna module were used in a radio route. This can be done using any of the criteria already discussed above. This information is passed on to the satellite CPU 40, via the appropriate power and data line 40(112T1) to 40(112T12) associated with the top row of antennas, or the appropriate not-shown power and data line 40(112B1) to 40(112B12) associated with the bottom row of antennas in FIG. 19, which then performs its own evaluation of all of the radio signals selected by the individual antenna microprocessors. The same procedure is followed when an incoming radio signal (routing message) is received by feeds in bordering antenna modules. For example, an incoming signal might be received by four feeds in adjoining antenna modules, such as the feeds F1 and F2 of the antenna $112B_4$, the feed F4 of the antenna $112T_3$, and the feed F5 of the antenna $112T_4$. In that case, the microprocessor µproc($112B_4$) associated with the antenna 112B4 would determine which of its feeds F1 or F2 would provide the better (higher quality) radio link, and provide the determinative parameters supporting that decision to the satellite CPU 40. The route quality information from the feed F4 of the antenna $112T_3$, and from the feed F5 of the antenna $112T_4$ is also sent to the satellite CPU 40, which then uses all of the data received from the antenna modules to identify the antenna module and its feed to use for data transmissions as discussed above.

D. CubeSat Compatibility

At this time, the term "CubeSat" refers to two different concepts for building and deploying very small satellites. One concept involves using a standard size package essentially as a chassis for the satellite's components. The other basically provides a container for holing a satellite that is then deployed by ejecting the satellite from the container into orbit. "CubeSat" refers to the dimensions of the basic unit that is 4 in.×4 in.×4.5 in. (10 cm.×10 cm.×11.35 cm.). CubeSats are available in multiples of that basic unit, often referred to by how many basic units comprise a particular CubeSat (for, example, "3U," "6U," etc.). The underlying principle is that launch and deployment costs can be reduced if the size and shape of different satellites for different missions nevertheless have the same or similar form factor. By the same token, the technology at present is used only with small, specialized satellites.

Figure 21:
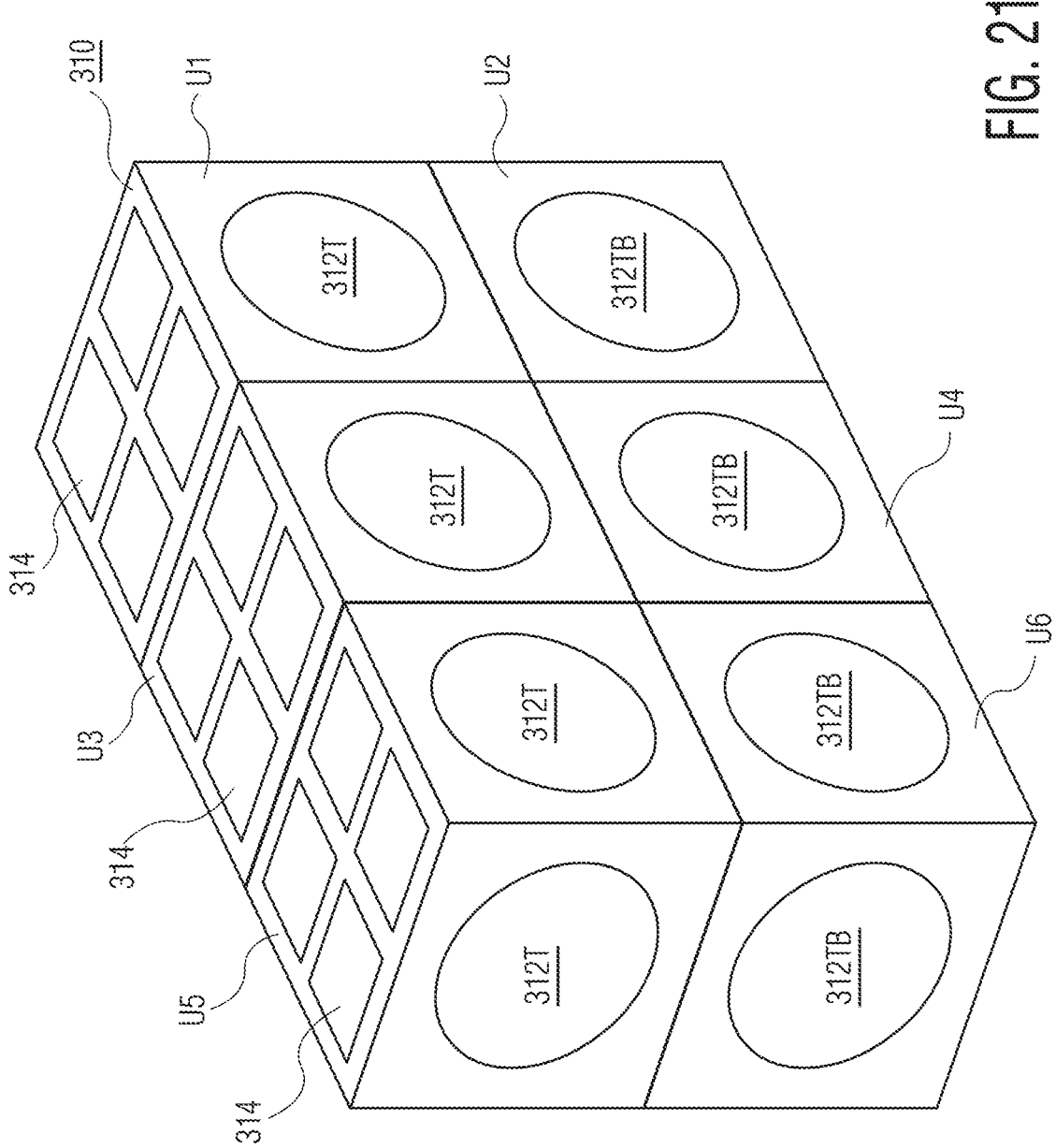
FIG. 21 is a schematic isometric view of a CubeSat implementation of a satellite capable of use in the systems described herein.

FIG. 21 is a schematic representation of one possible implementation of a satellite capable of use in the systems described above as embodied in a CubeSat 310 comprising six units U1, U2, U3, U4, U5, and U6. The units are constructed so that the satellite has a top row of eight antennas 312T and a bottom row of eight antennas 312B (the opposite faces of the units not seen in the drawing have antennas corresponding to those visible in FIG. 21). The attitude of the satellite 310 can be stabilized using the techniques described above (see discussion of FIG. 17, for example). With the satellite thus oriented, the top of each unit U can include an array of solar panels 314 corresponding to the solar panels 114 and 214 of the satellites 110 and 210 (see FIGS. 14 and 18). The bottom of each unit U can include one or more downward facing antennas (not shown) comparable to the downward facing antennas 150 of the satellite 110 (see FIG. 12). IN addition, the antennas 312 can have the multi-feed construction discussed above in connection with FIGS. 19 and 20.

FIG. 21 illustrates that satellites in accordance with the various embodiments, features, and operational characteristics described herein are particularly suited to CubeSat technology. They are small and lightweight, they do not carry rocket fuel and thus do not require special handling during launch, and they can be built on a CubeSat-type chassis, as shown in FIG. 21, or for deployment in a CubeSat package. It will also be appreciated that FIG. 21 is intended as one example of a CubeSat implementation of a satellite that can be used in the systems described herein. Larger CubeSats, that is, with more than six units, are possible. Another constructional variation can use satellites that match a multi-unit CubeSat envelope, but are otherwise integrally constructed with any of the features described herein. For example, a satellite designed for use with any of the systems herein could have an envelope matching, say, a 12U CubeSat (3×2×2), but not be constructed as separate CubeSat units in the manner suggested by FIG. 21.

IV. FURTHER APPLICATIONS OF DISCLOSED CONCEPTS

Figure 22:
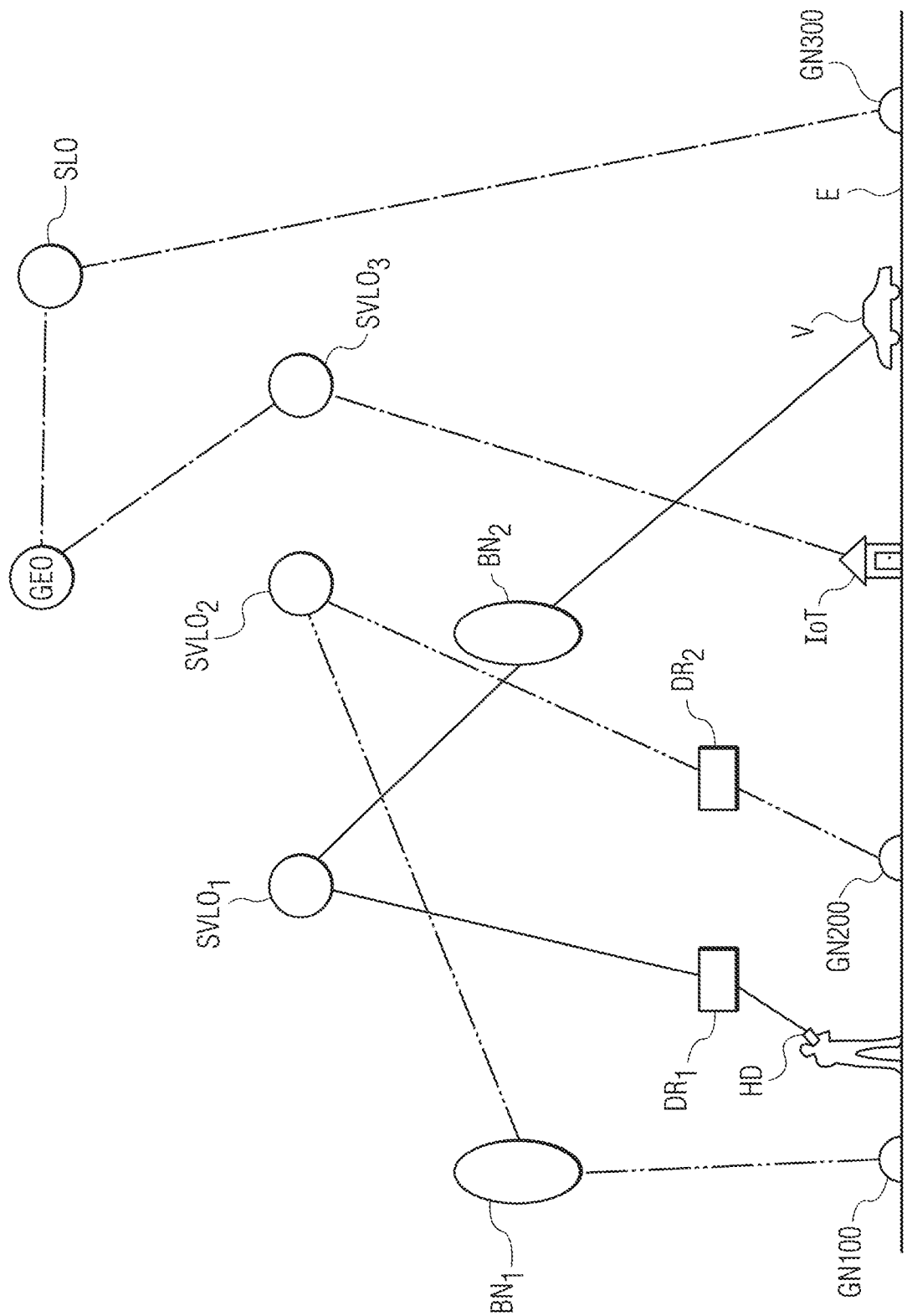
FIG. 22 is a diagram illustrating examples of some of the various types of aerial-based communications systems that can be implemented using concepts disclosed herein One skilled in the art will readily understand that the drawings are not strictly to scale, but nevertheless will find them sufficient, when taken with the detailed descriptions of preferred embodiments that follow, to make and use the present invention.

FIG. 22 illustrates the versatility afforded by the concepts disclosed herein in implementing different types of communications systems that can enable communications between system nodes. By way of the notation used in FIG. 22, general types of ground nodes are identified by the references GN100, GN200, and GN300. These can be cellular towers, WiFi routers, and the like. They are sometimes referred to by those working in the field of wireless communications as "drops," which can mean a device that serves one or more ground-based users or ground-based networks. Other types of ground-based nodes with which the systems disclosed herein can be used are individual hand-held devices HD, buildings IoT with devices forming part of the so-called "Internet of Things," which is generally taken to mean inter-networked physical devices (also referred to as "connected devices" and "smart devices") embedded with electronics, software, sensors, actuators, and network connectivity which enable the collection and exchange of data, and vehicles V, which can incorporate devices such as those interconnected as part of the Internet of Things and devices comparable to the handheld devices HD.

FIG. 22 also illustrates some examples of the different types of aerial-based nodes that the system can incorporate. The references $SVLO_1$, $SVLO_2$, and $SVLO_3$ denote satellites in very low earth orbits, in this example no more than 100 miles in altitude. As already noted, satellites at lower altitudes will increase the strength of radio signals exchanged with locations on the ground. The reference SLO denotes a satellite in a low earth orbit, in this example about 500 miles in altitude. In addition, non-orbiting aerial nodes can also be used in the systems described herein. For example, nodes similar in construction to the satellites described above can be suspended from balloons $BN_1$ and $BN_2$ permitted to float freely in the stratosphere (or at lower altitudes). The balloons may prove useful in providing communication services (Internet access, emails, etc.) to relatively small areas on the surface of the earth E. Another variation of aerial-based nodes comprises unmanned aerial vehicles ("drones") $DR_1$ and $DR_2$ deployed over prescribed areas at altitudes of 1000-2000 feet, although other altitudes might be desirable depending on the particular area to be serviced by the system. It is expected that using low-flying drones would enable communications directly from handheld devices or other personal devices more readily than a satellite-based system because the drones would be closer to such devices than in a system comprising only satellites. The reference GEO denotes a satellite in geosynchronous orbit with which satellites and other aerial-based nodes as described herein can communicate to effect data transmissions.

FIG. 22 illustrates some examples of route segments that can be created in systems employing one or more types of aerial nodes as depicted in the figure. For example, a route between the handheld device HD to the vehicle V could include subroutes shown solid lines in the figure, including a link to a drone such as $DR_1$, subroutes that could include other drones (not shown), then to one or more very low earth orbit satellites represented by the satellite $SVLO_1$, one or more balloons represented by the balloon such as $BN_2$, and a link with the vehicle V. Another example of a radio route is shown in dash-two-dot lines in FIG. 22 between the ground node GN100 and GN200. This route includes subroutes involving one or more balloons BN (represented by the balloon $BN_1$), one or more very low earth orbit satellites (represented by the satellite $SVLO_2$), and one or more drones (represented by the drone $D_2$). A third example is shown in dash-one-dot lines between the building IoT that houses devices that are incorporated into the Internet of Things. This route includes subroutes involving, one or more very low earth orbit satellites (represented by the satellite $SVLO_3$), one or more geosynchronous satellites already deployed in other systems (represented by the satellite GEO), and one or more low earth orbit satellites (represented by the satellite SLO). From this description, it will appreciated that each of the aerial node types DR, BN, SVLO, SLO, and GEO in the figure are intended to represent possible nodes in subroutes that can include multiple links between different-type or like-type nodes.

The use of balloons as nodes has been suggested before. It is believed that Google is testing a system it calls Project Loon to provide Internet access to rural and remote areas. According to reports, high-altitude balloons are placed in the stratosphere at an altitude of about 18 km (11 miles) to create an aerial wireless network. The balloons are maneuvered by adjusting their altitude in the stratosphere to float to a wind layer after identifying the wind layer with the desired speed and direction using published wind data. Signals travel through the balloon network from balloon to balloon, then to a ground-based station connected to an Internet service provider (ISP), then onto the global Internet. See, for example, "Project Loon," *Wikipedia*, https://en.wikipedia.org/wiki/Project_Loon (last visited Sep. 20, 2017). One skilled in the art could readily adapt such a balloon-based system to use the various satellite-implemented nodes discussed in the present disclosure.

V. Summary and Conclusion

Preferred communications systems and methods described above use stochastically distributed orbiting satellites to take advantage of probabilities inherent in such a system to reliably assemble radio routes between satellites and between satellites and ground stations that are sufficiently robust to support data communications. Prior satellite-based communications systems designed to enable data communications with ground stations located over wide swaths of the earth's surface use satellites that are maintained in constrained orbits so that every satellite knows to a virtual certainty the location of another satellite with which it can communicate. This requires large heavy satellites with rocket thrusters or other heavy and complex mechanisms to maintain each satellite in a precise location and at a tightly controlled attitude to ensure that antennas on the satellites can be paired to form inter-satellite radio links.

The approach in the systems and methods described and claimed herein breaks that paradigm by using satellites that are stochastically distributed and do not need to know the location of any other satellite to pair antennas on respective satellites and form radio links. In some embodiments data can be transmitted reliably via the satellites to ground stations around the world even if the satellites have no attitude control at all.

A variety of satellite constructional enhancements are available to enhance the reliability and speed of data transmissions and reduce the cost of deploying the satellites in orbit. In a basic construction, the satellites are spherical, or nearly so, with antennas distributed around or all or a portion of the sphere to enable the transmission of radio signals in all or mostly all spherical directions. In one enhancement, the satellite has antennas in a circular band around the satellite, exemplified in FIGS. 12-15, which when combined with partial attitude stabilization, exemplified by FIGS. 16 and 17, will further increase the reliability of the system in terms of creating radio links between satellites and between the satellites and ground stations. The passive stabilization means as described herein do not require moving parts and can controlling satellite orientation within say ±10° of horizontal, which will be sufficient to enhance antenna pairing. Causing the satellites to rotate can further increase the probability of antenna pairing with various ones of the disclosed satellite constructions. In another embodiment, the antennas comprise parabolic reflectors with plural feeds mounted to the antenna rim that enables transmission and receipt of more radio signals per satellite, while enhancing antenna performance by omitting a center feed. The satellites can also be made compact enough to be compatible with CubeSat standards.

Unique routing protocols disclosed herein are tailored to data transmissions to aground station via a system of stochastically distributed orbiting satellites. The ground station has a unique address identifying itself and the zone where it is located. A local area network associated with the ground node includes at least one satellite that stores the identity of a satellite antenna paired with a ground station antenna to form a radio link for transmitting data onboard the satellite to the ground station. Other satellites in the local area network store the ground node address and the identity of an antenna paired with an antenna in another satellite that also has stored the ground node address. A wide area network includes at least one satellite, each of which stores the identity of an antenna paired with an antenna of another satellite that has stored the zone of the initial satellite to form at least one inter-satellite radio link. The local area network establishes a subroute known to connect to the destination ground station, while the wide area network funnels data transmissions toward the ground station zone, where it is likely to encounter a satellite in the ground station's local area network. If a satellite with data onboard is not in a local area network or in a wide area network, the satellite transmits the data toward the ground node zone.

A satellite-based distributed ledger system can be supported by a plurality of stochastically distributed orbiting satellites to distribute a data communication received by at least one of the satellites from a ground station. The satellites use a GNSS module for to provide a common clock for all of the satellites and transmit all of the stored data communications on substantially all of the antennas of all of the satellites during a unique time slot. The distribution throughout the system is driven by probabilities as in other applications of the systems described herein, but a sufficient number of satellites in orbit will ensure rapid dissemination of the data to all of the satellites.

Those skilled in the art will readily recognize that only selected preferred embodiments of the invention have been depicted and described, and it will be understood that various changes and modifications can be made other than those specifically mentioned above departing from the spirit and scope of the invention, which is defined solely by the claims that follow.

What is claimed is:

1. A radio communication system for transmitting data to a terrestrial node via a radio route comprising at least two orbiting satellites in a constellation of multiple satellites, each of a plurality of said satellite nodes including:
   a plurality of antennas for receiving and transmitting radio signals in different directions;
   route creation circuitry for receiving routing messages transmitted from other nodes and for transmitting routing messages to other nodes; and
   a memory for storing identities of the antennas on which respective routing messages are received, wherein:
   the route creation circuitry of a first order satellite determines a value of a first parameter associated with of an initial routing message received from the terrestrial node,
   said value of said first parameter indicates the suitability of a radio link including the first order satellite as a node in a radio route for transmitting the data to the terrestrial node,
   the route creation circuitry of said first order satellite transmits on a plurality of said antennas first order routing messages including address information identifying the terrestrial node and the value of the first parameter associated with the initial routing message, and
   the route creation circuitry of at least one second order satellite determines a value of a second parameter associated with each first order routing message received from a respective first order satellite, said value of said second parameter indicating the suitability of a radio link including the second order satellite as a node in a radio route for transmitting the data to the respective first order satellite.

2. A system as in claim 1, wherein:
   the route creation circuitry of at least one second order satellite identifies a first order routing message representing a preferred radio route from the second order satellite to the terrestrial node identified in the initial routing message, the preferred radio route comprising a first radio link having a value corresponding to the value of the first parameter and a second radio link having a value corresponding to the value of the second parameter, whereby both said first and second radio links have a higher value than the value of any first or second radio link of any other radio route from a particular second order satellite to the terrestrial node,
   the memory of the first order satellite in the preferred radio route stores the address information and the antenna that received the initial routing message associated with the preferred radio route, and
   the memory of the second order satellite in the preferred radio route stores the address information, the identity of the antenna that received the first order routing message associated with the preferred radio route, and the lower link value as between the first and second radio links in the preferred radio route.

3. A system as in claim 2, wherein:
   a plurality of said second order satellites included in a preferred radio route transmit on plural antennas second order routing messages including the address information and the lower link value in the preferred radio route,
   the route creation circuitry of at least one third order satellite (i) determines a value of a third parameter associated with a corresponding second order routing message received from a respective second order satellite and matches it with the lower link value included in said second order routing message, and (ii) identifies a second order routing message representing a preferred radio route from the third order satellite via a first order satellite to the terrestrial node identified in the initial routing message, the preferred radio route comprising a third radio link between the third order satellite and the second order satellite associated with the corresponding second order routing message, the third radio link having a value corresponding to the value of the third parameter, whereby all of the radio links associated with the preferred radio route have a higher value than any first, second, or third radio link associated with any other radio route from a particular third order satellite to the terrestrial node, and
   the memory of the third order satellite stores the identity of the antenna that received the second order routing message associated with the preferred radio route and the address information.

4. A system as in claim 2, wherein the values of the radio links in the preferred radio route exceed a predetermined minimum.

5. A system as in claim 3, wherein the route creation circuitry of said first order satellites and the route creation circuitry of said second and third order satellites in said preferred radio routes transmit on plural antennas announcement routing messages including the address information identifying the terrestrial node.

6. A system as in claim 1, wherein at least some of the satellites rotate.

7. A system as in claim 1, wherein at least some of the satellites further include selectively energized electromagnets for interacting with the earth's magnetic field to create a moment on the satellites.

8. A system as in claim 1, wherein at least some of the satellites include attitude stabilization.

9. A system as in claim 1, wherein at least some of the satellites include attitude stabilization means including electromagnets selectively energized to align the satellites with the earth's magnetic field.

10. A system as in claim 3, wherein the antennas comprise parabolic reflectors, each consisting of plural feeds all of which are mounted at the periphery of the reflector, and the identities of the antennas stored in the memories of the first, second, and third order satellites comprise the identities of the respective satellite feeds.

11. A system as in claim 1, wherein the system nodes further include at least one of an unmanned aerial vehicle, a balloon, and a geostationary satellite.

12. A system as in claim 1, wherein the plurality of satellite nodes include a plurality of cohorts of satellites in orbits of different altitudes.

13. A radio communication system comprising a plurality of system nodes including multiple orbiting satellites for transmitting data to a destination satellite via one or more of the other satellites, each of a plurality of said satellites including:
   a plurality of antennas for receiving and transmitting radio signals in different directions;
   route creation circuitry for receiving wide area routing messages transmitted from other satellites and for transmitting wide area routing messages to other satellites; and
   a memory for storing identities of the antennas on which respective wide area routing messages are received, wherein:
   the route creation circuitry of a first order wide area satellite determines a value of a first parameter associated with an initial wide area routing message received from the destination satellite,
   said value of said first parameter indicates the suitability of a radio link including the first order wide area satellite as a node in a wide area radio route for transmitting the data to the destination satellite,
   the route creation circuitry of the first order wide area satellite transmits on a plurality of said antennas first order wide area routing messages including address information identifying the destination satellite and the value of the first parameter associated with the initial wide area routing message, and
   the route creation circuitry of at least one second order wide area satellite determines a value of a second parameter associated with each first order routing message received from a respective first order satellite, said value of said second parameter indicating the suitability of a radio link including the second order wide area satellite as a node in a wide area radio route for transmitting the data to the respective first order wide area satellite.

14. A system as in claim 13, wherein:
   the route creation circuitry of each second order wide area satellite identifies a first order wide area routing message representing a preferred wide area radio route from the second order wide area satellite to the destination satellite comprising a first wide area radio link having a value corresponding to the value of the first parameter and a second wide area radio link having a value corresponding to the value of the second parameter, whereby both said first and second wide area radio links have a higher value than the value of any other first or second wide area radio link from a particular second order wide area satellite to the destination satellite, and
   the memory of the second wide area satellite in the preferred wide area radio route stores the address information, the identity of the antenna that received the first order wide area routing message associated with the preferred wide area radio route, and the lower link value as between the first and second wide area radio links.

15. A system as in claim 14, further comprising at least one third order wide area satellite for receiving one or more second wide area routing messages transmitted on plural antennas of at least one second order wide area satellite in the preferred wide area radio route, wherein:
   the route creation circuitry of at least one said third order wide area satellite (i) determines a value of a third parameter associated with a corresponding second order wide area routing message received from a respective second order wide area satellite and matches it with the lower link value included in said second order wide area routing message, and (ii) identifies a second order wide area routing message representing a preferred radio route from the third order wide area satellite via a first order wide area satellite to the destination satellite identified in the initial wide area routing message the preferred wide area radio route comprising a third wide area radio link between the third order wide area satellite and the second order wide area satellite associated with the corresponding second order wide area routing message, the third wide area radio link having value corresponding to the value of the third parameter, whereby all of the wide area radio links associated with the preferred radio route have a higher value than any first, second, or third wide area radio link associated with any other radio route from a particular wide area third order satellite, and
   the memory of the third order wide area satellite stores the identity of the antenna that received the second order wide area routing message associated with the preferred wide area radio route and the address information.

16. A system as in claim 14, wherein the values of the wide area radio links in the preferred wide area radio route exceed a predetermined minimum.

17. A system as in claim 13, wherein at least some of the satellites rotate.

18. A system as in claim 13, wherein at least some of the satellites further include selectively energized electromagnets for interacting with the earth's magnetic field to create a moment on the satellites.

19. A system as in claim 13, wherein at least some of the satellites include attitude stabilization.

20. A system as in claim 13, wherein at least some of the satellites includes attitude stabilization means including electromagnets selectively energized to align the satellites with the earth's magnetic field.

21. A system as in claim 15, wherein the antennas comprise parabolic reflectors, each consisting of plural feeds all of which are mounted at the periphery of the reflector, and the identities of the antennas stored in the memories of the first, second, and third order wide area satellites comprise the identities of the respective satellite feeds.

22. A system as in claim 13, wherein the system nodes further include at least one of an unmanned aerial vehicle, a balloon, and a geostationary satellite.

23. A system as in claim 13, wherein the plurality of satellite nodes include a plurality of cohorts of satellites in orbits of different altitudes.

24. A method of transmitting data to a destination terrestrial node using the system described in claim 1, via at least one of a plurality of stochastically distributed orbiting satellites, the terrestrial node having a unique terrestrial address associated with its geolocation and at least one antenna for receiving data transmissions, wherein each satellite comprises a plurality of antennas for receiving and transmitting radio signals in different directions to form radio links on respective paired antennas of the satellites and data transmission circuitry for transmitting data on at least one of the plurality of antennas, the method comprising:
- (a) receiving on a satellite antenna a data transmission with destination information including the terrestrial address of the destination terrestrial node;
- (b) determining if a memory in the receiving satellite has stored an identity uniquely associated with an antenna of the receiving satellite paired with the destination terrestrial node antenna;
- (c) if the answer in step (b) is yes, transmitting the data using the antenna whose identity is stored in the receiving satellite's memory;
- (d) if the answer in step (c) is no, determining if the receiving satellite memory has stored a unique identity of an antenna paired with an antenna of another satellite whose memory has stored the terrestrial address of the destination terrestrial node;
- (e) if the answer in step (d) is yes, transmitting the data using the antenna whose identity is stored in the receiving satellite's memory; and
- (f) transmitting the data to the destination terrestrial node from the satellite whose memory has stored the identity of the antenna paired with the antenna of the destination terrestrial node.

25. A method as in claim 24, wherein the antenna whose identity is stored in the memory of the other satellite is paired with an antenna in an additional satellite whose memory has stored the identity of the antenna paired with the antenna of the destination terrestrial node.

26. A method as in claim 24, wherein the orbiting satellites traverse a predetermined swath of the earth's surface with at least a portion of the swath of the earth's surface being divided into a plurality of zones, each satellite stores zone address information indicative of the geographic boundaries of the zones, and the unique terrestrial address includes zone address information indicating the zone in which the destination node is located, the method further comprising:
- (g) if the answer in step (b) is no, determining if a memory in the receiving satellite has stored the identity of an antenna of the receiving satellite paired with an antenna of a wide area satellite with a memory that has stored the zone address information; and
- (h) if the answer in step (g) is yes, transmitting the data using the antenna whose identity is stored in the receiving satellite; and
- (i) repeating steps (a) through (h) by treating the wide area satellite as the receiving satellite in each said step.

27. A method as in claim 26, further comprising:
- (j) if the answer in step (h) is no, transmitting the data using at least one antenna of the receiving satellite pointing in the direction of the zone of the destination node;
- (k) determining if the receiving satellite has received a return acknowledgement message from another satellite that received the data transmission; and
- (l) if the answer to step (k) is no, repeating steps (a) to (k).

28. A system as in claim 1, wherein a plurality of the satellites are in stochastically distributed orbits.

29. A system as in claim 1, wherein each of the first parameter and the second parameter comprises at least one of signal strength and error coding data.

30. A system as in claim 29, wherein said first and second parameters both relate to the same property of the first and second routing messages.

31. A system as in claim 1, wherein the earth's surface visible to the satellites in the constellation is divided into a predetermined number of zones, and the address information associated with the terrestrial node includes a zone identifier and a unique node identifier.

32. A system as in claim 1, wherein the antennas in the satellites have substantially the same configuration.

33. A system as in claim 2, wherein the first and second order routing messages are transmitted in different time slots.

34. A system as in claim 3, wherein the value of all of the radio links in the preferred radio route exceed a predetermined minimum.

35. A system as in claim 13, wherein a plurality of the satellites are in stochastically distributed orbits.

36. A system as in claim 13, wherein each of the first parameter and the second parameter comprises at least one of signal strength and error coding data.

37. A system as in claim 36, wherein said first and second parameters both relate to the same property of the first and second wide area routing messages.

38. A system as in claim 13, wherein the address information of the satellites includes a satellite geolocation and the wide area routing messages include the geolocation of the satellite transmitting said routing message.

39. A system as in claim 13, wherein the antennas in the satellites have substantially the same configuration.

40. A system as in claim 13, wherein the first and second order wide area routing messages are transmitted in different time slots.

41. A system as in claim 15, wherein the value of all of the wide area radio links in the preferred radio route exceed a predetermined minimum.

42. A radio communication system for transmitting data to a destination terrestrial node via a radio route comprising at least two orbiting satellites in a constellation of multiple satellites, each of a plurality of said satellites including:
- a plurality of antennas for receiving and transmitting radio signals in different directions;
- route creation circuitry for receiving routing messages transmitted from at least two other satellites, said routing messages including address information associated with the destination terrestrial node, and for determining a value of a parameter associated with each said routing message received from the other satellites, wherein said values indicate the comparative suitability for data transmission of radio links between the satellite receiving the routing messages and each of the respective satellites transmitting the routing messages, and wherein the route creation circuitry selects a radio link by comparing the values of the parameters associated with each received routing message and transmits on plural said antennas a further routing message including a value associated with the selected radio link and the address information.

43. A system as in claim 42, wherein the selected radio link comprises a link in a preferred radio route to the destination terrestrial node.

* * * * *